(12) United States Patent
Sherwood et al.

(10) Patent No.: US 9,815,943 B2
(45) Date of Patent: Nov. 14, 2017

(54) POLYSILOCARB MATERIALS AND METHODS

(71) Applicant: Melior Innovations, Inc., Houston, TX (US)

(72) Inventors: Walter Sherwood, Glenville, NY (US); Mark Land, Houston, TX (US); Brian Benac, Marble Falls, TX (US); Michael Mueller, Cypress, TX (US); George Keith, Houston, TX (US); Oliver Wilding, Jr., Louisville, KY (US); Douglas Dukes, Troy, NY (US)

(73) Assignee: Melior Innovations, Inc., Houston, TX (US)

( * ) Notice: Subject to any disclaimer, the term of this patent is extended or adjusted under 35 U.S.C. 154(b) by 0 days.

(21) Appl. No.: 14/268,150

(22) Filed: May 2, 2014

(65) Prior Publication Data
US 2014/0274658 A1 Sep. 18, 2014

Related U.S. Application Data

(63) Continuation-in-part of application No. 14/212,896, filed on Mar. 14, 2014.

(60) Provisional application No. 61/818,906, filed on May 2, 2013, provisional application No. 61/818,981, filed on May 3, 2013.

(51) Int. Cl.
| | | |
|---|---|---|
| C04B 35/64 | (2006.01) |
| C08G 77/20 | (2006.01) |
| C04B 35/515 | (2006.01) |
| C08G 77/50 | (2006.01) |
| C08L 83/04 | (2006.01) |
| C04B 35/56 | (2006.01) |
| C04B 35/571 | (2006.01) |
| C04B 35/80 | (2006.01) |
| C09K 8/80 | (2006.01) |
| C08G 77/12 | (2006.01) |

(52) U.S. Cl.
CPC ............ *C08G 77/20* (2013.01); *C04B 35/515* (2013.01); *C04B 35/56* (2013.01); *C04B 35/5603* (2013.01); *C04B 35/571* (2013.01); *C04B 35/64* (2013.01); *C04B 35/806* (2013.01); *C08G 77/50* (2013.01); *C08L 83/04* (2013.01); *C09K 8/80* (2013.01); *C04B 2235/3418* (2013.01); *C04B 2235/3826* (2013.01); *C04B 2235/44* (2013.01); *C04B 2235/48* (2013.01); *C04B 2235/483* (2013.01); *C04B 2235/528* (2013.01); *C04B 2235/5427* (2013.01); *C04B 2235/5436* (2013.01); *C04B 2235/6581* (2013.01); *C04B 2235/77* (2013.01); *C04B 2235/96* (2013.01); *C08G 77/12* (2013.01)

(58) Field of Classification Search
CPC ........ C04B 35/64; C04B 35/515; C04B 35/571
See application file for complete search history.

(56) References Cited

U.S. PATENT DOCUMENTS

| | | | |
|---|---|---|---|
| 3,409,868 A | 11/1968 | Salathiel | |
| 3,520,656 A | 7/1970 | Meadows | |
| 4,208,471 A | 6/1980 | Bresak | |
| 4,298,063 A | 11/1981 | Regalbuto | |
| 4,433,069 A | 2/1984 | Harper | |
| 4,516,608 A | 5/1985 | Titus | |
| 4,546,163 A | 10/1985 | Haluska | |
| 4,547,468 A | 10/1985 | Jones | |
| 4,711,928 A | 12/1987 | Lee | |
| 4,840,781 A | 6/1989 | Noake | |
| 4,877,820 A | 10/1989 | Cowan | |
| 5,162,480 A * | 11/1992 | Schilling, Jr. .......... | C08G 77/08 528/23 |
| 5,180,694 A | 1/1993 | Renlund | |
| 5,188,175 A | 2/1993 | Sweet | |
| 5,225,123 A | 7/1993 | Torobin | |
| 5,225,283 A | 7/1993 | Leung | |
| 5,275,980 A | 1/1994 | Schilling, Jr. | |
| 5,328,976 A * | 7/1994 | Leung ..................... | C03C 3/045 528/31 |
| 5,354,602 A | 10/1994 | Stranford | |
| 5,354,830 A | 10/1994 | Williams | |
| 5,358,674 A | 10/1994 | Rabe | |
| 5,376,595 A | 12/1994 | Zupancic | |
| 5,436,207 A | 7/1995 | Atwell | |
| 5,438,025 A | 8/1995 | Leung | |
| 5,552,466 A | 9/1996 | Beckley | |
| 5,588,491 A | 12/1996 | Brugman | |
| 5,635,250 A | 6/1997 | Blum | |

(Continued)

FOREIGN PATENT DOCUMENTS

| | | |
|---|---|---|
| EP | 0490401 | 6/1992 |
| EP | 0560485 | 9/1993 |

(Continued)

OTHER PUBLICATIONS

International Search Report and Written Opinion of the International Searching Authority, PCT/US2012/061329, dated Jan. 8, 2013.

(Continued)

*Primary Examiner* — Margaret Moore

(74) *Attorney, Agent, or Firm* — Glen P. Belvis

(57) ABSTRACT

Silicon (Si) based materials and methods of making those materials. More specifically, methods and materials having silicon, oxygen and carbon that form filled and unfilled plastic materials and filled and unfilled ceramics.

85 Claims, 13 Drawing Sheets

(56) References Cited

U.S. PATENT DOCUMENTS

| | | | | |
|---|---|---|---|---|
| 5,698,340 | A | * | 12/1997 | Xue .................. H01M 4/36 |
| | | | | 423/594.15 |
| 5,714,025 | A | | 2/1998 | Brungardt |
| 5,872,070 | A | | 2/1999 | Dismukes |
| 5,955,194 | A | * | 9/1999 | Campbell .............. C03C 3/045 |
| | | | | 427/255.24 |
| 6,329,487 | B1 | | 12/2001 | Abel |
| 6,348,554 | B1 | | 2/2002 | Roos |
| 6,624,228 | B1 | | 9/2003 | Dismukes |
| 6,635,215 | B2 | | 10/2003 | Sugimoto |
| 7,090,027 | B1 | | 8/2006 | Williams |
| 7,175,694 | B2 | | 2/2007 | Ma |
| 7,287,573 | B2 | * | 10/2007 | McNulty ............... C08L 83/04 |
| | | | | 164/131 |
| 7,789,147 | B2 | | 9/2010 | Brannon |
| 7,942,302 | B2 | | 5/2011 | Roby |
| 8,006,759 | B1 | | 8/2011 | Cochran |
| 8,173,568 | B2 | | 5/2012 | Nishimura |
| 2002/0198353 | A1 | | 12/2002 | Chen |
| 2003/0102071 | A1 | | 6/2003 | Mako |
| 2003/0150614 | A1 | | 8/2003 | Brown |
| 2004/0009865 | A1 | | 1/2004 | Nair |
| 2004/0074648 | A1 | | 4/2004 | Legras |
| 2005/0028979 | A1 | | 2/2005 | Brannon |
| 2005/0244641 | A1 | | 11/2005 | Vincent |
| 2006/0042171 | A1 | | 3/2006 | Radtke |
| 2006/0046920 | A1 | | 3/2006 | Odaka |
| 2006/0069176 | A1 | | 3/2006 | Bowman |
| 2007/0022913 | A1 | | 2/2007 | Wang |
| 2007/0070957 | A1 | | 3/2007 | Schwartz |
| 2007/0099790 | A1 | | 5/2007 | Wan |
| 2008/0095942 | A1 | | 4/2008 | Sherwood |
| 2008/0241383 | A1 | | 10/2008 | Yoshino |
| 2009/0202732 | A1 | | 8/2009 | Kruger |
| 2009/0206025 | A1 | | 8/2009 | Ichikawa |
| 2009/0209405 | A1 | | 8/2009 | Fei |
| 2010/0156215 | A1 | | 6/2010 | Goertzen |
| 2010/0160104 | A1 | | 6/2010 | Dinter |
| 2011/0008236 | A1 | | 1/2011 | Hinman |
| 2011/0033708 | A1 | | 2/2011 | Harimoto |
| 2011/0045963 | A1 | * | 2/2011 | Harimoto ............ B82Y 30/00 |
| | | | | 501/154 |
| 2011/0077176 | A1 | | 3/2011 | Smith |
| 2011/0091722 | A1 | | 4/2011 | Koehne |
| 2011/0247822 | A1 | | 10/2011 | Dams |
| 2012/0121981 | A1 | | 5/2012 | Harimoto |
| 2012/0160520 | A1 | | 6/2012 | Lumbye |
| 2012/0172475 | A1 | | 7/2012 | Meador |
| 2013/0122763 | A1 | | 5/2013 | Fish |
| 2013/0319677 | A1 | | 12/2013 | Hallundbaek |
| 2014/0110110 | A1 | | 4/2014 | Rohring |
| 2014/0264984 | A1 | | 9/2014 | Kosvintsev |
| 2014/0274658 | A1 | | 9/2014 | Sherwood |
| 2014/0308585 | A1 | * | 10/2014 | Han .................. H01M 4/362 |
| | | | | 429/231.8 |
| 2014/0318799 | A1 | | 10/2014 | Moeller |
| 2014/0323364 | A1 | | 10/2014 | Sherwood |
| 2014/0326453 | A1 | | 11/2014 | Moeller |
| 2014/0343220 | A1 | | 11/2014 | Sherwood |
| 2015/0027306 | A1 | | 1/2015 | Tan |
| 2015/0175750 | A1 | | 6/2015 | Hopkins |
| 2015/0252166 | A1 | | 9/2015 | Dukes |
| 2015/0252170 | A1 | | 9/2015 | Diwanji |
| 2015/0252171 | A1 | | 9/2015 | Molnar |
| 2016/0046529 | A1 | | 2/2016 | Bricco |
| 2016/0102528 | A1 | | 4/2016 | Wise |
| 2016/0152889 | A1 | | 6/2016 | Hopkins |
| 2016/0207780 | A1 | | 7/2016 | Dukes |
| 2016/0207781 | A1 | | 7/2016 | Dukes |
| 2016/0207782 | A1 | | 7/2016 | Diwanji |
| 2016/0207783 | A1 | | 7/2016 | Hopkins |
| 2016/0207836 | A1 | | 7/2016 | Land |
| 2016/0208412 | A1 | | 7/2016 | Sandgren |

FOREIGN PATENT DOCUMENTS

| | | |
|---|---|---|
| WO | WO2013059793 | 4/2013 |
| WO | WO2016118704 | 7/2016 |

OTHER PUBLICATIONS

International Search Report and Written Opinion of the International Searching Authority, PCT/US2014/045500, dated Nov. 3, 2014.

International Search Report and Written Opinion of the International Searching Authority, PCT/US14/045497, dated Nov. 4, 2014.

International Search Report and Written Opinion of the International Searching Authority, PCT/US14/36522 dated Nov. 5, 2014.

Ganesan, G., Raghukandan, K., Karthikeyan, R., Pai B.C., Development of processing maps for 6061 Al/15% SiCp Composite Material, Materials Science and Engineering A369 (2004) 230-235, 6 pp., © 2003 Elsevier B. V.

Gao, P-C, Simon, P., Favier, F., Silicon carbide with tunable ordered mesoporosity, Microporous and Mesoporous Materials, 180 (2013) 172-177, 6 pp., journal homepage: www.elsevier.com/locate/micromeso; © 2013 Elsevier Inc.

Goela, J.S., CVD growth and characterization of [B]-SiC for IR windows, Morton Advanced Materials, 1998, 17 pp., 185 New Boston St., Woburn, MA 01801.

Goela, J.S., Taylor, R.L., Transparent SiC for mid-IR windows and domes, SPIE vol. 2286, 14 pp., Morton Advanced Materials, 185 New Boston Street, Woburn, MA 01801.

Greil, P., Advanced materials progress report on advanced engineering ceramics, Advanced Materials, Adv. Mater. 2002.14, No. 10, May 17, 8 pp., WILEY-VCH Verlag GmbH. D-69469 Weinhcim, 2002 0935-9648/02/1005-0716. © WILEY-VCH Verlag GmbH, D-69469 Weinheim. 2002.

Gumula, T., Paluszkiewicz, C., Blazewicz, S., Study on Thermal Decomposition Processes of Polysiloxane Polymers—From Polymer to Nanosized Silicon Carbide, Journal of Analytical and Applied Pyrolysis, J. Anal. Appl. Pyrolysis 86 (2009) 375-380, 6 pp., journal homepage: www.elsevier.com/locate/jaap, © 2009 Elsevier B.V.

Hamilton, H., Palladium-based membranes for , hydrogen separation, Platinum Metals Rev., 2012, 56, (2), 117-123, 7 pp., http://dx.doi.org/10.1595/147106712X632460 , © 2012 Johnson Matthey.

Handke, M., Kowalewska, A., Siloxane and silsesquioxane molecules—precursors for silicate materials, Spectrochimica Acta Part A: Molecular and Biomolecular Spectroscopy, vol. 79, Issue 4, Aug. 15, 2011, pp. 749-757., 9 pp.

Harrison, S., Marcus., H.L., Structural analysis of silicon carbide deposited by gas-phase selective area laser deposition (SALD), Institute of Materials Science. 97 North Eagleville Road , Storrs, CT 06269..3138 , (860) 486..4623 , Fax: (860) 486..4745, 471:478, 8 pp.

Hashim, J., Looney, L., Hashmi, M.S.J., The enhancement of wettability of sic particles in cast aluminum matrix composites, Journal of Materials Processing Technology 119 (2001) 329-335, 7 pp., 2001 Elsevier Science B.V.

Hayashi, T., Hydrosilylation of carbon-carbon double bonds, Chapter 7, 15 pp., Department of Chemistry, Faculty of Science, Kyoto University, Sakyo, Kyoto 606-8502. Japan.

Hellmann, J.R., Scheetz, B.E., Final report: Evaluation of proppants derived from ion exchanged mixed glass cullet for use in gas-laden shale formations, Pennsylvania State University, 2012, Project #SWC 4312 for the period Oct. 1, 2009-May 31, 2012, Contract #DE-FE003816; subaward# 4312-TPSU-DOE-3816 , Submitted to the Stripper Well Consortium, Jun. 5, 2012. 28 pp.

Henderson, D.A., Novel plezo motor enables positive displacement microfluidic pump, Presented at NSTI Nanotech 2007, 4 pp, (c) 2007 New Scale Technologies. Inc. I phone (585) 924-4450, www.newscaletech.com.

Holte, D., Flash vacuum pyrolysis, Baran Group Meeting, Apr. 21, 2012. 8 pp.

(56) References Cited

OTHER PUBLICATIONS

Howell, B.A., Alomari, M., Thermal degradation of poly(propylene oxide). 8 pp., Center for Applications in Polymer Science, Department of Chemistry, Central Michigan University, Mt. Pleasant, MI 48859-0001.
Hurwitz, F.I., Heimann, P.J., Kacik, T.A., Redistribution reactions in blackglass™ during pyrolysis and their effect on oxidative stability, Ceramic Engineering & science Proceedings, Editor John B. Wachtman, 8 pp., © 1995 The American Ceramic Society.
Hurwitz, F.I., Meador, M.A.B, Tailoring silicon oxycarbide glasses for oxidative stability, NASA Lewis Research Center, Cleveland, OH44135, 26 pp.
Hwang, Y., Riu, D-H, Kim, K-J, Chang, C-H, Porous SiOC Beads by freeze-drying polycarbosilane emulsions, Materials Letters, Mater Lett (2014), 4 pp., http://dxx.doi.org/10.1016/j.matlet.2014.05.194, © 2014 Published by Elsevier B.V.
Idesaki, A., Sugimoto, M., Yoshikawa, M., Synthesis of a porous SiC material from polycarbosilane by direct foaming and radiation curing, Innovating Processing and Manufacturing of Advanced Ceramics and Composites II, 61-69, 5 pp.
Jenšterle, J., Zornik, M., Presentation pre-development stratus of C. CAST brake disc material, 30 pp., MS Production, Slovenija.
Jeon, E., Kim, H., Yun, J., Preparation of silicon oxycarbide amorphous ceramics from polymer precursors and the characterization of their high temperature stability, Journal of Ceramic Processing Research, vol. 13, No. 3, pp. 239-242 (2012), 4 pp.
Johnson, J.S., Grobsky, K., Bray, D.J., Rapid fabrication of lightweight silicon carbide mirrors, Proc. SPIE vol. 4771. 2002, 11 pp., © 2002 SPIE.
Jüttke, Y., Richter, H., Voigt, I., Prasad, R.M., Bazarjani, M.S., Ghurlo, A., Riedel, R., Polymer derived ceramic membranes for gas separation, Chemical Engineering Transactions, vol. 32, 1891-1896, 2013,6 pp., A publication of the Italian Association of Chemical Engineering. Online at: www.aidc.it/cet , 2013, ISBN 978.88-95608-23-5; ISSN 1974-9791, © 2013, AIDIC Servizi S.r.l.
Kang, S-J, L., Park, J-H, KO. S-Y, Lee. H-Y, Solid-State Conversion of Single Crystals: The Principle and the State-of-the-Art, Journal of the American Ceramic Society, vol. 98, No. 2, Feb. 2015, 13 pp.. © 2015 The American Ceramic Society.
Kim, C.Y., Kim, S.H., Kim, H.S., Navamathavan, R., Choi, C.K., Formation mechanism and structural characteristics of low-dielectric-constant SiOC(-H) films deposited by using plasma-enhanced chemical-vapor deposition with DMDMS and O2 Precursors, Journal of the Korean Physical Society, vol. 50, No. 4, Apr. 2007, 1119-1124, 6 pp.
Kinowski, C., Bouazaoui, M., Bechara, R., Hench, L.L., Nedelec, J.M., Turrell, S., Kinetics of densification of porous silica gels: a structural and textural study, Journal of Non-Crystaltine Solids, 291 (2001) 143-152, 10 pp., © 2001 Elsevier Science B.V.
Kleebe, H-J., Turquat, C., Phase Separation in an SiCO Glass Studied by Transmission Electron Microscopy and Electron Energy-loss Spectroscopy, Journal of the American Ceramic Society, vol. 84, No. 5, 2001, 1073-1080, 8 pp.
Kullman, J., The Complicated World of Proppant Selection, Power Point, South Dakota School of Mines & Technology, Oct. 2011, 65 pp.
Laine, R.M., Babonneau, F., Preceramic Polymer Routes to Silicon Carbide, Reviews, Chem. Mater. 1993, 5, 260-279, 20 pp.
Laine, R.M., Sellinger, A., Si-containing ceramic precursors, Chapter 39, The Chemistry of Organic Silicon Compounds, vol. 2, 2245-2316, 72 pp., © 1998 John Wiley & Sons, Ltd. ISBN: 0-471-98757-2.
Launer, P.J., Infrared Analysis of Organosiiicon Compounds: Spectra-Structure Correlations, Laboratory for Materials, Inc., Burnt Hills, New York 12027, 100-103, 4 pp., Reprinted from Silicon Compounds Register and Review, Edited by B., Ankles, et al, 1987, Petrarch Systems.
Lee, R., Carbosilanes: Reactions & Mechanisms of SMP-10 Pre-Ceramic Polymers, Marshall Space Flight Center, Jacobs ESTS Group/ ICRC, Jul. 2009, 23 pp.
Leslie, C.J., Kim H.J., Chen, H., Walker, K.M., Boakye, E.E., Chen, C. Carney, C.M., Cinibulk, M.K., Chen, M.-Y., Polymer-Derived Ceramics for Development of Ultra-High Temperature Composites, Innovative Processing and Manufacturing of Advanced Ceramics and Composites II, 33-45, 7 pp.
Lewis, L.N., Stein, J., Gao, Y., Colborn, R.E., Hutchins, G., Platinum catalysts used in the silicones industry their synthesis and activity in hydrosilylation, Platinum Metals Rev., 1997, 41, (2), 66-75, 10 pp.
Li, Y., Wu, D., Chang, L., Shi, Y., Wu, D., Fang, Z., A Model for the Bulk Crushing Strength of Spherical Catalysts, Ind. Eng. Chem. Res. 1999, 38, 1911-1916, 6 pp.
Liang, T., Li, Y-L, Su, D., Du, H.-B., Silicon oxycarbide ceramics with reduced carbon by pyrolysis of polysiloxanes in water vapor, Journal of the European Ceramic Society 30 (2010) 2677-2682, 6 pp.
Linck, C., Ionescu, E., Papendorf, B., Galuskova, D., Galusek, D., Sajgalík, P., Riedel R., Corrosion behavior of silicon oxycarhide-based ceramic nanocomposites under hydrothermal conditions, Int. J. Mat. Res. (formerly Z. Metallkd.) 103 (2012) 1, 31-39, 9 pp., International Journal of Materials Research downloaded from www.hanser-elibrary.com by Mr. Mark Land on Jan. 3, 2014 for personal use only.
Linsmeier, K. D., Technical Ceramics, The material of choice for the most demanding applications, CeramTec GmbH-1, 73207 Plochingen, www.ceramtec.com, Verlag Moderne Industrie, 2011, 85 pp., All rights reserved with Süddeutscher Verlag onpact GmbH, 81677 Munich, www.sv-onpact.de.
Liu, P. KT, Development of Hydrogen Selective Membranes/Modules as Reactors/Separators for Distributed Hydrogen Production, DE-FG36-056015092, May 18-22, 2009, 23 pp., Media and Process Technology Inc., Pittsburgh, PA 15238.
Liu, C-Y., Liao, N-B., Yang, Y., Zhang, J-L, Effect of Sputtering Power on Nano-mechanical Properties of SiCO Film, International Conference on Material Science and Application (ICMSA 2016), 1037-1041, 5 pp.
Liu. X., Li, Y-L, Hou, F., Fabrication of SiOC Ceramic Microparts and Patterned Structures from Polysiloxanes via Liquid Cast and Pyrolysis, J. Am. Ceram. Soc., 92 [1] 49-53 (2009), 5 pp., DOI: 10.1111/j.1551-2916.2008.02849.x, © 2008 The American Ceramic Society.
Liu, C., Chen. H.Z., Komarneni, S., Pantano, C.G., High Surface Area SiC/Silicon Oxycarbide Glasses Prepared from Phenyltrimethoxysilane-Tetramethoxysilane Gels, Journal of Porous Materials 2, 245-252 (1996), 8 pp., 1996 Kluwer Academic Publishers, Manufactured in The Netherlands.
Louette, P., Bodino, F., Pireaux, J-J., Poly (methyl hydrogen siloxane) (PMHS) XPS Reference Core Level and Energy Loss Spectra, Surface Science Spectra, vol. 12, 2005, 1055-5269/2005/12/133/6 © 2006 American Vacuum Society 133.
Lu., B. Zhang, Y., Densification behavior and microstructure evolution of hot-pressed SiC—SiBCN ceramics, Science Direct, Ceramics International 41(2015) 8541-8551, 11 pp., http://dx.doi.org/10.1016/j.ceramint.2015.03.0610272-8842 © 2015 Elsevier Ltd and Techna Group S.r.l.
Mack, M.G., Coker, C.E., Development and Field Testing of Advanced Ceramic Proppants, Society of Petroleum Engineers, 2013, SPE 166323, 16 pp, Prepared for presentation at the SPE Annual Technical Conference and Exhibition held in New Orleans, Louisiana, USA, Sep. 30-Oct. 2, 2013.
Malczewski, R.M., Jahn, D.A., Schoenherr, W.J., Peroxide or Platinum? Cure System Considerations for Silicone Tubing Applications, Dow Corning Healthcare, 2003, 5 pp., Dow Corning Corporation, Printed in USA Form No. 52-1077-01.
Martínez, F.L., Ruiz-Merino, R., Del Prado, A., San Andres, E., Mártil, I., González-Diaz, G., Jeynes, C., Barradas, N.P., Wang, L., Reehal, H.S., Bonding structure and hydrogen content in silicon nitride thin films deposited by the electron cyclotron resonance plasma method, 12 pp. This work was partially supported by the Ministry of Science and Technology (Spain) under contract TIC2001/1253.
Meador, M.A.B., Hurwitz, F.I., Gonczy, S.T., NMR Study of Redistribution Reactions in Blackglas™ and Their Influence on

(56) References Cited

OTHER PUBLICATIONS

Oxidative Stability, Ceramic Engineering & Science Proceedings, Victor Greennut, 1996, The American Ceramic Society 394-400, 7 pp.

Meals, R.N., Hydrosilation in the synthesis of organosilanes, 141-157, 17 pp., Silicone Products Department, General Electric Co., Waterford, New York.

Mera, G., Navrotsky, A., Sen, S., Kleebed, H-J., Riedel, R., Polymer-derived SiCN and SiOC ceramics-structure and energetics at the nanoscale, Journal of Materials Chemistry A, J. Mater, Chem. A, 2013, 1, 3826-3836, 11 pp., DOI: 10.1039/c2ta00727d, © The Royal Society of Chemistry 2013, RSC Publishing.

Wu, Jiquan, Li, Y., Chen, L., Zhang, Z., Wang, D., Xu, C., Simple fabrication of micro/nano-porous SiOC foam from polysiloxane, communication, Journal of Materials Chemistry, J. Mater. Chem., 2012, 22, 6542-6545, 4 pp., © The Royal Society of Chemistry 2012.

Yazdanfar, M., Pedersen, H., Sukkaew, P., Ivanov, I.G., Danielsson, O., Kordina, O., Janzén, E., On the Use of Methane as a Carbon Precursor in Chemical Vapor Deposition of Silicon Carbide, Journal of Crystal Growth, 390 (2014) 24-29, 6 pp., Available online Dec. 27, 2013, © 2013 Elsevier.

Yeo, I-G, Lee, T-W, Lee, W-J., Shin, B-C, Choi, J-W, KU, K-R, Kim, Y-H, The Quality Investigation of 6H-SiC Crystals Grown by a Conventional PVT Method With Various SiC Powders, Transactions on Electrical and Electronic Materials, vol. 11, No. 2, pp. 61-64, 4 pp., Apr. 25, 2010, ©2010 KIEEME.

Yilmaz, O., Buytoz, S., Abrasive wear of Al2O3-reinforced aluminum-based MMCs, Composites Science and Technology 61 (2001) 2381-2392, 12 pp., © 2001 Published by Elsevier Science Ltd., PII: S0266-3538(01)00131-2.

Yoo, K-C, Ruderman, W., Growth of Single Crystal Beta Silicon Carbide, Phase I, Final Report for the period Jul. 1992 through Dec. 1992, Office of Naval Research, Washington, DC, Contract N00014-92-C-0127, INRAD, Inc. Northvale, NJ 07647, 33 pp.

Yoon. J.L., Kim, J. II, Kim, S.R, Kwon, W.T., Shin, D-G., Kim, Y., Fabrication of SiOC/C coatings on stainless steel using poly(phenyl carbosilane) and their anti-corrosion properties, Innovative Processing and Manufacturing of Advanced Ceramics and Composites II, 71-77, 4 pp.

Zhmakin, A.I., Modelling of Heat Transfer in Single Crystal Growth, Ioffe Physical Technical Institute, Russian Academy of Sciences, St. Petersburg, Russia, Softimpact Ltd., P.O. 83, 194156 St. Petersburg, Russia, 25 pp.

Dvornic, P.R., Thermal properties of polysiloxanes, Chapter 7, R.G. Jones et al., (eds.), Silicon-Containing Po9lymers, 185-212, © 2000 Kluwer Academic Publishers. Printed in the Netherlands, 28 pp.

Sahin, Y., Preparation and some properties of SiC particle reinforced aluminum alloy composites, Materials and Design 24 (2003) 671-679, 9 pp., © 2003 Elsevier Science Ltd., doi:10.1016/S0261-3069(03)00156-0.

Salemi, S., Density Functional and Monte Carlo-Based Electron Transport Simulation in 4H-SiC(0001)/SiC(0001)/SiO2 DMOSFET Transition Region, 978-1-4673-5738-4/13/, © 2013 IEEE, 180-183, 4 pp.

Schawe, J., Riesen, R., Widmann, J., Schubnel, M., Jörimann, U., UserCom Jan. 2000, Information for Users of Meter Toledo thermal analysis systems, Brochure, 28 pp., Redaktion, Mettler Toledo GmbH, Analytical, Sonnenbergstrasse 74, CH-8603 Schwerzenhach, Schweiz.

Schiavion, M.A., Gervais, C., Babonneau, F., Soraru, G.D., Crystallization Behavior of Novel Silicon Boron Oxycarbide Glasses, Journal of American Ceramic Society. vol. 87, No. 2. 203-208, 6 pp.

Schiavion, M.A., Redondo, S.U.A., Pina, S.R.O., Yoshida, I.V.P., Investigation on Kinetics of Thermal Decomposition in Polysiloxane Networks Used as Precursors of Silicon Oxycarbide Glasses, Journal of Non-Crystalline Solids, Jun. 2002. DOI: 10.1016/S0022-3093(02)01009-8, Journal of Non-Crystalline Solids 304 (2002) 92-100, 10 pp.

Schiavon, M.A., Armelin, N.A., Yoshida, I.V.P., Novel poly(borosiloxane) Precursors to Amorphous SiBCO Ceramics, Materials Chemistry and Physics, vol. 112, Issue 3, Dec. 20, 2008, pp. 1047-1054.

Schoenung, J.M., Kraft, E.H., Ashkin, D., Advanced silicon nitride components: A cost analysis, Ceramic Engineering and Science Proceedings), 497-504, 8 pp., Ersan Ustundag & Gary Fischman, © 1999 The American Ceramic Society.

Sehsc, Materials handling guide: Hydrogen-bonded silicon compounds developed by the operating safety committee of the silicones environmental, 39 pp., Health and Safety Council of North America, SiH Materials Handling Guide, Aug. 2007, 39, pp.

Serra, J., González, P., Liste, S., Serra, C., Chiussi, S., León, B.. Pérez-Amor, M., Ylänen, H.O., Hupa, M., FTIR and XPS studies of bioactive silica based glasses, Journal of Non-Crystalline Solids 332 (2003) 20-27, 8 pp., © 2003 Elsevier B.V.

Shao, X., Dong, D., Parkinson, G., Li, C-Z., A Microchanneled Ceramic Membrane for Highly-Efficient Oxygen Separation, 7 pp., Electronic Supplementary Material (ESI) for Journal of Materials Chemistry A, This journal is © The Royal Society of Chemistry 2013.

Shorowordi, K.M., Laoui, T., Haseeb, A.S.M.A., Celis, J.P., Froyen, L., Microstructure and interface characteristics of B4C, SiC and Al2O3 reinforced Al matrix composites: a comparative study, Journal of Materials Processing Technology 142 (2003) 738-743, 6 pp, © 2003 Elsevier B.V.

SID Richardson Carbon Company, Making Carbon Black, Graphics by Fred Hendrickson, Slides 37 pp.

Smoak, R.H., Kraft, E.H., Sintered Alpha Silicon Carbide: Some Aspects of the Microstructure-Strength Relationship, 9 pp., The Carborundum Company Alpha Silicon Carbide Division, Niagara Falls, New York 14302, Presented at Fall Meeting American Ceramic Society, Sep. 27, 1977, Hyannis, Massachusetts.

Sone, H, Kaneko, T., Miyakawa, N., In Situ Measurements and Growth Kinetics of Silicon Carbide Chemical Vapor Deposition From Methyltrichlorosilane, Journal of Crystal Growth 219 (2000) 245-252, 8 pp., © 2003 Elsevier Science B.V.

Soraru, G.D., Modena, S., Chemical durability of silicon oxycarbide glasses, J. Am. Ceram. Soc., 85 [6] 1529-35 (2002), 8 pp.

Soraru, G.D., Dallapiccola, E D'Andrea, G., Mechanical characterization of sol-gel-derived silicon oxycarbide glasses, J. Am. Ceram. Soc., 79 [8] 2074-80 (1996), 5 pp.

Soraru, G.D., Walter, S., Brequel, H. Enzo, S., Microstructural and mechanical characterization of sol gel-derived Si—O—C Glasses, Journal of the European Ceramic Society, Dec. 22, 2002, (2002) 2389-2400, 12 pp.

Soraru, G.D, Dalcanale, F., Campostrini, R., Gaston, A., Blum, Y., Carturan, S., Aravind, P.R., Novel polysiloxane and polycarbosilane aerogels via hydrosilylation of preceramic polymers, Communication, Journal of Materials Chemistry, J. Mater. Chem., 2012, 22, 7676-7680, 5 pp.

Soraru, G.D., Pederiva, L., Latournerie, J., Raj, R., Pyrolysis kinetics for the conversion of a polymer into an amorphous silicon oxycarbide ceramic, J. Am. Ceram. Soc., 85 [9] 2181-87 (2002), 7 pp.

Soraru, G.D., Liu, Q., Interrante, L.V., Apple, T., Role of Precursor Molecular Structure on the Microstructure and High Temperature Stability of Silicon Oxycarbide Glasses Derived from Methylene-Bridged Polycarbosilanes, Chem. Mater, 1998, 10, 4047-4054, 8 pp., Published on Web Nov. 17, 1998, © American Chemical Society.

Soraru, G.D., D'Andrea, G., Campostrini, R., Babonneau, F., Mariotto, G., Structural Characterization and High-Temperature Behavior of Silicon Oxycarbide Glasses Prepared from Sol-Gel Precursors Containing Si-H Bonds, J. Am. Ceram. Soc., 78 [2] 379-87 (1995), 9 pp.

Soukiassian, P., Amy, F., Silicon Carbide Surface Oxidation, Research Highlights, NSRRC Activity Report 2002/2003, 4 pp.

Sousa, B.F, Valeria, I., Yoshida, P., Ferrari, J.L., Schiavon, M.A., Silicon Oxycarbide Glasses Derived From Polymeric Networks with Different Molecular Architecture Prepared by Hydrosilylation Reaction, J Mater Sci (2013) 48:1911-1919, 9 pp., DOI 10.1007 /s

(56) References Cited

OTHER PUBLICATIONS 10853-0 12-6955-4, Published online: Oct. 26, 2012, Copyright Springer Science+Business Media New York 2012.

SRI International, Ceramic Composites, website jpeg, 1 pp.

Strachota, A., Cerný, M., Glogar, P., Sucharda, Z., Havelcová, M., Chlup, Z Dlouhá, I., Kozák, V., Preparation of Silicon Oxycarbide Composites Toughened by Inorganic Fibers via Pyrolysis of Precursor Siloxane Composites, 12 Annual Conference of the Materials Research Society of Serbia, Herceg Novi, Montenegro, Sep. 6-10, 2010, ACTA Physica Polonica A, vol. 120 (2011), No. 2, 5 pp.

Su, D., Li, Y-L, An, H-J, Liu, X., Hou, F., Li, J-Y, Fu, X., Pyrolytic Transformation of Liquid Precursors to Shaped Bulk Ceramics, Journal of the European Ceramic Society, vol. 30, Issue 6, Apr. 2010, pp. 1503-1511.

Suárez, M., Fernández, A., Menéndez, J.L., Torrecillas, R., Kessel, H.U., Hennicke, J., Kirchner, R., Kessel, T., Challenges and Opportunities for Spark Plasma Sintering: A Key Technology for a New Generation of Materials, Chapter 13, 23 pp., INTECH, © 2013 Suarez et al, licensee InTech.

Suh, M,H., Kwon, W-T., Kim, E.B., Kim, S-R., Bae, S.Y., Choi, D.J. Kim, Y., H2 Permeable Nanoporous SiC Membrane for an IGCC Application, Journal of Ceramic Processing Research, vol. 10, No. 3 pp., 359-363 (2009,) 5 pp.

Syväjärvi, M., Yakimiova, R., Tuominen, M., Kakanakova-Georgieva, A., MacMillan, M.F., Henry, A., Wahab, Q., Janzen, E., Growth of 6H and 4H-SiC by Sublimation Epitaxy, Journal of Crystal Growth 197 (1999) 155-162, 8 pp., © 1999 Elsevier Science B.V.

TATA Chemicals Europe Limited, Solubility of Sodium Bicarbonate in Water, United Kingdom, 1 pp., www.tatachemicals.com.

Transmission Electron Microscopy, 111-136, 26 pp.

Tian, H. Ma, Q-S., Pan, Y., Liu, W., Structure and Mechanical Properties of Porous Silicon Oxycarbide Ceramics Derived from Silicone Resin with Different Filler Content, SciVerse ScienceDirect, Ceramics International 39 (2013) 71-74, 4 pp., © 2012 Elsevier Ltd. and Technical Group S.r.l.

Tomar, V., Nanocomposite Ceramics—What are Nanocomposite Ceramics?, Nanatechnology Thought Leaders—Insights from the World's Leading Players, 9 pp., Saved from URL http://www.azonano.com/article_aspx?ArticleID=250t.

Toney, F.L., Mack, D.J., The Next Generation of Foam: A Field Study of Northwestern Oklahoma Foam Fracturing, SPE 21644, 113-123, 11 pp., This paper was prepared for presentation at the Production Operations Symposium held in Oklahoma City, Oklahoma, Apr. 7-9, 1991, Copyright 1991, Society of Petroleum Engineers, Inc.

Topuz, B., Simsek, D., Ciftcioglu, M., Preparation of monodisperse silica spheres and determination of their densification behavior, Science Direct, Ceramics International 41(2015) 43-52, 10 pp., © 2014 Elsevier Ltd. and Technical Group S.r.l.

Trottier, R., Dhodapkar, S., A Guide to Characterizing Particle Size and Shape, Instrumentation, CEP, Jul. 2014, 36-46, 11 pp.

Twigg, M.V., Richardson, J.T., Fundamentals and Applications of Structured Ceramic Foam Catalysts, Ind. Eng. Chem. Res. 2007, 48, 4166-417, 16 pp., 2007 American Chemical Society, Published on Web Feb. 24, 2007.

Ujihara, T., Maekawa, R., Tanaka, R., Sasaki, K., Kuroda, K., Takeda, Y., Solution Growth of High-Quality 3C-SIC crystals, Journal of Crystal Growth 310 (2008) 1438-1442, 5 pp., Available online Jan. 15, 2008, Science Direct, © 2007 Elsevier B.V.

Vakifahmetoglu, C., Colombo, P., A Direct Method for the Fabrication of Macro-Porous SiOC Ceramics from Preceramic Polymers, Advanced Engineering Materials 2008, 10, No. 3, 4 pp., DOI: 10.1002/adem.200700330, 256, © 2008 Wiley-VCH Verlag GmbH & Co. KGaA,Weinheim.

Vakifahmetoglu, C.. Menapace, I., Hirsch, A., Biasetto, L., Hauser, R., Riedel, R., Colombo, P., Highly Porous Macro-and Micro-Cellular Ceramics from a Polysilazane Precursor, Ceramics International 35 (2009) 3281-3290, 10 pp., Science Direct, Available online Jun. 18, 2009, © 2009 Elsevier Ltd. and Technical Group S.r.l.

Van Der Vlis, A.C., Haafkens, R., Schipper, B.A., Visser, W., Criteria for Proppant Placement and Fracture Conductivity, Society of Petroleum Engineers of AIME, SPE 5637, 15 pp., Copyright 1975, American Institute of Mining, Metallurgical, and Petroleum Engineers, Inc.

Wacker, SILRES®MSE 100:A Unique Silicone Resin that Cures at Room Temperature, Wacker Chemie AG, 81737 München, Germany, 2 pp.

Walter, S, Soraru, G.D., Breqijel, H., Enzo, S., Microstructural and mechanical characterization of sol gel-derived Si—O—C glasses, Journal of the European Ceramic Society 22 (2002) 2389-2400, 12 pp., © 2002 Published by Elsevier Science Ltd.

Wang, F., Gill, W.N, Kirk, C.A., Apple, T., NMR characterization of postcure temperature effects on the microstructures of Blackglas™ Resin and Ceramic, Journal of Non-Crystalline Solids 275 (2000) 211-215, 6 pp, , © 2000 Published by Elsevier Science B.V.

Wang, F., Apple, T., Gill, W.M., Thermal Redistribution Reactions of Blackglas™ Ceramic, Journal of Applied Polymer Science, vol. 81, 143-152 (2001), 10 pp, © 2001 John Wiley & Sons, Inc.

Wang, S.F., Zhang, J, Luo, D.W., Gu, F., Tang. D.Y., Dong, Z.L., Tan, G.E.B., Que, W.X., Zhang, T.S., Li, S., Kong, L.B., Transparent Ceramics: Processing. Materials and Applications, Progress in Solid State Chemistry 41 (2013) 20-54, 34 pp., , © 2012 Published by Elsevier Ltd.

Wijesundara, M.B.J., Azevedo, R., SiC Materials and Processing Technology, Chapter 2, Silicon Carbide Microsystems for Harsh Environments, MEMS Reference Shelf 22, DOI 10.1007/978-1-4419-7121-0 2, 33-95, 63 pp., © Springer Science+Business Media, LLC 2011.

Wiley, John & Sons, Inc., Phenolic resins, Encyclopedia of Polymer Science and Technology, vol. 7, 322-368, 47 pp., © John Wiley & Sons, Inc.

Witucki, G.L., A silane primer: Chemistry and applications of aikoxy silanes, Back to Basics, Reprinted from Jul. 1993 Issue of the Journal of Coatings Technology, vol. 65, No. 822, 57-60. 4 pp., Copyright 1993 by the Federation of Societies for Coatings Technology, Blue Bell, PA USA, Presented at the 57th Annual Meeting of the Federation of Societies of Coatings Technology on Oct. 21, 1992 in Chicago, IL.

Wright, P.V., Beevers, M.S., Preparation of cyclic polysiloxanes, Chapter 3, 25 pp.

Microsemi PPG, Gallium Nitride (GaN) versus Silicon Carbide (SiC) In the High Frequency (RF) and Power Switching Applications, 8 pp., Digikey.com.

Miracle, D. B., Donaldson, S.L., Introduction to Composites, Air Force Research Laboratory, 15 pp.

Mixing and Agitation, Chapter 10, 287-304, 18 pp.

Modern Dispersons' Insights on Carbon Black Fundamentals, 8 pp., 78 Marguerite Ave., Leonminster, MA 01453-4227 USA, www.moderndispersons.com.

Montgomery, D.C., Runger, G.C., Applied Statistics and Probability for Engineers, Third Edition, 976 pp., Copyright 2003 © John Wiley & Sons, Inc., Library of Congress Cataloging-in-Publication Data, Includes bibliographical references and index., ISBN 0-471-20454-4 (acid-free paper), 1. Statistics. 2. Probabilities. I. QA276.12.M645 2002. 519.5-dc21, 2002016765, Printed in the United States of America., 10 9 8 7 6 5 4 3 2 1.

Morcos, R.M., Navrotsky, A., Varga,T., Blum, Y., Ahn, D., Poli, F., Müller, K. Raj, R., Energetics of SixOyCz polymer-derived ceramics prepared under varying conditions, Journal of the American Ceramic Society, 2008. J. Am. Ceram. Soc. 91 [9] 2959-2974 (2008), 6 pp., © 2008 The American Ceramic Society.

Moysan, C., Riedel, R., Harshe, R., Rouxel, T., Augereau, F., Mechanical characterization of a polysiloxane-derived SiOC Glass, Journal of the European Ceramic Society 27 (2007) 397-403, 7 pp.

Myers, R., Potratz, J., Moody, M., Field application of new lightweight proppant in appalachian tight gas sandstones, Society of Petroleum Engineers Inc., Sep. 2004, SPE 91469, 9 pp., Prepared for presentation at the2004 SPE Eastern Regional Meeting, Charleston, WV., Copyright 2004 Society of Petroleum Engineers.

(56) References Cited

OTHER PUBLICATIONS

Mynbaeva, M.G., Abramov, P.L., Lebedev, A.A., Tregubova, A.S., Litvin, D.P., Vasiliev. A.V., Chemekova, T.Y., Makarov, Y.N., Fabrication of improved-quality seed crystals for growth of bulk silicon carbide, fabrication, treatment, and testing of materials and structures, Semiconductors, vol. 45, No. 6, 2011, 826-831, 4 pp.

Narisawa, M., Iwase, A., Watase, S., Matsukawa, K., Kawai, T., Photo luminescent properties of polymer derived ceramics at near stoichiometric $SiO_2$-xSiC-y(H) compositions, Innovative Processing and Manufacturing of Advanced Ceramics and Composites II, 79-84, 4 pp.

Narisawa, M., Silicone resin applications for ceramic precursors and composites, Review, Materials 2010, 3, 3518-3536: 19 pp., doi:10.3390/ma3063518, Materials, ISSN 1996-1944.

NEXTELTM, 3M, Ceramic Textiles Technical Notebook, www.3M.com/ceramics, 98/0400-5870-7, Nov. 2004, 55 pp.

Nguong, C, W., Lee, S. N. B., Sujan, D., A Review on Natural Fibre Reinforced Polymer Composites, World Academy of Science, Engineering and Technology, International Journal of Chemical, Molecular, Nuclear, Materials and Metallurgical Engineering vol. 7, No. 1, 2013, International Scholarly and Scientific Research & Innovation 7(1) 2013. 8 pp., International Science Index, vol. 7, N:1, 2013, waset.org/Publication/6783.

Norris, A., Silicones: ideal material solutions for the photovoltaic industry, Photovoltaics International, www.pv-tech.org., 3 pp., ©2008 Dow Corning.

Nyczyk-Maunowska, A., Wójcik-Bania, M., Gumula, T., Hasik, M., Cypryk, M. Olejniczak, Z., New Precursors to SiCO Ceramics Derived from Linear Poly(vinylsiloxanes) of Regular Chain Composition, Feature Article, ScienceDirect, Journal of the European Ceramic Society 34 (2014) 889-902, 14 pp., © 2013 Elsevier Ltd.

Nyczyk, A., Paluszkiewicz, C., Pyda, A., Hasik, M., Preceramic polysiloxane networks obtained by hydrosityalation of 1,3,5,7-tetravinyl-1 ,3,5,7-tetramethylcyclotetrasiloxane, Spectrochimica Acta Part A: Molecular and Biomolecular Spectroscopy, Spectrochimica Acta Part A 79 (2011) 801-808, 8 pp.

Orion, Carbon Black Pigments for Industrial Coatings, Technical Information 1458, 12 pp., 2013 Orion Engineered Carbons GmbH, Dec-3146 Dec. 2013.

Oteo, J.L., Mazo, M.A., Palencia, C., Rubio, F., Rubio, J., Synthesis and characterization of silicon oxycarbide derived nanocomposites obtained through ceramic processing of TEOS/PDMS preceramic materials, Journal of Nano Research vol. 14 (2011) pp. 27-36, 15 pp., © 2011 Trans Tech Publications. Switzerland, doi: 10.4028/www.scientijic.net/JNanoR.14.27, Online available since Apr. 14, 2011 at www.scientific.net.

Palisch, T., Duenckel, R., Chapman, M., Woolfork, S., Vincent. M.C., How to Use and Misuse Proppant Crush Tests—Exposing the Top 10 Myths, SPE 119242, 15 pp., Copyright 2009, Society of Petroleum Engineers, This paper was prepared for presentation at the 2009 SPE Hydraulic Fracturing Technology Conference held in the Woodlands, Texas, USA, Jan. 19-21, 2009.

Pantano, C.G., Singh, A.K., Zhang, H., Silicon oxycarbide glasses, Journal of Sol-Gel Science and Technology 14, 7-25 (1999), 19 pp., © 1999 Kluwer Academic Publishers. Manufactured in the Netherlands.

Parameters, Basic Parameters of Silicon Carbide (SiC), SiC Silicon Carbide, 5 pp., www.ioffe.rssi.ru/SVA/NSM/Semicond/SiC/basic.html.

Park, H-K, Sung, I-K, Kim, D-P, A facile route to prepare high surface area mesoporous SiC From $SiO_2$ sphere templates, J. Mater. Chem., 2004, 14, 3436-3439, 4 pp., First published as an Advance Article on the web Sep. 22, 2004, Purchased by davis.rand @mellorinnovations.com on Oct. 6, 2015.

Park, H.., Review on the Current Status of Magnesium Smelting, Geosystern Engineering, 11(1), (Mar. 13-18, 2008), 6 pp.

Pearson. C.M., Griffin, Wright, C., Weijers, L., Breaking Up Is Hard to Do: Creating Hydraulic Fracture Complexity in the Bakken Central Basin, SPE 163827, 15 pp., Copyright 2013, Society of Petroleum Engineers.

Pearson, C. M., Griffin, L., Chikaloff, J., Measuring Field Supplied Proppant Conductivity—Issues Discovered in an Operator's Multi-Year Testing Program in the Bakken Shale, SPE 168641, 12 pp., Copyright 2014, Society of Petroleum Petroleum Engineers.

Pena-Alonso, R., Rubio, J., Rubio, F., Oteo. J.L.. FT-IR and Porosity Study of Si—B—C—O Materials Obtained from TEOS-TEB-PDMS Derived Get Precursors, Journal of Sol-Gel Science and Technology 26, 195-199, 5 pp., 2003, © 2003 Kluwer Academic Publishers. Manufactured in the Netherlands.

Pippel, E., Lichtenberger. O., Woltersdorf, J., Identification of silicon oxycarbide bonding in Si—C—O-glasses by EELS, 2 pp., Journal of Materials Science Letters, 19, 2000, 2059-2060, © 2000 Kluwer Academic Publishers.

Pitcher, M.W., Joray, S.J., Bianconi, P.A., Smooth Continuous Films of Stoichiometric Silicon Carbide from Poly (methylsilyne), Adv. Mater, 2004, 16, No. 8, Apr. 19, 4 pp., © 2004 WILEY-VCH Verlag GmbH & Co. KGaA, Weinheim DOI: 10.1002/adma.200306467.

Plawsky, J.L., Wang, F., Gill, W.N., Kinetic Model for the Pyrolysis of Polysiloxane Polymers to Ceramic Composites, AIChE Journal, Oct. 2002, vol. 48, No. 10, 2315-2323, 9 pp.

Poddar, P., SrVastava, V.C., DE, P.K., Sahoo, K.L., Processing and mechanical properties of SiC reinforced cast magnesium matrix composites by stir casting process, Materials Science and Engineering A 460-461 (2007) 357-364, 8 pp., © 2007 Elsevier B.V.

Polymer to Ceramic Transformation, [Image], 1 pp.

Pomorski, T. A., Bittel, B. C., Lenahan, P. M., Mays, E., Ege, C., Bielefeld, J., Michalak, D., King, S. W., Defect Structure and Electronic Properties of SiOC:H Films Used for Back End of Line Dielectrics, Journal of Applied Physics 115, 234508 (2014), 21 pp., doi: 10.1063/1.4882023, AIP Publishing.

Post, T., Understanding the Real World of Mixing, CEP Mar. 2010. 25-32, 8 pp.

Pradeep, V.S., Study of silicon oxycarbide (SiOC) as anode materials for Li-ion batteries, Dec. 2013, 178 pp., Doctoral School in Materials University of Trento, Italy, Department of Industrial Engineering, Advisor: Prof. Gian Domenico Soraru, Co-Advisor: Dr.-Ing. Magdalena Graczyk-Zajac.

Qian, B., Shen, Z., Laser sintering of ceramics, Journal of Asian Ceramic Societies 1 (2013 ) 315-321; 7 pp., ScienceDirect, © 2013 The Ceramic Society of Japan and the Korean Ceramic Society, Production and Hosting by Elsevier B.V.

Raj, R., Riedel, R., Soraru, G.D., Introduction to the Special Topical Issue on Ultrahigh-Temperature Polymer-Derived Ceramics, Ultrahigh-Temperature Ceramics, J. Am. Ceram. Soc., 84 [10] 2158-59 (Oct. 2001), 2 pp.

Rangarajan, S., Aswath, P.B., Role of Precursor Chemistry on Synthesis of Si—O—C and Si—O—C—N Ceramics by Polymer Pyrolysis, Journal of Materials Science, Apr. 2011, J Mater Sci (2011) 46:2201-2211, 14 pp, DOI: 10.1007/s10853-010-5058-3, Published online: Nov. 24, 2010, Springer Science+Business Media, LLC 2010.

Rashed, A.H., Properties and Characteristics of Silicon Carbide, 22 pp., Copyright 2002 Poco Graphite, Inc., Decatur, TX 76234.

Raysoni, N. Weaver, J., Long-term proppant performance, SPE 150669, 16 pp., Copyright 2012, Society of Petroleum Engineers, This paper was prepared for presentation at the SPE International Symposium and Exhibition on Formation Damage Control held in Lafayette, Louisiana, USA, Feb. 15-17, 2012.

Renlund, G.M., Prochazka, S., Doremus, R.H., Silicon oxycarbide glasses: Part I. preparation and chemistry. J. Mater. Res., vol. 6, No. 12, Dec. 1991, 2716-2722, 7 pp., © 1991 Materials Research Society.

Renlund, G.M., Prochazka, S., Doremus, R.H., Silicon oxycarbide glasses: Part II structure and properties, J. Mater. Res., vol. 6, No. 12, Dec. 1991, 2723-2734, 12 pp.

Revis, A., Discussion Sides, Phone Conference, Aug. 4, 2015, 1:30 p. m., 20 pp.

Roewer, G., Herzog, U., Trommer, K. Müller, E., Frühauf, S., Silicon Carbide—A Survey of Synthetic Approaches, Properties and Applications, Structure and Bonding, vol. 101, 59-135, 77 pp., © Springer-Verlag Berlin Heidelberg 2002.

(56) References Cited

OTHER PUBLICATIONS

Rogers Corporation, Silicone Materials Selection Guide, Bisco Silicones, Brochure, High Performance Foams Division, Carol Stream, IL, USA, 9 pp., Printed in USA, 1110-1111-5.0AG, Publication #180-016.

Romero, M., Rawlings, R.D, Rincón, J.Ma., Nucleation and crystal growth in glasses from inorganic wastes from urban incineration, Journal of Non-Crystalline Solids, 271 (2000) 1-2, 106-118; DOI: 10.1016/S0022-3093(00) 00082-X, 20 pp.

Rouxel, T., Elastic Properties and Short-to Medium-Range Order in Glasses, J. Am. Ceram. Soc., 90 [10] 3019-3039 (2007), 21 pp., DOI: 10.1111/j.1551-2916.2007.01945.x, © 2007, The American Ceramic Society.

Ryan, J.V., Free Carbon Structure in Silicon Oxycarbide Thin Films, A Thesis in Materials Science and Engineering, 2007, 175 pp., The Pennsylvania State University Graduate School, Copyright © 2007 Joseph. V. Ryan, Submitted in Partial Fulfillment of the Requirements for the Degree of Doctor of Philosophy, Dec. 2007.

Saha, A., Raj, R., Williamson, D.L., A Model for the nanodomains in polymer-derived SiCO, J. Am. Ceram. Soc., 89 [7] 2188-2195 (2006), 8 pp., vol. 89. No. 7.,© 2006 The American Ceramic Society.

Saha, A., Raj, R., Crystallization maps for SiCO amorphous ceramics, J. Am. Ceram. Soc., 90 [2] 578 583 (Feb. 2007), 7 pp., © 2006 The American Ceramic Society.

Sahimi, M., Tsotsis, T., Rahn, L., Nanoporous membranes for hydrogen production: Experimental studies and molecular simulations. 3 pp., 2013 Annual Merit Review and Peer Evaluation Meeting, DOE Hydrogen and Fuel Cells Program.

EEMS, CSO 110 HT Product Data Sheet, Polycarbosiloxane liquid polymer for high temperature ceramic applications, Feb. 2010, 2 pp.

EEMS, CSO 111 HT Product Data Sheet, Stabilized polycarbasiloxane liquid polymer for high temperature ceramic applications, May 2010, 3 pp.

EEMS, CSO 121 Product Data Sheet, Polycarbosiloxane liquid polymer for fire-resistant non-ceramic applications and high temperature ceramic applications, Mar. 2010, 3 pp.

EEMS, CSO 300, 305, 310, 320 Products Data Sheet, Polycarbosiloxane liquid polymers, Jul. 10, 2010, 3 pp.

EEMS, CSO 315 Product Data Sheet, Polycarbosiloxane liquid polymer for pre-preg molding nd wet lay-up processing of fiber reinforced composites, Sep. 2011, 1 pp.

EEMS, 500 Series Product Data Sheet, Liquid polymers very high temperature ceramic applications, Jun. 2012, 3 pp.

EEMS, CSO 110 HT Material Safety Data Sheet, Feb. 26, 2010, 4 pp.

EEMS, CSO 121 HT Material Safety Data Sheet, Jun. 7, 2011, 4 pp.

EEMS, CSO 131 & 130 Material Safety Data Sheet, Jun. 27, 2012, 4 pp.

EEMS, CSO 230 Material Safety Data Sheet. Jun. 5, 2011, 4 pp.

EEMS, CSO 310 HT Material Safety Data Sheet, Jun. 7, 2010, 4 pp.

EEMS, CSO 350 Material Safety Data Sheet, Jun. 7, 2010, 4 pp.

EEMS, CSO 120 Product Data Sheet, Low-cost polycarbosiloxane liquid polymer for 2200° F. temperature stable ceramic applications, Sep. 2011, 1 pp.

EEMS, CSO 120 HT Material Safety Data Sheet, Jun. 7, 2011, 4 pp.

EEMS, CSO 230 HT Product Data Sheet, Polycarbosiloxane liquid polymer for high temperature ceramic applications, Mar. 2012, 3 pp.

EEMS, CSO 315 HT Material Safety Data Sheet, Jun. 7, 2010, 4 pp.

Applicant, Information disclosure statement of commercial activity, Jun. 17, 2016, 6 pp.

International Search Report and the Written Opinion of the International Searching Authority, PCT/US2015/018211, dated May 27, 2015.

International Search Report and the Written Opinion of the International Searching Authority, PCT/US2015/021861, dated Sep. 16, 2015.

International Search Report and the Written Opinion of the International Searching Authority, PCT/US2015/051997, dated Mar. 3, 2016.

International Search Report and the Written Opinion of the International Searching Authority, PCT/US2016/014245, dated Mar. 24, 2016.

International Search Report and Written Opinion of the International Searching Authority, PCT/US14/045494, dated Nov. 4, 2014.

International Search Report and Written Opinion of the International Searching Authority, PCT/US14/06050 dated Feb. 24, 2015.

International Search Report and Written Opinion of the International Searching Authority, PCT/US15/018210, dated May 20, 2015.

International Search Report and Written Opinion of the International Searching Authority, PCT/US15/018211, dated May 27, 2015.

Abderrazak, H., Hmida, E.S.B.H., Silicon carbide: synthesis and properties, properties and application of silicone carbide. Chapter 16, Apr. 2011, Prof. Rosario Gerhardt (Ed.), ISBN: 978-953-307-201-2. 361-388, 29 pp., InTech, Available from: http://www.intechopen.com/books/properties-and-applications-of-siliconcarbide/silicon-carbide-synthesis-and-properties.

Andriot, M, DeGroot, J.V., Jr., Meeks, R., Gerlach, E., Jungk, M., Wolf, A.T., Cray, S., Easton, T., Mountney, A., Leadley, S., Chao, S.H.. Colas; A., De Buyl, F., Dupont, A.; Garaud, J.L., Gubbels, F., Lecomte, J.P., Lenoble, B. Stassen, S., Stevens, C., Thomas, X., Shearer, G., Silicones in industrial applications, 106 pp., Dow Corning.

American National Standards Institute (ANSI) and American Petroleum Institute (API), Measurement of properties of proppants used in hydraulic fracturing and gravel-packing operations, ANSI/API Recommended Practice 19C, May 2008, First Edition. ISO 13503-2:2006 (Identical), Petroleum and natural gas industries—Completion fluids and materials, Copyrighted Material Licensed to Bruce Bricco on Feb. 5, 2013 for licensee and #39's use only, Distributed by Thomson Reuters (Scientific), Inc., 42 pp.

American National Standards Institute (ANSI) and American Petroleum Institute (API), Measuring the long term conductivity of proppants, ANSI/API Recommended Practice 19D, First Edition, May 2008, Errata, Jul. 2008, ISO 13503-5 (Identical), Part 5: Procedures for measuring the long-term conductivity of proppants, Copyrighted Material Licensed to Bruce Bricco on Feb. 5, 2013 for licensee and #39's use only, Distributed by Thomson Reuters (Scientific), Inc., 35 pp.

Araüjo, F,G., Latorre, G.P., Hench, L.L., Structural evolution of a porous type-VI sol-gel silica glass. Journal of Non-Crystalline Solids 185 (1995) 41-48, 8 pp., © 1995 Elsevier Science B.V.

Ashland, Corrosion Resistant Fiberglass Reinforced Pipe—FRP, 3 pp., http://www.ashland.com/strategic-applications/APM/corrosion-resistant-FRP.

Aud; W.W., Poulson. T.D., Burns. R.A., Rushing, T.R., Orr, W.D., Lateral proppant distribution: The good, the bad, and the ugly of putting frac jobs away, Society of Petroleum Engineers, Inc., SPE 56725, Copyright 1999, 10 pp.

Baker, R.W., Lokhandwala, K., Natural gas processing with membranes; An overview, membrane technology and research, Inc.; California, Received for Review Aug. 8, 2007, Revised Manuscript Received Nov. 30, 2007; Accepted, Dec. 4, 2007, IE071083W, 13 pp.

Bakumov, V., Schwarz, M., Kroke E., Emulsion processing of polymer-derived porous Si/C/(O) ceramic bodies, Institute of Inorganic Chemistry, Germany, Accepted Apr. 2, 2009, Available online May 14, 2009, Journal of the European Ceramic Society 29 (2009) 2857-2865, 9 pp., © 2009 Elsevier Ltd.

Bannwarth, H., Gas physics and vacuum technology, Liquid Ring Vacuum Pumps, Compressors and Systems, 110 pp., ©2005 WILEY-VCH Verlag GmbH & Co. KGaA, Weinheim ISBN: 3-527-31249-8.

Bayyaa, S.S., Villalobos, C.R., Hunt, M.P, Sangheraa, J.S. Sadowski, B,M., Aggarwal, I.D., Cinibulk, M., Carney, C., Keller, K., Development of transparent polycrystalline beta-silicon carbide, Material Technologies and Applications to Optics, Structures, Components. and Sub-Systems, edited by Joseph L. Robichaud, Matthias Krodel, William A. Goodman, Proc. of SPIE vol. 8837, 88370S © 2013 SPIE CCC code' 0277-786X/13/$18. doi: 10,1117112.2023954, 7 pp.

(56) References Cited

OTHER PUBLICATIONS

Bazarjani, M.S., Prasad, R.M., Schitco, C., Gurlo, A., Riedel, R., A fundamental design approach towards microporous polymer derived nanocomposites, for gas separation applications, [O5B.2], Technische Universität Darmstadt, Germany, 2 pp.

Bernardo, P., Clarizia, G., 30 years of membrane technology for gas separation, chemical engineering transaction, vol. 32 (2013), 1999-2004, DOI: 10.3303/CET1332334, ISBN 978-88-95608-23-5; ISSN 1974-9791, 6 pp., © 2013 AIDIC Servizi S.r.l. ISBN 978-88-95608-23-5; ISSN 1974-9791.

Bernardo, E., Fiocco, L., Parcianello, G., Storti, E., Colombo, P., Advanced ceramics from preceramic polymers modified at the nano-scale: A review, Materials 2014, 7. 1927-1956; doi:10.3390/ma7031927, 30 pp.

Bernardo, E., Colombo, P., Manias, E., SiOC glass modified by montmorillonite clay, Ceramics International 32 (2006) 679-686, 8 pp., © 2005 Elsevier Ltd and Techna Group S.r.l.

Berndt, F., Jahn, P., Rendtel, A., Motz, G., Ziegler, G., Monolithic SiOC ceramics with tailored porosity, Institute for Materials Research (WFN), D-2 J 502, Germany, 4 pp.

Blum, Y., Soraru, G.D., Ramaswamy, A.P., Hui, D., Carturan. S.M., Controlled mesoporosity in SiOC via chemically bonded polymeric "Spacers" (2013), Journal of the American Ceramic Society, vol. 96, No. 9, 8 pp., DOI: 10.1111/jace.12485, © 2013 The American Ceramic Society.

Boyle, M.A., Martin, C.J., Neuner. J.D., Epoxy Resins, Constituent Materials, 12 pp.

Brequei, H., Parmentier, T.J., Walter, S., Badheka, R., Trimmel, G., Masse. S., Latournerie, J., Dempsey, P., Turquat, C., Desmartin-Chomel, A., Le Neindre-Prum, L. Jayasooriya, U.A., Hourlier, D., Kleebe, H.-J., Soraru, G.D., Enzo, S., Babonneau, F., Systematic structural characterization of the high-temperature behavior of nearly stoichiometric silicon Oxycarbide Glasses, Chem. Mater. (2004) 16, 2585-2598, 14 pp., © 2004 American Chemical Society, Published on Web May 29, 2004.

Brundle, C. R., Evans, C.A., Jr., Wilson, S., Encyclopedia of materials characterization, surfaces, interfaces, thin films, This book was acquired, developed, and produced by Manning Publications Co., © 1992 by Butterworth-Heinemann, a division of Reed Publishing (USA) Inc., Stoneham, MA02180, Manning Publications Co., Greenwich, CT 06830, 1 0 9 8 7 6 5 4 3, Printed in the USA, 782 pp.

Budden, G., Some like it hot, Dow Corning Limited, U.K., Silicone characteristics, 15 pp.

Bujalski, D.R., Grigoras. S., Lee, W-L., Wieber, G.M., Zanik, G.A., Stoichiometry control of SiOC ceramics by siloxane polymer functionality, Journal of Materials Chemistry, J. Mater, Chem., 1998, 8(6), 1427-1433 1433, 7 pp.

Bunsell, A.R., Piant, A., A review of the development of three generations of small diameter silicon carbide fibres, J Mater Sci 41 (2006) 823-839, 17 pp., DOI: 10.1007/s 0853-006-8568-z, © 2006 Springer Science + Business Media, Inc.

Casado, C.M., Cuadrado, I., Moran, M., Alonso, B., Barranco, M., Losada, J., Cyclic siloxanes and silsesquioxanes as cores and frameworks for the construction of ferrocenyl dendrimers and polymers, Applied Organometallic Chemistry, App. Organometal. Chem. 13. 245-259 (1999), 15 pp., © 1999 John Wiley & Sons, Ltd.

Chen, T., Dong, M., Wang, J., Zhang, L., Li, C., Study on properties of silicon oxycarbide thin films prepared by RF magnetron sputtering, Science and Technology on Surface Engineering Laboratory, Lanzhou Institute of Physics, Lanzhou 730000, China, 5 pp., 2nd International Conference on Electronic & Mechanical Engineering and Information Technology (EMEIT-2012), Published by Atlantis Press, Paris, France.

Cho, S.H., White, S.R., Braun, P.V., Room-temperature polydimethylsiloxane-based self-healing polymers, Chemistry of Materials, pubs.acs.org/cm, dx.doi.org/10.1021/cm302501b | Chem. Mater. 2012, 24, 4209-4214, 6 pp., © 2012 American Chemical Society.

Chung, D-W, Kim, T.G., Study on the effect of platinum catalyst for the synthesis of polydimethylsiloxane grafted with polyoxyethylene, J. Ind. Eng. Chem, vol. 13, No. 4, (2007) 571-577, 7 pp.

Clark, M.D.T., Carbon black, Chapter 9, Petroleum Specialty Products, Extensive revision and editing by Heather Wansbrough following correspondence with Steve Lipsham, 43 pp.

Colas, A., Silicones: preparation, properties, and performance, Dow Corning, Life Sciences, © 2005 Dow Corning Corporation, Printed in USA VIS2339 Form No. 01-3077-01, 14 pp.

Collins, P., Heithaus, M., Adams, C., Li, J.H., Chemical modification of carbon black for improved performance in coatings, Cabot Corporation, Coatings Business Unit, CRP-216-294, 9 pp.

Colombo, P., Raj, R, editors, Advances in polymer derived ceramics and composites, Ceramic Transactions, vol. 213, 28 pp., A Collection of Papers Presented at the 8th Pacific Rim Conference on Ceramic and Glass Technology, May 31-Jun. 5, 2009, Vancouver, British Columbia, Volume Editor, Singh, M., A John Wiley & Sons, Inc. Publication.

Colombo, P., Sglavo, V. Pippel, E., Woltersdore, J., Joining of reaction-bonded silicon carbide using a preceramic polymer, J. Journal of Materials Science 33 (1998) 2405 2412, 8 pp., © 1998 Chapman & Hall.

Colombo, P., Mera, G., Riedel, R., Soraru, G.D., Polymer-derived ceramics: 40 years of research and innovation in advanced ceramics, J. Am. Ceram, Soc. 93 [7] 1805-1837 (2010), 33 pp., © 2010 The American Ceramics Society.

Colombo, P., Riedel, R., Soraru, G.D., Kleebe, H-J., Polymer derived ceramics from nano-structure to applications, Printed in the USA, 10 9 8 7 6 5 4 3 2, © 2010 DEStech Publications, Inc., ISBN: 978-1-60595-000-6, 475 pp.

Colombo, P., Modesti, M., Silicon oxycarbide ceramic foams from a preceramic polymer, Journal of the American Ceramic Society, vol. 82, No. 3, 573-78 (1990), 6 pp.

CoorsTek Material, Material Properties Charts, Important Information, 18 pp. CoorsTek, Inc., Golden, Colorado.

Craddock, D.L., Goza, B.T., Bishop, J.C., A case history-fracturing the morrow in southern blaine and western Canadian counties, Oklahoma, SPE 11567, 6 pp., Copyright 1983 Society of Petroleum Engineers of AIME, This paper was presented at the 1983 Production Operation Symposium held in Oklahoma City, Oklahoma, Feb. 27-Mar. 1, 1983.

Cypryk, M., Apeloig, Y., Mechanism of the acid-catalyzed Si—O bond cleavage in siloxanes and sifoxanols. A theoretical study, Organometallics (2002), vol. 21, No. 11, 2165-2175, 11 pp., Publication on Web Apr. 24, 2002, © American Chemical Society.

Dalcanale, F. Grossenbacher, J., Blugan, G., Gullo, M.R. Lauria, A., Brugger, J., Tevaearai, H., Graule. T., Niederberger, M., Kuebler, J., Influence of carbon enrichment on electrical conductivity and processing of polycarbosilane derived ceramic for MEMS applications, ScienceDirect, Journal of the European Ceramic Society 34 (2014) 3559-3570, 12 pp., © 2014 Elsevier Ltd.

Dasgupta, R., Aluminum alloy-based metal matrix composites: a potential material for wear resistant applications, Research Article, International Scholarly Research Network, ISRN Metallurgy, Volume (2012), Article ID 594573, 14 pages, doi:10.5402/2012/594573, CSIR-Advanced Materials and Processes Research Institute (AMPRI), Hoshangabad Road, Madhya Pradesh, Bhopal 462064, India, © 2012 Rupa Dasgupta.

De Vekki, D.A., Skvortsov, N.K., Metal complex catalyzed, hydrosilylation of vinyl-with hydrosiloxanes, (A Review), Chemistry and Chemical Technology, Technology of Organic Substances, 18 pp.

De Vos, R.M., Verweij, H., High-selectivity, high-flux silica membranes for gas separation, Science 279, 1710 (1998), DOI: 10.1126/science.279.5357.1710, 3 pp., American Association for the Advancement of Science, Washington, DC 20005.

Dow Corning, Safe handling of silicon hydride containing polysiloxanes, Updated Aug. 22, 29 pp., Printed in U.S.A. FPH 33079 Form No. 24-711A-01.

Dow Corning, Xiameter® MHX-1107 Fluid 20CST and 30CST, Polymethythydrogensiloxane, Feb. 16, 2012, 2 pp., Form No. 95/1087-01, © 2012 Dow Corning Corporation.

(56) References Cited

OTHER PUBLICATIONS

Dume, B., Silicon carbide shows promise for quantum computing, physicsworld.com, Nov. 4, 2011, 2 pp., Retrieved: Aug. 16, 2015: http://physicsworld.com/cws/articlelnews/2011/nov/04/silicon-carbide-shows-promise-for-quantum-computing.

Entegris, Inc., Supersic® materials, © 2011-2012 Entegris, Inc., 2 pp., Printed in USA.

Eom, J-H., Kim, Y-W., Song, I-H, Kim, H-D., Microstructure and properties of porous silicon carbide ceramics fabricated by carbothermal reduction and subsequent sintering process, Materials Science and Engineering Materials Science and Engineering, A 464 (2007) 129-134, 6 pp., © 2007 Elsevier B.V.

Fernandez, G.J., Murr, L.E., Characterization of tool wear and weld optimization in the friction-stir welding of cast aluminum Materials Characterization 359+20% SiC metal-matrix composite, Materials Characterization 52 (2004) 65-75, 11 pp., ©2004 Elsevier Inc.

Friess, M., Bill, J., Golczewski, J., Zimmermann, A., Aldinger, F., Crystallization of polymer-derived silicon carbonitride at 1873 k under nitrogen overpressure, J. Am. Ceram. Soc., 85 [10] 2587-89 (2002), 3 pp.

Gallis, S., Huang, M., Nikas, V., Kaloyeros, A. E., Nguyen. A. P. D., Stesmans, A., Afanas'Ev, V. V., The origin of white luminescence from silicon oxycarbide thin films, Research Gate, Applied Physics Letters 104, 061906 (2014), DOI: 10.1063/1.4865100, 6 pp., AIP Publishing, New York.

\* cited by examiner

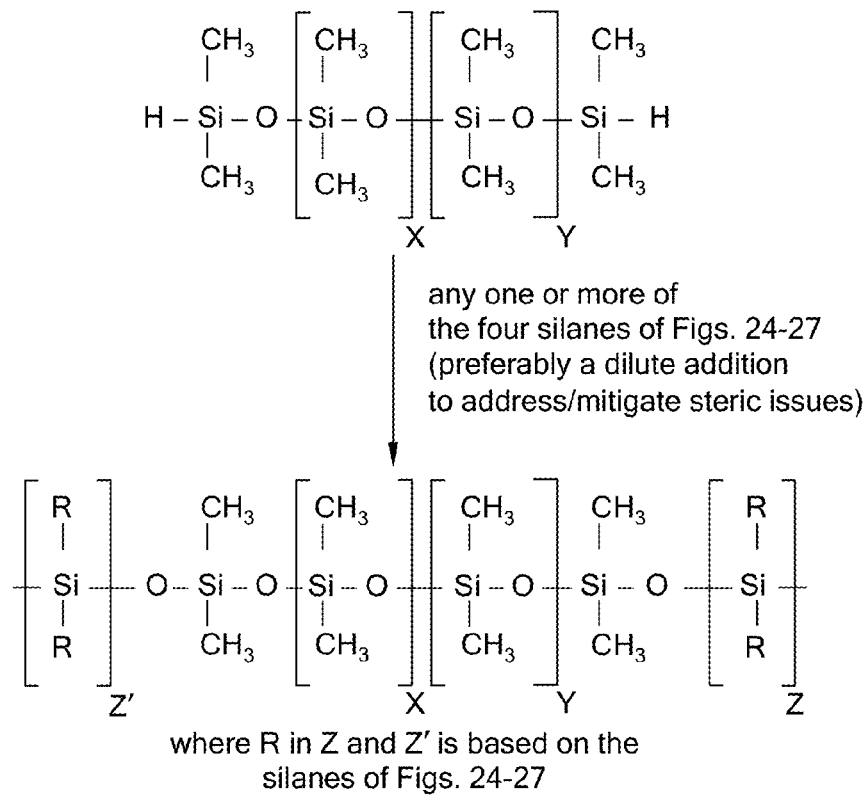
FIG. 31
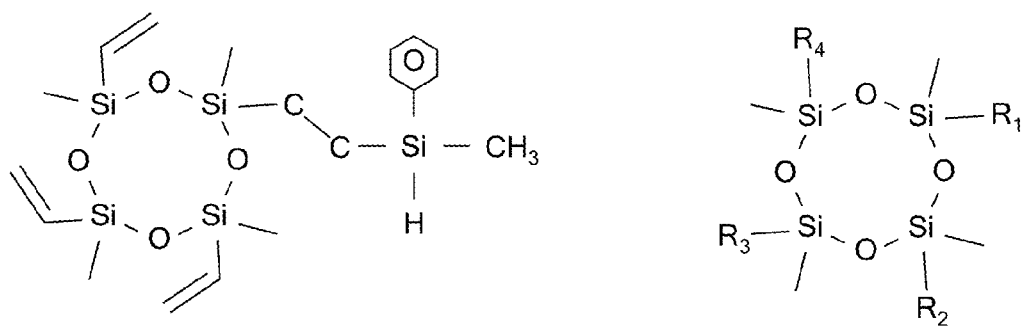
FIG. 32
FIG. 33

(TES)

silicon tetrachloride
tetrachlorosilane
$M_0$ $M_2$ trichlorosilane $H_1$ $M_3$ $M_1$ $M_1 H_1$

POLYSILOCARB MATERIALS AND METHODS

This application: (i) claims, under 35 U.S.C. §119(e)(1), the benefit of the filing date of May 2, 2013 of U.S. provisional application Ser. No. 61/818,906; (ii) claims, under 35 U.S.C. §119(e)(1), the benefit of the filing date of May 3, 2013 of U.S. provisional application Ser. No. 61/818, 981; and, (iii) is a continuation-in-part of U.S. patent application Ser. No. 14/212,896 now abandoned, filed Mar. 14, 2014, the entire disclosures of each of which are incorporated herein by reference.

BACKGROUND OF THE INVENTION

Field of the Invention

The present inventions relate to polyorganic compositions, structures and materials; polymer derived preceramic and ceramic materials; and in particular polysilocarb compositions, structures and materials. The present inventions further relate to methods for making these compositions, structures and materials.

Materials made of, or derived from, carbosilane or polycarbosilane (Si—C), silane or polysilane (Si—Si), silazane or polysilazane (Si—N—Si), silicon carbide (SiC), carbosilazane or polycarbosilazane (Si—N—Si—C—Si), siloxane or polysiloxanes (Si—O) are known. These general types of materials have great, but unrealized promise; and have failed to find large-scale applications or market acceptance. Instead, their use has been relegated to very narrow, limited, low volume, high priced and highly specific applications, such as a ceramic component in a rocket nozzle, or a patch for the space shuttle. Thus, they have failed to obtain wide spread use as ceramics, and it is believed they have obtained even less acceptance and use, if any, as a plastic material, e.g., cured but not pyrolized.

To a greater or lesser extent all of these materials and the process used to make them suffer from one or more failings, including for example: they are exceptionally expensive and difficult to make, having costs in the thousands and tens-of-thousands of dollars per pound; they require high and very high purity starting materials; the process requires hazardous organic solvents such as toluene, tetrahydrofuran (THF), and hexane; the materials are incapable of making non-reinforced structures having any usable strength; the process produces undesirable and hazardous byproducts, such as hydrochloric acid and sludge, which may contain magnesium; the process requires multiple solvent and reagent based reaction steps coupled with curing and pyrolizing steps; the materials are incapable of forming a useful prepreg; and their overall physical properties are mixed, e.g., good temperature properties but highly brittle.

As a result, although believed to have great promise, these types of materials have failed to find large-scale applications or market acceptance and have remained essentially scientific curiosities.

SUMMARY

Accordingly, there has been a long-standing and unfulfilled need for new materials, and methods of making such materials, that have the performance characteristic and features of high and higher priced ceramics, but with lower costs and greater flexibility in manufacturing and using the material, and further have performance characteristic and features unobtainable with existing ceramics and plastics.

The present invention, among other things, solves these needs by providing the materials, compositions, and methods taught herein.

Thus, there is provided a solvent free method for making a ceramic material, and the material made from this method, the method involving: mixing a first liquid polysilocarb precursor with a second liquid precursor in the absence of a solvent to form a solvent free liquid polysilocarb precursor formulation, whereby the first liquid polysilocarb precursor is not chemically reacted with the second liquid precursor; curing the polysilocarb precursor formulation to form a sold material, whereby the first liquid polysilocarb precursor and the second liquid precursor chemically react to form the solid material; and, pyrolzing the sold material to form a ceramic material.

Yet further there are provided methods and materials having or involving one or more of the following features: wherein the first liquid precursor is methyl hydrogen fluid; wherein the first liquid precursor is a methyl terminated hydride substituted polysiloxane; wherein the first liquid precursor is selected from the group consisting of a methyl terminated vinyl polysiloxane, a vinyl terminated vinyl polysiloxane, a hydride terminated vinyl polysiloxane, and an allyl terminated dimethyl polysiloxane; wherein the first liquid precursor is selected from the group consisting of a vinyl terminated dimethyl polysiloxane, a hydroxy terminated dimethyl polysiloxane, a hydride terminated dimethyl polysiloxane, and a hydroxy terminated vinyl polysiloxane; wherein the first liquid precursor is selected from the group consisting of a phenyl terminated dimethyl polysiloxane, a phenyl and methyl terminated dimethyl polysiloxane, a methyl terminated dimethyl diphenyl polysiloxane, a vinyl terminated dimethyl diphenyl polysiloxane, a hydroxy terminated dimethyl diphenyl polysiloxane, and a hydride terminated dimethyl diphenyl polysiloxane; wherein the second liquid precursor is selected from the group consisting of a methyl terminated phenylethyl polysiloxane, a tetravinyl cyclosiloxane, a trivinyl cyclosiloxane, and a divinyl cyclosiloxane.

The method of claim 1, wherein the second liquid precursor is selected from the group consisting of a trivinyl hydride cyclosiloxane, a divinyl dihydride cyclosiloxane, and a dihydride cyclosiloxane; wherein the second liquid precursor is a silane; wherein the second liquid precursor is selected from the group consisting of a methyl terminated dimethyl ethyl methyl phenyl silyl silane, an ethyl methyl phenyl silyl-cyclosiloxane, a cyclosiloxane and an orthosilicate; wherein the first liquid precursor is methyl hydrogen fluid; and wherein the second liquid precursor is selected from the group consisting of a methyl terminated phenylethyl polysiloxane, a tetravinyl cyclosiloxane, a trivinyl cyclosiloxane, and a divinyl cyclosiloxane; wherein the first liquid precursor is a methyl terminated hydride substituted polysiloxane; and wherein the second liquid precursor is selected from the group consisting of a methyl terminated phenylethyl polysiloxane, a tetravinyl cyclosiloxane, a trivinyl cyclosiloxane, and a divinyl cyclosiloxane; wherein the first liquid precursor is selected from the group consisting of a methyl terminated vinyl polysiloxane, a vinyl terminated vinyl polysiloxane, a hydride terminated vinyl polysiloxane, and an allyl terminated dimethyl polysiloxane; and, wherein the second liquid precursor is selected from the group consisting of a methyl terminated phenylethyl polysiloxane, a tetravinyl cyclosiloxane, a trivinyl cyclosiloxane, a divinyl cyclosiloxane, a trivinyl hydride cyclosiloxane, a divinyl dihydride cyclosiloxane, a dihydride cyclosiloxane, a silane, a methyl terminated dimethyl ethyl methyl phenyl silyl silane, an ethyl methyl phenyl silyl-cyclosiloxane, a cyclosiloxane and an orthosilicate; and wherein the first liquid precursor is selected from the group consisting of a vinyl terminated dimethyl polysiloxane, a hydroxy terminated dimethyl polysiloxane, a hydride terminated dimethyl polysiloxane, and a hydroxy terminated vinyl polysiloxane and, wherein the second liquid precursor is selected from the group consisting of a methyl terminated phenylethyl polysiloxane, a tetravinyl cyclosiloxane, a trivinyl cyclosiloxane, a divinyl dihydride cyclosiloxane, a dihydride cyclosiloxane, a silane, a methyl terminated dimethyl ethyl methyl phenyl silyl silane, an ethyl methyl phenyl silyl-cyclosiloxane, a cyclosiloxane and an orthosilicate.

Still further there is provided a solvent free method for making a neat ceramic material, and a material made therefrom, the method involving: preparing a mixture of a first liquid polysilocarb precursor with a second liquid precursor in the absence of a solvent to form a solvent free liquid polysilocarb precursor formulation, whereby the first liquid polysilocarb precursor is not chemically reacted with the second liquid precursor; curing the polysilocarb precursor formulation to form a neat sold material, whereby the first liquid polysilocarb precursor and the second liquid precursor chemically react to form the neat solid material; and, pyrolzing the neat sold material to form a neat ceramic material.

Moreover, there are provided methods and materials having or involving one or more of the following features: wherein the pyrolysis is conducted in an inert atmosphere; wherein the pyrolysis is conducted under a reduced pressure atmosphere; wherein the reduced pressure atmosphere is essentially a vacuum; and, wherein the first liquid precursor is methyl hydrogen fluid; wherein the first liquid precursor is a methyl terminated hydride substituted polysiloxane.

Furthermore, there are provided methods and materials having or involving one or more of the following features: wherein the material is bead shaped; wherein the material is a neat material in the shape of a bead; the material is a neat ceramic material in the shape of a bead; the material is in the shape of a film; the material is a net material in the shape of a film; the material is a neat ceramic material in the shape of a film; the material is a coating; the materials is a neat material and is a coating; and the material is a neat ceramic material and is a coating.

Yet still further, there are provided methods and materials having or involving one or more of the following features: wherein the solvent free liquid polysilocarb precursor formulation contains hydride groups; wherein the solvent free liquid polysilocarb precursor formulation contains vinyl groups; wherein the solvent free liquid polysilocarb precursor formulation contains vinyl groups and hydride groups; wherein the molar ratio of hydride groups to vinyl groups is about 1.50 to 1; wherein the molar ratio of hydride groups to vinyl groups is about 3.93 to 1.

The method of claim 49, wherein the molar ratio of hydride groups to vinyl groups is about 5.93 to 1; wherein the molar ratio of hydride groups to vinyl groups is about 0.08 to 1 to about 24.00 to 1; wherein the molar ratio of hydride groups to vinyl groups is about 2.03 to 1 to about 24.00 to 1; wherein the molar ratio of hydride groups to vinyl groups is about 3.93 to 1 to about 24.00 to 1; wherein the molar ratio of hydride groups to vinyl groups is about 0.08 to 1 to about 1.82 to 1; wherein the molar ratio of hydride groups to vinyl groups is about 1.12 to 1 to about 2.36 to 1; wherein the molar ratio of hydride groups to vinyl groups is about 1.75 to 1 to about 23.02 to 1; wherein the molar ratio of hydride groups to vinyl groups is about 1.50 to 1 to about 3.93 to 1; wherein the molar ratio of hydride groups to vinyl groups is about 1.26 to 1 to about 4.97 to 1; and, wherein the molar ratio of hydride groups to vinyl groups is about 0.08 to 1 to about 1.50 to 1.

Still additionally there is provided a solvent free method for making a neat solid material, and materials made therefrom, the method involving: preparing a mixture of a first liquid polysilocarb precursor with a second liquid precursor in the absence of a solvent to form a solvent free liquid polysilocarb precursor formulation, whereby the first liquid polysilocarb precursor is not chemically reacted with the second liquid precursor; and, curing the polysilocarb precursor formulation to form a neat sold material, whereby the first liquid polysilocarb precursor and the second liquid precursor chemically react to form the neat solid material.

Yet moreover, there is provided a reaction free method for making a polysilocarb material, and the material made therefrom, the method involving: obtaining a first liquid polysilocarb precursor; obtaining a second liquid polysilocarb precursor comprising a first reactive group; obtaining a third liquid polysilocarb precursor comprising a second reactive group; and, mixing the first liquid polysilocarb precursor, the second liquid polysilocarb precursor and the third liquid polysilocarb precursor to form a liquid polysilocarb precursor formulation, wherein the first reactive group is unreacted; and the first liquid polysilocarb precursor is not chemically reacted with the second liquid precursor; and, curing the polysilocarb precursor formulation to form a neat sold material, whereby the first liquid polysilocarb precursor and the second liquid precursor chemically react to form the neat solid material.

Yet still further, there are provided methods and materials having or involving one or more of the following features: wherein the first reactive group comprises a hydride, and the second reactive group comprises a vinyl; wherein the first reactive group comprises a reactive group selected from the group consisting of vinyl, allyl, hydroxy, hydride, phenyl, and phenylethyl; wherein the second reactive group comprises a reactive group selected from the group consisting of vinyl, allyl, hydroxy, hydride, phenyl, and phenylethyl; wherein the first reactive group and the second reactive group comprises a reactive group selected from the group consisting of vinyl, allyl, hydroxy, hydride, phenyl, and phenylethyl.

Still further there is provided a method for making a polysilocarb material, and materials made therefrom, the method involving: obtaining a first liquid polysilocarb precursor; obtaining a second liquid polysilocarb precursor comprising a first reactive group; obtaining a third liquid polysilocarb precursor comprising a second reactive group; mixing the first liquid polysilocarb precursor, the second liquid polysilocarb precursor and the third liquid polysilocarb precursor to form a liquid polysilocarb precursor formulation, wherein the first reactive group is unreacted; and, curing the polysilocarb precursor formulation, whereby the first reactive group and the second reactive group chemically react to form a sold material.

Still additionally, there is provided a method for making a neat polysilocarb material, and the materials made therefrom, the method involving: obtaining a first liquid polysilocarb precursor; obtaining a second liquid polysilocarb precursor comprising a first reactive group; obtaining a third liquid polysilocarb precursor comprising a second reactive group; mixing the first liquid polysilocarb precursor, the second liquid polysilocarb precursor and the third liquid polysilocarb precursor to form a liquid polysilocarb precursor formulation, wherein the first reactive group is unreacted; and, curing the polysilocarb precursor formulation, whereby the first reactive group and the second reactive group chemically react to form a neat sold material.

Furthermore, there are provided methods and materials having or involving one or more of the following features: wherein the first reactive group comprises a hydride, and the second reactive group comprises a vinyl; wherein the first reactive group comprises a reactive group selected from the group consisting of vinyl, allyl, hydroxy, hydride, phenyl, and phenylethyl; wherein the second reactive group comprises a reactive group selected from the group consisting of vinyl, allyl, hydroxy, hydride, phenyl, and phenylethyl; and, wherein the first reactive group and the second reactive group comprises a reactive group selected from the group consisting of vinyl, allyl, hydroxy, hydride, phenyl, and phenylethyl.

Additionally, there is provided a method of making a polysilocarb precursor formulation, and materials made from curing and pyrolizing that formulation, the method involving: providing an amount of a first precursor to a reaction vessel, the first precursor comprising silicon; providing an amount of a source of thermal mass to the reaction vessel; providing an amount of water to the reaction vessel; providing an amount of a proton source to the reaction vessel; thereby forming a reaction mixture comprising the first precursor, the source of thermal mass, water and the proton source; heating the reaction mixture, whereby the activation energy for the reaction mixture is reached, wherein an exothermic reaction takes place in the reaction vessel; controlling the exothermic reaction to form a polysilocarb precursor formulation; separating the polysilocarb precursor formation.

Still moreover, there is provided a method of making a polysilocarb precursor formulation, and materials made from curing and pyrolizing this formulation, the method involving: providing an amount of a first precursor, the first precursor comprising silicon and an ethoxy group, to a reaction vessel; providing a reactant to the reaction vessel; thereby forming a reaction mixture comprising the first precursor and the reactant; and, obtaining the activation energy for the reaction mixture, wherein an exothermic reaction takes place, the exothermic reaction comprising the formation of a hydroxy group on the first precursor and the reaction of the hydroxy group with an ethoxy group on the first precursor; thereby forming a polysilocarb precursor.

Yet further there is provided a polysilocarb derived ceramic material resulting from the pyrolysis of a polymeric precursor comprising a backbone having the formula —$R_1$—Si—C—C—Si—O—Si—C—C—Si—$R_2$—, where $R_1$ and $R_2$ comprise materials selected from the group consisting of methyl, hydroxyl, vinyl and allyl.

Furthermore, there are provided methods and materials having or involving one or more of the following features: wherein the first precursor is selected from the group consisting of methyl hydrogen, siloxane backbone additive, vinyl substituted and vinyl terminated polydimethyl siloxane, vinyl substituted and hydrogen terminated polydimethyl siloxane, allyl terminated polydimethyl siloxane, silanol terminated polydimethyl siloxane, hydrogen terminated polydimethyl siloxane, vinyl terminated diphenyl dimethyl polysiloxane, hydroxyl terminated diphenyl dimethyl polysiloxane, hydride terminated diphenyl dimethyl polysiloxane, styrene vinyl benzene dimethyl polysiloxane, and tetramethyltetravinylcyclotetrasiloxane; and.

Yet moreover there is provided a solid, solvent-free composition comprising: □ a cross-linked polymer matrix having a density of from 0.99 g/cc to 1.25 g/cc, a hardness from Shore D35 to Shore D85, and a flexural strength of up to 3 ksi, the composition being free of ester, carbonate, carbamate or urea linkages.

Furthermore, there are provided methods and materials having or involving one or more of the following features: wherein the composition has a flame resistance of UL-V0 without any fire-retardant additives; having fibers to form a composite 10 composition having a flexural strength of 40 ksi to 140 ksi; adding a catalyst, light, heat, or a combination thereof to the premixture; wherein the premixture includes between 5 and 20 40% addition reaction cross-linkable groups; and wherein the addition reaction cross-linkable groups are vinyl, allyl, propargyl or ethynyl groups.

Additionally, there is provided a method of synthesizing a solid material in the absence of solvent comprising: mixing liquid components in the absence of a solvent to form a premixture, the premixture including between 2 and 50% addition reaction cross-linkable groups; and 15 crosslinking the premixture in the absence of a solvent to form a solid structure free of ester, carbonate, carbamate or urea linkages.

BRIEF DESCRIPTION OF THE DRAWINGS

FIG. 31 is chemical formulas for an embodiment of a polysiloxane precursor material in accordance with the present inventions.

FIG. 32 is a chemical formula for an embodiment of an ethyl methyl phenyl silyl-cyclosiloxane in accordance with the present inventions.

FIG. 33 is a chemical formula for an embodiment of a cyclosiloxane in accordance with the present inventions.

DESCRIPTION OF THE PREFERRED EMBODIMENTS

Figure 1:
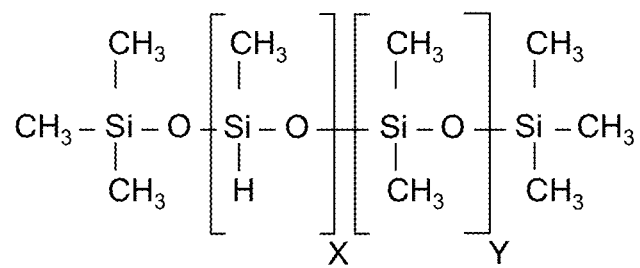
FIG. 1 is a chemical formula for an embodiment of a methyl terminated hydride substituted polysiloxane precursor material in accordance with the present inventions.

In general, the present inventions relate to unique and novel silicon (Si) based materials that are easy to manufacture, handle and have surprising and unexpected properties and applications. These silicon based materials have applications and utilizations as a liquid material, a cured material, e.g., a plastic, a preceramic, and a pyrolized material, e.g., a ceramic.

Further, and generally, the present inventions relate to the precursors to preceramic materials, inorganic polymers, inorganic semi-organic polymers, organosilicon materials and polymers, mixtures of such precursors, preceramic materials, cured preceramic materials, cured mixtures of precursors, cured inorganic polymers, cured inorganic semi-organic polymers, ceramic materials, and methods and processes for making these precursors, inorganic polymers, inorganic semi-organic polymers, mixtures, preceramic materials, cured materials and ceramic materials. In particular, and preferably, the present inventions include polymer derived ceramic materials, polymer derived cured preceramic materials, polymer derived preceramic materials, precursors to polymer derived preceramic and ceramic materials, mixtures of precursors to polymer derived preceramic and ceramic materials, and methods and processes relating to these materials.

The silicon based materials of the present inventions go against the general trends of the art of silicon chemistry and uses. Generally, the art of silicon chemistry, and in particular organosilicon chemistry, has moved toward greater and greater complexity in the functional groups that are appended to, and a part of, a silicon based polymeric backbone. Similarly, in general, the processes that are utilized to make these polymers have moved toward greater and greater complexity. The present inventions move away from this trend, by preferably functionalizing a silicon based polymeric backbone with simpler structures, such as phenyl, phenylethyl and smaller groups, and do so with processes that are simplified, e.g., solvent free, reduced solvent, lower cost starting materials, fewer steps, and reduction of reaction intermediates.

Further, and generally, the art views silicones as tacky, soft or liquid materials that are used with, on, or in conjunction with, other materials to enhance or provide a performance feature to those other materials. Silicon based materials generally are not viewed as stand alone products, primary products, or structural elements. The silicon based materials of the present inventions, however, move away from this trend and understanding in the art. The silicon based materials of the present inventions provide materials that, among other things, can function as stand alone products, primary products and structural elements. The silicon based materials of the present invention can also function as composites, coatings, components, additives, material performance enhancers, and other applications and utilizations.

Thus, the present inventions, among other things, provide a new material systems and platform having many varied formulations, applications and uses, which could not generally have been obtained with prior silicon based products, and in particular, could not generally have been obtained with prior silicon based products at acceptable costs, volumes, manufacturing conditions, handling requirements, or processing conditions among other things.

Generally, the present inventions are directed toward "polysilocarb" materials, e.g., material containing silicon (Si), oxygen (O) and carbon (C), and materials that have been pyrolized from such materials. Polysilocarb materials may also contain other elements. Polysilocarb materials are made from one or more polysilocarb precursor formulation or precursor formulation. The polysilocarb precursor formulation contains one or more functionalized silicon polymers, or monomers, as well as, potentially other ingredients, such as for example, inhibitors, catalysts, pore formers, fillers, reinforcers, fibers, particles, colorants, pigments, dies, polymer derived ceramics ("PDC"), ceramics, metals, metal complexes, and combinations and variations of these and other materials and additives.

The polysilocarb precursor formulation is then cured to form a solid or semi-sold material, e.g., a plastic. The polysilocarb precursor formulation may be processed through an initial cure, to provide a partially cured material, which may also be referred to, for example, as a preform, green material, or green cure (not implying anything about the material's color). The green material may then be further cured. Thus, one or more curing steps may be used. The material may be "end cured," i.e., being cured to that point at which the material has the necessary physical strength and other properties for its intended purpose. The amount of curing may be to a final cure (or "hard cure"), i.e., that point at which all, or essentially all, of the chemical reaction has stopped (as measured, for example, by the absence of reactive groups in the material, or the leveling off of the decrease in reactive groups over time). Thus, the material may be cured to varying degrees, depending upon it's intended use and purpose. For example, in some situations the end cure and the hard cure may be the same.

The curing may be done at standard ambient temperature and pressure ("SATP", 1 atmosphere, 25° C.), at temperatures above or below that temperature, at pressures above or below that pressure, and over varying time periods (both continuous and cycled, e.g., heating followed by cooling and reheating), from less than a minute, to minutes, to hours, to days (or potentially longer), and in air, in liquid, or in a preselected atmosphere, e.g., Argon (Ar) or nitrogen ($N_2$).

The polysilocarb precursor formulations can be made into non-reinforced, non-filled, composite, reinforced, and filled structures, intermediates and end products, and combinations and variations of these and other types of materials. Further, these structures, intermediates and end products can be cured (e.g., green cured, end cured, or hard cured), uncured, pyrolized to a ceramic, and combinations and variations of these (e.g., a cured material may be filled with pyrolized beads derived from the same polysilocarb as the cured material).

The precursor formulations may be used to form a "neat" material, (by "neat" material it is meant that all, and essentially all of the structure is made from the precursor material or unfilled formulation; and thus, there are no fillers or reinforcements). They may be used to form composite materials, e.g., reinforced products. They may be used to form non-reinforced materials, which are materials that are made of primarily, essentially, and preferably only from the precursor materials, for example a pigmented polysiloxane structure having only precursor material and a colorant would be considered non-reinforced material.

In making the polysilocarb precursor formulation into a structure, part, intermediate, or end product, the polysilocarb formulation can be, for example, sprayed, flowed, thermal sprayed, painted, molded, formed, extruded, spun, dropped, injected or otherwise manipulated into essentially any volumetric shape, including planer shape (which still has a volume, but is more akin to a coating, skin, film, or even a counter top, where the thickness is significantly smaller, if not orders of magnitude smaller, than the other dimensions), and combinations and variations of these. These volumetric shapes would include, for example, spheres, pellets, rings, lenses, disks, panels, cones, frustoconical shapes, squares, rectangles, trusses, angles, channels, hollow sealed chambers, hollow spheres, blocks, sheets, coatings, films, skins, particulates, beams, rods, angles, columns, fibers, staple fibers, tubes, cups, pipes, and combinations and various of these and other more complex shapes, both engineering and architectural. Additionally, they may be shaped into preforms, or preliminary shapes that correspond to, or with, a final product, such as for example use in or with, a break pad, a clutch plate, a break shoe, a motor, high temperature parts of a motor, a diesel motor, rocket components, turbine components, air plane components, space vehicle components, building materials, shipping container components, and other structures or components.

The polysilocarb precursor formulations may be used with reinforcing materials to form a composite material. Thus, for example, the formulation may be flowed into, impregnated into, absorbed by or otherwise combined with a reinforcing material, such as carbon fibers, glass fiber, woven fabric, non-woven fabric, copped fibers, fibers, rope, braided structures, ceramic powders, glass powders, carbon powders, graphite powders, ceramic fibers, metal powders, carbide pellets or components, staple fibers, tow, nanostructures of the above, PDCs, any other material that meets the temperature requirements of the process and end product, and combinations and variations of these. Thus, for example, the reinforcing materials may be any of the high temperature resistant reinforcing materials currently used, or capable of being used with, existing plastics and ceramic composite materials. Additionally, because the polysilocarb precursor formulation may be formulated for a lower temperature cure (e.g., SATP) or a cure temperature of for example about 100° F. to about 400° F., the reinforcing material may be polymers, organic polymers, such as nylons, polypropylene, and polyethylene, as well as aramid fibers, such as NOMEX or KEVLAR.

The reinforcing material may also be made from, or derived from the same material as the formulation that has been formed into a fiber and pyrolized into a ceramic, or it may be made from a different precursor formulation material, which has been formed into a fiber and pyrolized into a ceramic. In addition to ceramic fibers derived from the precursor formulation materials that may be used as reinforcing material, other porous, substantially porous, and non-porous ceramic structures derived from a precursor formulation material may be used.

The polysilocarb precursor formulation may be used to form a filled material. A filled material would be any material having other solid, or semi-solid, materials added to the polysilocarb precursor formulation. The filler material may be selected to provide certain features to the cured product, the ceramic product or both. These features may relate to or be aesthetic, tactile, thermal, density, radiation, chemical, magnetic, electric, and combinations and variations of these and other features. These features may be in addition to strength. Thus, the filler material may not affect the strength of the cured or ceramic material, it may add strength, or could even reduce strength in some situations. The filler material could impart color, magnetic capabilities, fire resistances, flame retardance, heat resistance, electrical conductivity, anti-static, optical properties (e.g., reflectivity, refractivity and iridescence), aesthetic properties (such as stone like appearance in building products), chemical resistivity, corrosion resistance, wear resistance, abrasions resistance, thermal insulation, UV stability, UV protective, and other features that may be desirable, necessary, and both, in the end product or material. Thus, filler materials could include copper lead wires, thermal conductive fillers, electrically conductive fillers, lead, optical fibers, ceramic colorants, pigments, oxides, dyes, powders, ceramic fines, PDC particles, pore-formers, carbosilanes, silanes, silazanes, silicon carbide, carbosilazanes, siloxane, powders, ceramic powders, metals, metal complexes, carbon, tow, fibers, staple fibers, boron containing materials, milled fibers, glass, glass fiber, fiber glass, and nanostructures (including nanostructures of the forgoing) to name a few. For example, crushed, PDC particles, e.g., fines or beads, can be added to a polysilocarb formulation and then cured to form a filled cured plastic material, which has significant fire resistant properties as a coating or structural material.

As used herein, unless specifically provided otherwise, the terms flame retardant, fire retardant, flame resistant, fire resistant, flame protection, fire protection, flame suppression, fire suppression, and similar such terms are to be given their broadest possible meanings, and would include all burning, fire, combustion or flame related meanings that are found, described or set forth in standards, codes, certifications, regulations, and guidelines, and would include the lessening, reduction, and avoidance of fire, combustion or smoke.

The fill material may also be made from, or derived from the same material as the formulation that has been formed into a cured or pyrolized solid, or it may be made from a different precursor formulation material, which has been formed into a cured solid or semi-solid, or pyrolized solid.

The polysilocarb formulation and products derived or made from that formulation may have metals and metal complexes. Thus, metals as oxides, carbides or silicides can be introduced into precursor formulations, and thus into a silica matrix in a controlled fashion. Thus, using organometallic, metal halide (chloride, bromide, iodide), metal alkoxide and metal amide compounds of transition metals and then copolymerizing in the silica matrix, through incorporation into a precursor formulation is contemplated.

For example, Cyclopentadienyl compounds of the transition metals can be utilized. Cyclopentadienyl compounds of the transition metals can be organized into two classes: Bis-cyclopentadienyl complexes; and Monocyclopentadienyl complexes. Cyclopentadienyl complexes can include $C_5H_5$, $C_5Me_5$, $C_5H_4Me$, $CH_5R_5$ (where R=Me, Et, Propyl, i-Propyl, butyl, Isobutyl, Sec-butyl). In either of these cases Si can be directly bonded to the Cyclopentadienyl ligand or the Si center can be attached to an alkyl chain, which in turn is attached to the Cyclopentadienyl ligand.

Cyclopentadienyl complexes, that can be utilized with precursor formulations and in products, can include: bis-cyclopentadienyl metal complexes of first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum); Lanthanide series (La, Ce, Pr, Nd, Pm, Sm, Eu, Gd, Tb, Dy, Ho); Actinide series (Ac, Th, Pa, U, Np).

Monocyclopentadienyl complexes may also be utilized to provide metal functionality to precursor formulations and would include monocyclopentadienyl complexes of: first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum) when preferably stabilized with proper ligands, (for instance Chloride or Carbonyl).

Alky complexes of metals may also be used to provide metal functionality to precursor formulations and products. In these alkyl complexes the Si center has an alkyl group (ethyl, propyl, butyl, vinyl, propenyl, butenyl) which can bond to transition metal direct through a sigma bond. Further, this would be more common with later transition metals such as Pd, Rh, Pt, Ir.

Coordination complexes of metals may also be used to provide metal functionality to precursor formulations and products. In these coordination complexes the Si center has an unsaturated alkyl group (vinyl, propenyl, butenyl, acetylene, butadienyl) which can bond to carbonyl complexes or ene complexes of Cr, Mo, W, Mn, Re, Fe, Ru, Os, Co, Rh, Ir, Ni. The Si center may also be attached to a phenyl, substituted phenyl or other aryl compound (pyridine, pyrimidine) and the phenyl or aryl group can displace carbonyls on the metal centers.

Metal alkoxides may also be used to provide metal functionality to precursor formulations and products. Metal alkoxide compounds can be mixed with the Silicon precursor compounds and then treated with water to form the oxides at the same time as the polymer, copolymerize. This can also be done with metal halides and metal amides. Preferably, this may be done using early transition metals along with Aluminum, Gallium and Indium, later transition metals: Fe, Mn, Cu, and alkaline earth metals: Ca, Sr, Ba, Mg.

Compounds where Si is directly bonded to a metal center which is stabilized by halide or organic groups may also be utilized to provide metal functionality to precursor formulations and products.

Additionally, it should be understood that the metal and metal complexes may be the continuous phase after pyrolysis, or subsequent heat treatment. Formulations can be specifically designed to react with selected metals to in situ form metal carbides, oxides and other metal compounds, generally known as cermets (e.g., ceramic metallic compounds). The formulations can be reacted with selected metals to form in situ compounds such as mullite, alumino silicate, and others. The amount of metal relative to the amount of silica in the formulation or end product can be from about 0.1 mole % to 99.9 mole %, about 1 mole % or greater, about 10 mole % or greater, about 20 mole percent or greater % and greater. The forgoing use of metals with the present precursor formulas can be used to control and provide predetermined stoichiometries.

Filled materials would include reinforced materials. In many cases, cured, as well as pyrolized polysilocarb filled materials can be viewed as composite materials. Generally, under this view, the polysilocarb would constitute the bulk or matrix phase, (e.g., a continuous, or substantially continuous phase), and the filler would constitute the dispersed (e.g., non-continuous), phase.

It should be noted, however, that by referring to a material as "filled" or "reinforced" it does not imply that the majority (either by weight, volume, or both) of that material is the polysilcocarb. Thus, generally, the ratio (either weight or volume) of polysilocarb to filler material could be from about 0.1:99.9 to 99.9:0.1. Smaller amounts of filler material or polysilocarb could also be present or utilized, but would more typically be viewed as an additive or referred to in other manners. Thus, the terms composite, filled material, polysilocarb filled materials, reinforced materials, polysilocarb reinforced materials, polysilocarb filled materials, polysilocarb reinforced materials and similar such terms should be viewed as non-limiting as to amounts and ratios of the material's constitutes, and thus in this context, be given their broadest possible meaning.

The polysilocarb precursor formulation may be specifically formulated to cure under conditions (e.g., temperature, and perhaps time) that match, e.g., are predetermined to match, the properties of the reinforcing material, filler material or substrate. These materials may also be made from, or derived from, the same material as the polysilocarb precursor formulation that is used as the matrix, or it may be made from a different polysilocarb precursor formulation. In addition to ceramic fibers derived from the polysilocarb precursor formulation materials, porous, substantially porous, and non-porous ceramic structures derived from a polysilocarb precursor formulation material may be used as filler or reinforcing material.

The polysilocarb precursor formulations may be used to coat or impregnate a woven or non-woven fabric, made from for example carbon fiber, glass fibers or fibers made from a polysilocarb precursor formulation (the same or different formulation), to from a prepreg material. Further, a polysilocarb precursor formulation may be used as an interface coating on the reinforcing material, for use either with a polysilocarb precursor formulation as the matrix material. Further, carbon fiber may be heat treated to about 1,400° to about 1,800° or higher, which creates a surface feature that eliminates the need for a separate interface coating, for use with polysilocarb precursor formulations.

Fillers can reduce the amount of shrinkage that occurs during the processing of the formulation into a ceramic, they can be used to provide a predetermined density of the product, either reducing or increasing density, and can be used to provide other customized and predetermined product and processing features. Fillers, at larger amounts, e.g., greater than 10%, can have the effect of reducing shrinkage during cure.

Depending upon the particular application, product or end use, the filler can be evenly distributed in the precursor formulation, unevenly distributed, a predetermined rate of settling, and can have different amounts in different formulations, which can then be formed into a product having a predetermined amounts of filler in predetermined areas, e.g., striated layers having different filler concentration.

Preferably, for a typical filled product, the filler is substantially evenly distributed and more preferably evenly distributed within the end product. In this manner localize stresses or weak points can be avoided. Generally, for a non-reinforced material each filler particle may have a volume that is less than about 0.3%, less than about 0.2%, less than about 0.1%, and less than about 0.05% of the volume of a product, intermediate or part. For example if the product is spherical in shape and the filler is spherical in shape the diameter of the filler should preferable be about $1/10$ to about $1/20$ of the diameter of the proppant particle, and more preferably the filler diameter should be less than about $1/20$ of the diameter of the proppant particle. Generally, the relative amount of filler used in a material should preferable be about 30% to about 65% of the volume of the sphere, e.g., volume %.

Generally, when a small particulate filler, e.g., fines, beads, pellets, is used for the purposes of increasing strength, without the presence of fibers, fabric, etc., generally at least about 2% to at least about 5 volume %, can show an increase in the strength, although this may be greater or smaller depending upon other factors, such as the shape and volume of the product, later processing conditions, e.g., cure time, temperature, number of pyrolysis reinfiltrations. Generally, as the filler level increases from about above 5 volume % no further strength benefits may be realized. Such small particulate filled products, in which appreciable strength benefits are obtained from the filler, and in particular an increase in strength of at least about 5%, at last about 10% and preferably at least about 20% would be considered to be reinforced products and materials.

As used herein, unless specified otherwise the terms %, weight % and mass % are used interchangeably and refer to the weight of a first component as a percentage of the weight of the total, e.g., formulation, mixture, material or product. As used herein, unless specified otherwise "volume %" and "% volume" and similar such terms refer to the volume of a first component as a percentage of the volume of the total, e.g., formulation, material or product.

At various points during the manufacturing process, the polysilocarb structures, intermediates and end products, and combinations and variations of these, may be machined, milled, molded, shaped, drilled or otherwise mechanically processed and shaped.

Generally, the term "about" is meant to encompass a variance or range of ±10%, the experimental or instrument error associated with obtaining the stated value, and preferably the larger of these.

The precursor formulations are preferably clear or are essentially colorless and generally transmissive to light in the visible wavelengths. They may, depending upon the formulation have a turbid, milky or clouding appearance. They may also have color bodies, pigments or colorants, as well as color filler (which can survive pyrolysis, for ceramic end products, such as those used in ceramic pottery glazes). The precursor may also have a yellow or amber color or tint, without the need of the addition of a colorant.

The precursor formulations may be packaged, shipped and stored for later use in forming products, e.g., structures or parts, or they may be used directly in these processes, e.g., continuous process to make a product. Thus, a precursor formulation may be stored in 55 gallon drums, tank trucks, rail tack cars, onsite storage tanks having the capable of holding hundreds of gals, and shipping totes holding 1,000 liters, by way of example. Additionally, in manufacturing process the formulations may be made and used in a continuous, and semi-continuous processes.

The present inventions, among other things, provide substantial flexibility in designing processes, systems, ceramics, having processing properties and end product performance features to meet predetermined and specific performance criteria. Thus, for example the viscosity of the precursor formulation may me predetermined by the formulation to match a particular morphology of the reinforcing material, the cure temperature of the precursor formulation may be predetermined by the formulation to enable a prepreg to have an extended shelf life. The viscosity of the of the precursor formulation may be established so that the precursor readily flows into the reinforcing material of the prepreg while at the same time being thick enough to prevent the precursor formulation from draining or running off of the reinforcing material. The formulation of the precursor formulation may also, for example, be such that the strength of a cured preform is sufficient to allow rough or initial machining of the preform, prior to pyrolysis.

Custom and predetermined control of when chemical reactions occur in the various stages of the process from raw material to final end product can provide for reduced costs, increased process control, increased reliability, increased efficiency, enhanced product features, and combinations and variation of these and other benefits. The sequencing of when chemical reactions take place can be based primarily upon the processing or making of precursors, and the processing or making of precursor formulations; and may also be based upon cure and pyrolysis conditions. Further, the custom and predetermined selection of these steps, formulations and conditions, can provide enhanced product and processing features through chemical reactions, molecular arrangements and rearrangements, and microstructure arrangements and rearrangements, that preferably have been predetermined and controlled.

It should be understood that the use of headings in this specification is for the purpose of clarity, and are not limiting in any way. Thus, the processes and disclosures described under a heading should be read in context with the entirely of this specification, including the various examples. The use of headings in this specification should not limit the scope of protection afford the present inventions.

Generally, the process form making the present polysilocarb materials involves one or more steps. The starting materials are obtained, made or derived. Precursors are obtained or can be made from starting materials. The precursors are combined to form a precursor formulation. The precursor formulation is then shaped, formed, molded, etc. into a desired form, which form is then cured, which among other things transforms the precursor formulation into a plastic like material. This cured plastic like material can then be pyrolized into a ceramic. It being understood, that these steps may not all be used, that some of these steps may be repeated, once, twice or several times, and that combinations and variations of these general steps may be utilized to obtain a desired product or result.

Processes for Obtaining a Polysilocarb Precursor Formulation

Polysilocarb precursor formulations can generally be made using two types of processes, although other processes and variations of these types of processes may be utilized. These processes generally involve combining precursors to form a polysilocarb precursor formulation. One type of process generally involves the mixing together of precursor materials in preferably a solvent free process with essentially no chemical reactions taking place, e.g., "the mixing process." The other type of process generally involves chemical reactions to form specific, e.g., custom, polysilocarb precursor formulations, which could be monomers, dimers, trimers and polymers. Generally, in the mixing process essentially all, and preferably all, of the chemical reactions take place during subsequent processing, such as during curing, pyrolysis and both. It should be understood that these terms—reaction type process and the mixing type process—are used for convenience, e.g., a short hand reference, and should not be viewed as limiting. Further, it should be understood that combinations and variations of these two processes may be used in reaching a precursor formulation, and in reaching intermediate, end and final products. Depending upon the specific process and desired features of the product the precursors and starting materials for one process type can be used in the other. These processes provide great flexibility to create custom features for intermediate, end and final products, and thus, typically, either process type, and combinations of them, can provide a specific predetermined product. In selecting which type of process is preferable factors such as cost, controllability, shelf life, scale up, manufacturing ease, etc., can be considered.

The two process types are described in this specification, among other places, under their respective headings. It should be understood that the teachings for one process, under one heading, and the teachings for the other process, under the other heading, can be applicable to each other, as well as, being applicable to other sections and teachings in this specification, and vice versa. The starting or precursor materials for one type of process may be used in the other type of process. Further, it should be understood that the processes described under these heading should be read in context with the entirely of this specification, including the various examples. Thus, the use of headings in this specification should not limit the scope of protection afford the present inventions.

Additionally, the formulations from the mixing type process may be used as a precursor, or component in the reaction type process. Similarly, a formulation from the reaction type process may be used in the mixing type process. Thus, and preferably, the optimum performance and features from either process can be combined and utilized to provide a cost effective and efficient process and end product.

In addition to being commercially available the precursors may be made by way of an ethoxylation type process. In this process chlorosilanes are reacted with ethanol in the presences of a catalysis, e.g., HCl, to provide the precursor materials, which materials may further be reacted to provide longer chain precursors. Other alcohols, e.g., Methanol may also be used. Thus, the compounds the formulas of FIGS. 51A to 51F are reacted with ethanol (C—C—OH) to form the precursors of FIGS. 37-50. In some of these reactions phenols may be the source of the phenyl group, which is substitute for a hydride group that has been placed on the silicon. One, two or more step reaction may need to take place.

The Mixing Type Process

Precursor materials may be methyl hydrogen, and substituted and modified methyl hydrogens, siloxane backbone additives, reactive monomers, reaction products of a siloxane backbone additive with a silane modifier or an organic modifier, and other similar types of materials, such as silane based materials, silazane based materials, carbosilane based materials, phenol/formaldehyde based materials, and combinations and variations of these. The precursors are preferably liquids at room temperature, although they may be solids that are melted, or that are soluble in one of the other precursors. (In this situation, however, it should be understood that when one precursor dissolves another, it is nevertheless not considered to be a "solvent" as that term is used with respect to the prior art processes that employ non-constituent solvents, e.g., solvents that do not form a part or component of the end product, are treated as waste products, and both.)

The precursors are mixed together in a vessel, preferably at room temperature. Preferably, little, and more preferably no solvents, e.g., water, organic solvents, polar solvents, non-polar solvents, hexane, THF, toluene, are added to this mixture of precursor materials. Preferably, each precursor material is miscible with the others, e.g., they can be mixed at any relative amounts, or in any proportions, and will not separate or precipitate. At this point the "precursor mixture" or "polysilocarb precursor formulation" is compete (noting that if only a single precursor is used the material would simply be a "polysilocarb precursor" or a "polysilocarb precursor formulation"). Although complete, fillers and reinforcers may be added to the formulation. In preferred embodiments of the formulation, essentially no, and more preferably no chemical reactions, e.g., crosslinking or polymerization, takes place within the formulation, when the formulation is mixed, or when the formulation is being held in a vessel, on a prepreg, or other time period, prior to being cured.

Additionally, inhibitors such as cyclohexane, 1-Ethynyl-1-cyclohexanol (which may be obtained from ALDRICH), Octamethylcyclotetrasiloxane, tetramethyltetravinylcyclotetrasiloxane (which may act, depending upon amount and temperature as a reactant or a reactant retardant (i.e., slows down a reaction to increase pot life), e.g., at room temperature it is a retardant and at elevated temperatures it is a reactant), may be added to the polysilocarb precursor formulation, e.g., an inhibited polysilocarb precursor formulation. Other materials, as well, may be added to the polysilocarb precursor formulation, e.g., a filled polysilocarb precursor formulation, at this point in processing, including fillers such as SiC powder, PDC particles, pigments, particles, nano-tubes, whiskers, or other materials, discussed in this specification or otherwise known to the arts. Further, a formulation with both inhibitors and fillers would be considered an inhibited, filled polysilocarb precursor formulation.

Depending upon the particular precursors and their relative amounts in the polysilocarb precursor formulation, polysilocarb precursor formulations may have shelf lives at room temperature of greater than 12 hours, greater than 1 day, greater than 1 week, greater than 1 month, and for years or more. These precursor formulations may have shelf lives at high temperatures, for example, at about 90° F., of greater than 12 hours, greater than 1 day, greater than 1 week, greater than 1 month, and for years or more. The use of inhibitors may further extend the shelf life in time, for higher temperatures, and combinations and variations of these. As used herein the term "shelf life" should be given its broadest possible meaning unless specified otherwise, and would include the formulation being capable of being used for its intended purpose, or performing, e.g., functioning, for its intended use, at 100% percent as well as a freshly made formulation, at least about 90% as well as a freshly made formulation, at least about 80% as well as a freshly made formulation, and at about 70% as well as a freshly made formulation.

Precursors and precursor formulations are preferably non-hazardous materials. They have flash points that are preferably above about 70° C., above about 80° C., above about 100° C. and above about 300° C., and above. They may be noncorrosive. They may have as low vapor pressure, may have low or no odor, and may be non- or mildly irritating to the skin.

A catalyst may be used, and can be added at the time of, prior to, shortly before, or at an earlier time before the precursor formulation is formed or made into a structure, prior to curing. The catalysis assists in, advances, promotes the curing of the precursor formulation to form a preform.

The time period where the precursor formulation remains useful for curing after the catalysis is added is referred to as "pot life", e.g., how long can the catalyzed formulation remain in its holding vessel before it should be used. Depending upon the particular formulation, whether an inhibitor is being used, and if so the amount being used, storage conditions, e.g., temperature, and potentially other factors, precursor formulations can have pot lives, for example of from about 5 minutes to about 10 days, about 1 day to about 6 days, about 4 to 5 days, about 1 hour to about 24 hours, and about 12 hours to about 24 hours.

The catalysis can be any platinum (Pt) based catalyst, which can for example be diluted to a range from: 1 part per million Pt to 200 parts per million (ppm) and preferably in the 5 ppm to 50 ppm range. It can be a peroxide based catalyst with a 10 hour half life above 90 C at a concentration of between 0.5% and 2%. It can be an organic based peroxide. It can be any organometallic catalyst capable of reacting with Si—H bond, Si—OH bonds, or unsaturated carbon bonds, these catalyst may include: dibutyltin dilaurate, zinc octoate, and titanium organometallic compounds. Combinations and variations of these and other catalysts may be used. Such catalysts may be obtained from ARKEMA under the trade name LUPEROX, e.g., LUPEROX 231.

Further, custom and specific combinations of these and other catalysts may be used, such that they are matched to specific formulation formulations, and in this way selectively and specifically catalyze the reaction of specific constituents. Custom and specific combinations of catalysts may be used, such that they are matched to specific formulation formulations, and in this way selectively and specifically catalyze the reaction of specific constituents at specific temperatures. Moreover, the use of these types of matched catalyst-formulations systems may be used to provide predetermined product features, such as for example, pore structures, porosity, densities, density profiles, and other morphologies of cured structures and ceramics.

In this mixing type process for making a precursor formulation, preferably chemical reactions or molecular rearrangements only take place during the making of the precursors, the curing process of the preform, and in the pyrolizing process. Thus, chemical reactions, e.g., polymerizations, reductions, condensations, substitutions, take place or are utilized in the making of a precursor. In making a polysilocarb precursor formulation preferably no and essentially no, chemical reactions and molecular rearrangements take place. These embodiments of the present mixing type process, which avoid the need to, and do not, utilize a polymerization or other reaction during the making of a precursor formulation, provides significant advantages over prior methods of making polymer derived ceramics. Preferably, in the embodiments of these mixing type of formulations and processes, polymerization, crosslinking or other chemical reactions take place primarily, preferably essentially, and more preferably solely in the preform during the curing process.

The precursor may be methyl hydrogen (MH), which formula is shown in FIG. 1. The MH may have a molecular weight (mw) may be from about 400 mw to about 10,000 mw, from about 600 mw to about 1,000 mw, and may have a viscosity preferably from about 20 cps to about 40 cps. The percentage of methylsiloxane units "X" may be from 1% to 100%. The percentage of the dimethylsiloxane units "Y" may be from 0% to 99%. This precursor may be used to provide the backbone of the cross-linked structures, as well as, other features and characteristics to the cured preform and ceramic material. Typically, methyl hydrogen fluid (MHF) has minimal amounts of "Y", and more preferably "Y" is for all practical purposes zero.

Figure 2:
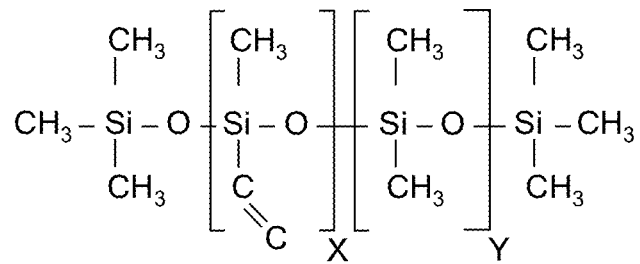
FIG. 2 is a chemical formula for an embodiment of a methyl terminated vinyl polysiloxane precursor material in accordance with the present inventions.

The precursor may be a siloxane backbone additive, such as vinyl substituted polydimethyl siloxane, which formula is shown in FIG. 2. This precursor may have a molecular weight (mw) may be from about 400 mw to about 10,000 mw, and may have a viscosity preferably from about 50 cps to about 2,000 cps. The percentage of methylvinylsiloxane units "X" may be from 1% to 100%. The percentage of the dimethylsiloxane units "Y" may be from 0% to 99%. Preferably, X is 100%. This precursor may be used to decrease cross-link density and improve toughness, as well as, other features and characteristics to the cured preform and ceramic material.

Figure 3:
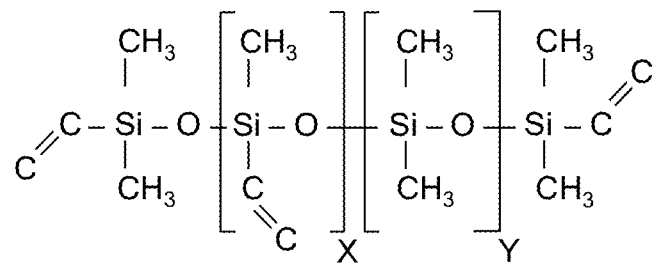
FIG. 3 is a chemical formula for an embodiment of a vinyl terminated vinyl polysiloxane precursor material in accordance with the present inventions.

The precursor may be a siloxane backbone additive, such as vinyl substituted and vinyl terminated polydimethyl siloxane, which formula is shown in FIG. 3. This precursor may have a molecular weight (mw) may be from about 500 mw to about 15,000 mw, and may preferably have a molecular weight from about 500 mw to 1,000 mw, and may have a viscosity preferably from about 10 cps to about 200 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

Figure 4:
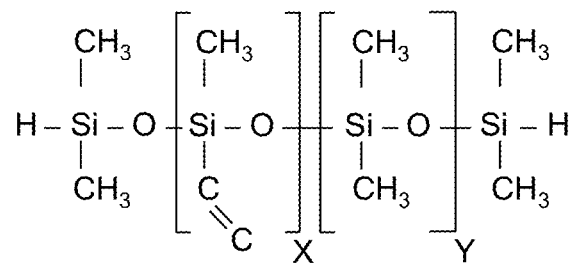
FIG. 4 is a chemical formula for an embodiment of a hydride terminated vinyl polysiloxane precursor material in accordance with the present inventions.

The precursor may be a siloxane backbone additive, such as vinyl substituted and hydrogen terminated polydimethyl siloxane, which formula is shown in FIG. 4. This precursor may have a molecular weight (mw) may be from about 300 mw to about 10,000 mw, and may preferably have a molecular weight from about 400 mw to 800 mw, and may have a viscosity preferably from about 20 cps to about 300 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

Figure 5:
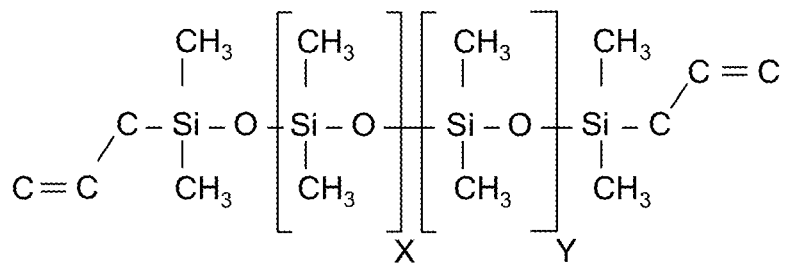
FIG. 5 is a chemical formula for an embodiment of an allyl terminated dimethyl polysiloxane precursor material in accordance with the present inventions.

The precursor may be a siloxane backbone additive, such as allyl terminated polydimethyl siloxane, which formula is shown in FIG. 5. This precursor may have a molecular weight (mw) may be from about 400 mw to about 10,000 mw, and may have a viscosity preferably from about 40 cps to about 400 cps. The repeating units are the same. This precursor may be used to provide UV curability and to extend the polymeric chain, as well as, other features and characteristics to the cured preform and ceramic material.

Figure 6:
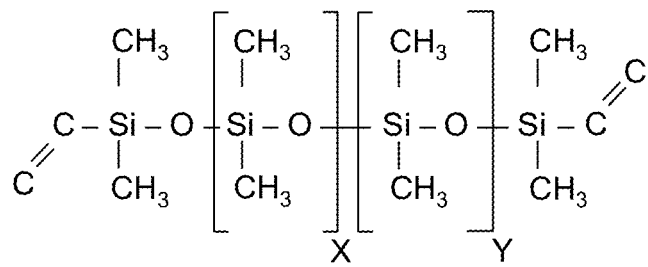
FIG. 6 is a chemical formula for an embodiment of a vinyl terminated dimethyl polysiloxane precursor material in accordance with the present inventions.

The precursor may be a siloxane backbone additive, such as vinyl terminated polydimethyl siloxane ("VT"), which formula is shown in FIG. 6. This precursor may have a molecular weight (mw) may be from about 200 mw to about 5,000 mw, and may preferably have a molecular weight from about 400 mw to 1,500 mw, and may have a viscosity preferably from about 10 cps to about 400 cps. The repeating units are the same. This precursor may be used to provide a polymeric chain extender, improve toughness and to lower cure temperature down to for example room temperature curing, as well as, other features and characteristics to the cured preform and ceramic material.

Figure 7:
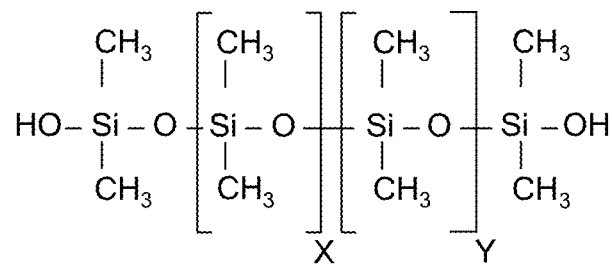
FIG. 7 is a chemical formula for an embodiment of a hydroxy terminated dimethyl polysiloxane precursor material in accordance with the present inventions.

The precursor may be a siloxane backbone additive, such as silanol (hydroxy) terminated polydimethyl siloxane, which formula is shown in FIG. 7. This precursor may have a molecular weight (mw) may be from about 400 mw to about 10,000 mw, and may preferably have a molecular weight from about 600 mw to 1,000 mw, and may have a viscosity preferably from about 30 cps to about 400 cps. The repeating units are the same. This precursor may be used to provide a polymeric chain extender, a toughening mechanism, can generate nano- and micro-scale porosity, and allows curing at room temperature, as well as other features and characteristics to the cured preform and ceramic material.

Figure 9:
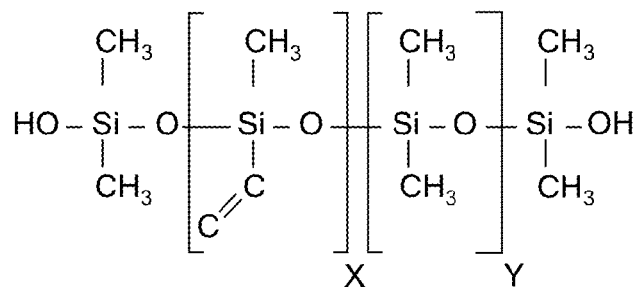
FIG. 9 is a chemical formula for an embodiment of a hydroxy terminated vinyl polysiloxane precursor material in accordance with the present inventions.

The precursor may be a siloxane backbone additive, such as silanol (hydroxy) terminated vinyl substituted dimethyl siloxane, which formula is shown in FIG. 9. This precursor may have a molecular weight (mw) may be from about 400 mw to about 10,000 mw, and may preferably have a molecular weight from about 600 mw to 1,000 mw, and may have a viscosity preferably from about 30 cps to about 400 cps. The percentage of methylvinylsiloxane units "X" may be from 1% to 100%. The percentage of the dimethylsiloxane units "Y" may be from 0% to 99%.

Figure 8:
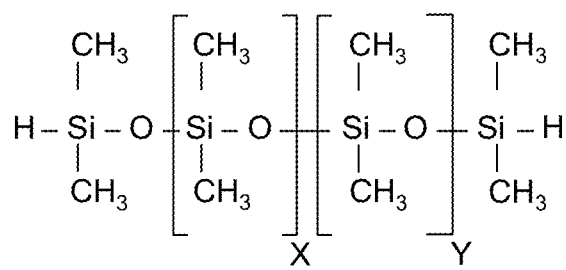
FIG. 8 is a chemical formula for an embodiment of a hydride terminated dimethyl polysiloxane precursor material in accordance with the present inventions.

The precursor may be a siloxane backbone additive, such as hydrogen (hydride) terminated polydimethyl siloxane, which formula is shown in FIG. 8. This precursor may have a molecular weight (mw) may be from about 200 mw to about 10,000 mw, and may preferably have a molecular weight from about 500 mw to 1,500 mw, and may have a viscosity preferably from about 20 cps to about 400 cps. The repeating units are the same. This precursor may be used to provide a polymeric chain extender, as a toughening agent, and it allows lower temperature curing, e.g., room temperature, as well as, other features and characteristics to the cured preform and ceramic material.

Figure 10:
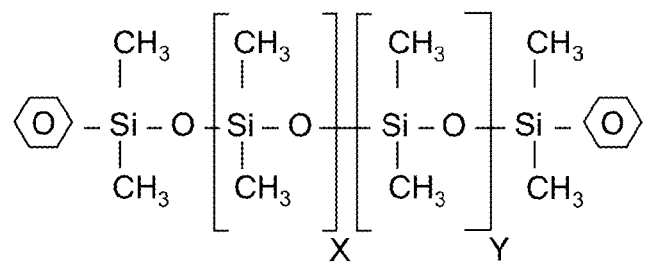
FIG. 10 is a chemical formula for an embodiment of a phenyl terminated dimethyl polysiloxane precursor material in accordance with the present inventions.
Figure 11:
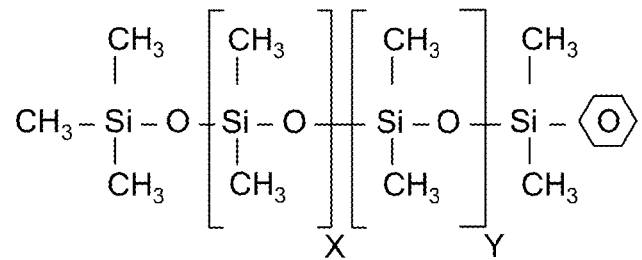
FIG. 11 is a chemical formula for an embodiment of a phenyl and methyl terminated dimethyl polysiloxane precursor material in accordance with the present inventions.

The precursor may be a siloxane backbone additive, such as phenyl terminated polydimethyl siloxane, which formula is shown in FIG. 10. This precursor may have a molecular weight (mw) may be from about 500 mw to about 2,000 mw, and may have a viscosity preferably from about 80 cps to about 300 cps. The repeating units are the same. This precursor may be used to provide a toughening agent, and to adjust the refractive index of the polymer to match the refractive index of various types of glass, to provide for example transparent fiberglass, as well as, other features and characteristics to the cured preform and ceramic material.

The precursor may be a siloxane backbone additive, such as methyl-phenyl terminated polydimethyl siloxane, which formula is shown in 11. This precursor may have a molecular weight (mw) may be from about 500 mw to about 2,000 mw, and may have a viscosity preferably from about 80 cps to about 300 cps. The repeating units are the same. This precursor may be used to provide a toughening agent and to adjust the refractive index of the polymer to match the refractive index of various types of glass, to provide for example transparent fiberglass, as well as, other features and characteristics to the cured preform and ceramic material.

Figure 12:
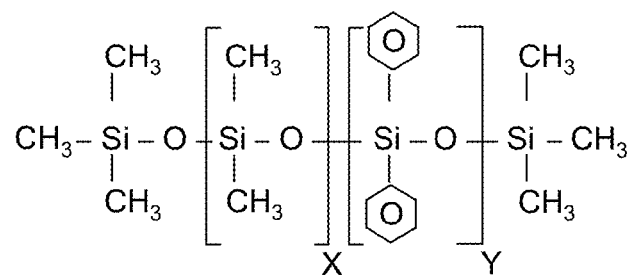
FIG. 12 is a chemical formula for an embodiment of a methyl terminated dimethyl diphenyl polysiloxane precursor material in accordance with the present inventions.

The precursor may be a siloxane backbone additive, such as diphenyl dimethyl polysiloxane, which formula is shown in FIG. 12. This precursor may have a molecular weight (mw) may be from about 500 mw to about 20,000 mw, and may have a molecular weight from about 800 to about 4,000, and may have a viscosity preferably from about 100 cps to about 800 cps. The percentage of dimethylsiloxane units "X" may be from 25% to 95%. The percentage of the diphenyl siloxane units "Y" may be from 5% to 75%. This precursor may be used to provide similar characteristics to the precursor of 11, as well as, other features and characteristics to the cured preform and ceramic material.

Figure 13:
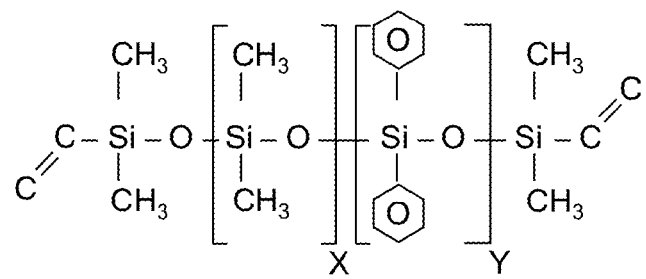
FIG. 13 is a chemical formula for an embodiment of a vinyl terminated dimethyl diphenyl polysiloxane precursor material in accordance with the present inventions.

The precursor may be a siloxane backbone additive, such as vinyl terminated diphenyl dimethyl polysiloxane, which formula is shown in FIG. 13. This precursor may have a molecular weight (mw) may be from about 400 mw to about 20,000 mw, and may have a molecular weight from about 800 to about 2,000, and may have a viscosity preferably from about 80 cps to about 600 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, as well as, other features and characteristics to the cured preform and ceramic material.

Figure 14:
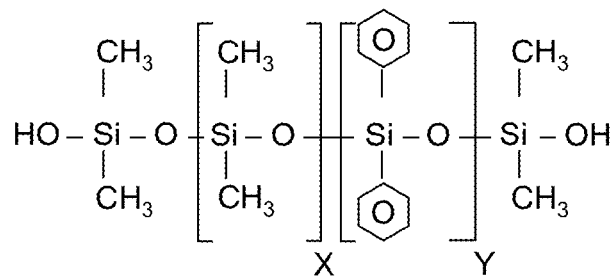
FIG. 14 is a chemical formula for an embodiment of a hydroxy terminated dimethyl diphenyl polysiloxane precursor material in accordance with the present inventions.

The precursor may be a siloxane backbone additive, such as hydroxy terminated diphenyl dimethyl polysiloxane, which formula is shown in FIG. 14. This precursor may have a molecular weight (mw) may be from about 400 mw to about 20,000 mw, and may have a molecular weight from about 800 to about 2,000, and may have a viscosity preferably from about 80 cps to about 400 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, can generate nano- and micro-scale porosity, as well as other features and characteristics to the cured preform and ceramic material.

Figure 15:
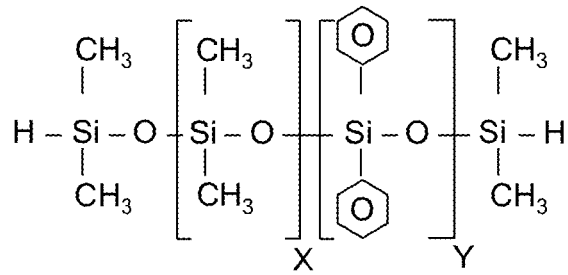
FIG. 15 is a chemical formula for an embodiment of a hydride terminated dimethyl diphenyl polysiloxane precursor material in accordance with the present inventions.

The precursor may be a siloxane backbone additive, such as hydride terminated diphenyl dimethyl polysiloxane, which formula is shown in FIG. 15. This precursor may have a molecular weight (mw) may be from about 400 mw to about 20,000 mw, and may have a molecular weight from about 800 to about 2,000, and may have a viscosity preferably from about 60 cps to about 300 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, as well as, other features and characteristics to the cured preform and ceramic material.

Figure 16:
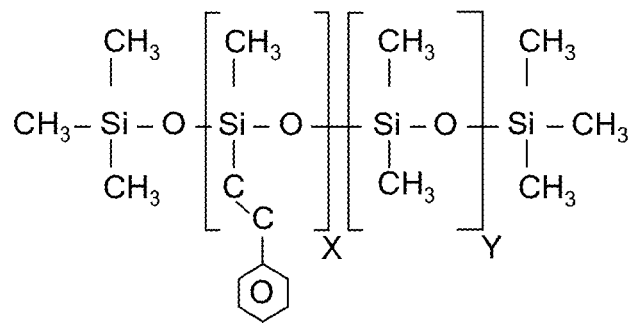
FIG. 16 is a chemical formula for an embodiment of a methyl terminated phenylethyl polysiloxane precursor material in accordance with the present inventions.

The precursor may be a siloxane backbone additive, such as styrene vinyl benzene dimethyl polysiloxane, which formula is shown in FIG. 16. This precursor may have a molecular weight (mw) may be from about 800 mw to at least about 10,000 mw to at least about 20,000 mw, and may have a viscosity preferably from about 50 cps to about 350 cps. The percentage of styrene vinyl benzene siloxane units "X" may be from 1% to 60%. The percentage of the dimethylsiloxane units "Y" may be from 40% to 99%. This precursor may be used to provide improved toughness, decreases reaction cure exotherm, may change or alter the refractive index, adjust the refractive index of the polymer to match the refractive index of various types of glass, to provide for example transparent fiberglass, as well as, other features and characteristics to the cured preform and ceramic material.

Figure 17:
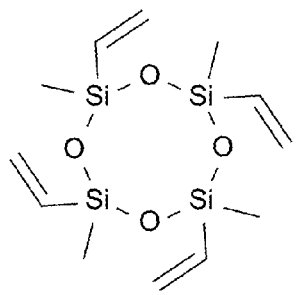
FIG. 17 is a chemical formula for an embodiment of a tetravinyl cyclosiloxane in accordance with the present inventions.

The precursor may be a reactive monomer, such as tetramethyltetravinylcyclotetrasiloxane ("TV"), which formula is shown in FIG. 17. This precursor may be used to provide a branching agent, a three-dimensional cross-linking agent, (and in certain formulations, e.g., above 2%, and certain temperatures (e.g., about from about room temperature to about 60° C., it acts as an inhibitor to cross-linking, e.g., in may inhibit the cross-linking of hydride and vinyl groups), as well as, other features and characteristics to the cured preform and ceramic material.

Figure 20:
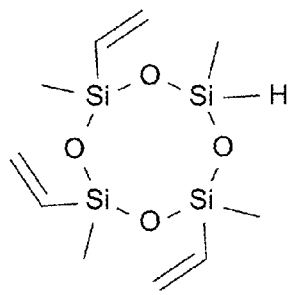
FIG. 20 is a chemical formula for an embodiment of a trivinyl hydride cyclosiloxane in accordance with the present inventions.
Figure 18:
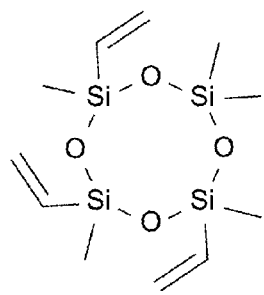
FIG. 18 is chemical formula for an embodiment of a trivinyl cyclosiloxane in accordance with the present inventions.
Figure 21:
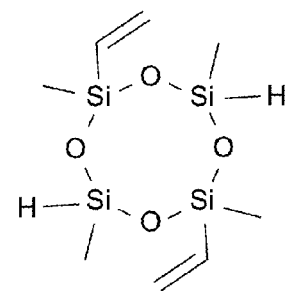
FIG. 21 is a chemical formula for an embodiment of a divinyl dihydride cyclosiloxane in accordance with the present inventions.
Figure 19:
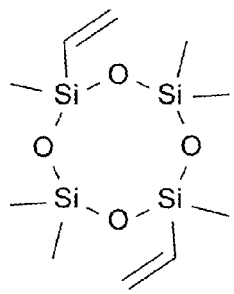
FIG. 19 is a chemical formula for an embodiment of a divinyl cyclosiloxane in accordance with the present inventions.
Figure 22:
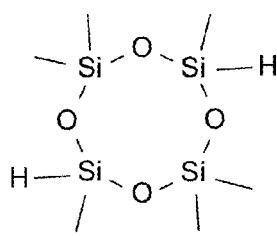
FIG. 22 is a chemical formula for an embodiment of a dihydride cyclosiloxane in accordance with the present inventions.
Figure 23:
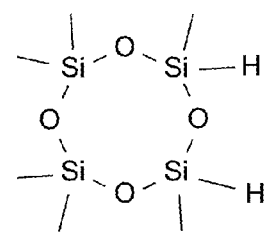
FIG. 23 is a chemical formula for an embodiment of a dihydride cyclosiloxane in accordance with the present inventions.

The precursor may be a reactive monomer, such as trivinyl cyclotetrasiloxane, which formula is shown in FIG. 18. The precursor may be a reactive monomer, such as divinyl cyclotetrasiloxane, which formula is shown in FIG. 19. The precursor may be a reactive monomer, such as monohydride cyclotetrasiloxane, which formula is shown in FIG. 20. The precursor may be a reactive monomer, such as dihydride cyclotetrasiloxane, which formula is shown in FIG. 21. The precursor may be a reactive monomer, such as hexamethyl cyclotetrasiloxane, which formula is shown in FIG. 22 and FIG. 23.

Figure 24:
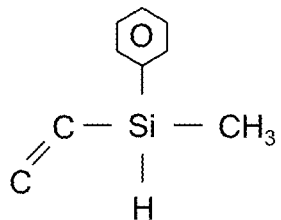
FIG. 24 is a chemical formula for an embodiment of a silane in accordance with the present inventions.
Figure 26:
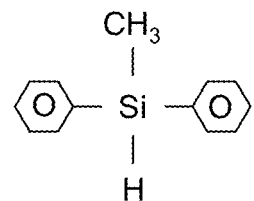
FIG. 26 is a chemical formula for an embodiment of a silane in accordance with the present inventions.
Figure 25:
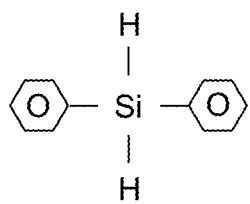
FIG. 25 is a chemical formula for an embodiment of a silane in accordance with the present inventions.

The precursor may be a silane modifier, such as vinyl phenyl methyl silane, which formula is shown in FIG. 24. The precursor may be a silane modifier, such as diphenyl silane, which formula is shown in FIG. 25. The precursor may be a silane modifier, such as diphenyl methyl silane, which formula is shown in FIG. 26 (which may be used as an end capper or end termination group). The precursor may be a silane modifier, such as phenyl methyl silane, which formula is shown in FIG. 27 (which may be used as an end capper or end termination group).

Figure 27:
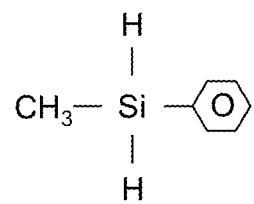
FIG. 27 is a chemical formula for an embodiment of a silane in accordance with the present inventions.
Figure 28:
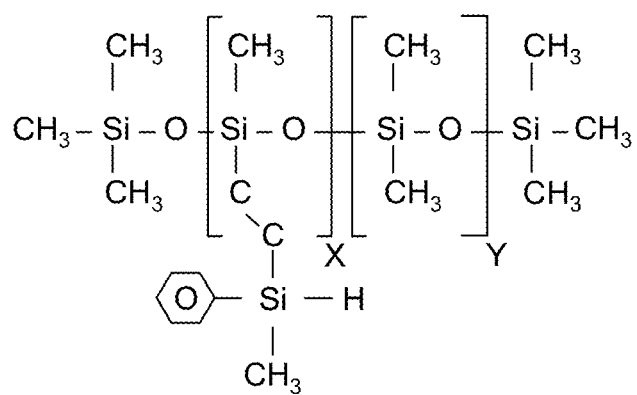
FIG. 28 is a chemical formula for an embodiment of a methyl terminated dimethyl ethyl methyl phenyl silyl silane polysiloxane precursor material in accordance with the present inventions.

The precursors of FIGS. 24, 25 and 27 can provide chain extenders and branching agents. They also improve toughness, alter refractive index, and improve high temperature cure stability of the cured material, as well as improving the strength of the cured material, among other things. The precursor of FIG. 26 may function as an end capping agent, that may also improve toughness, alter refractive index, and improve high temperature cure stability of the cured material, as well as improving the strength of the cured material, among other things.

The precursor may be a reaction product of a silane modifier with a siloxane backbone additive, such as phenyl methyl silane substituted MH, which formula is shown in FIG. 26.

Figure 29:
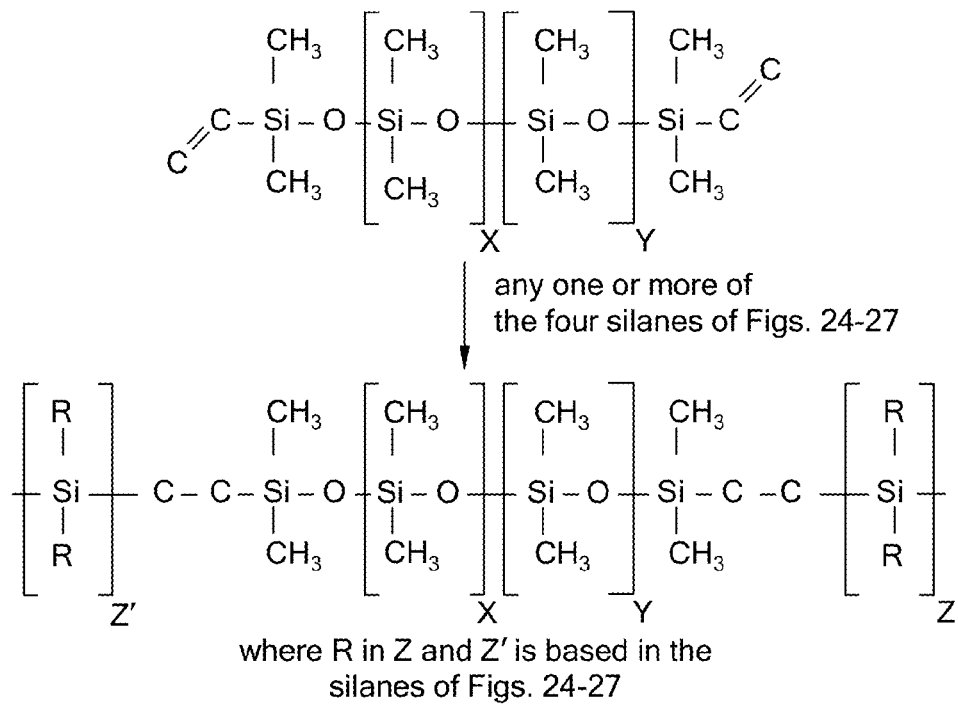
FIG. 29 is chemical formulas for an embodiment of a polysiloxane precursor material in accordance with the present inventions.

The precursor may be a reaction product of a silane modifier (e.g., FIGS. 24 to 27) with a vinyl terminated siloxane backbone additive (e.g., FIG. 6), which formula is shown in FIG. 29, where R may be the silane modifiers having the structures of FIGS. 24 to 27.

Figure 30:
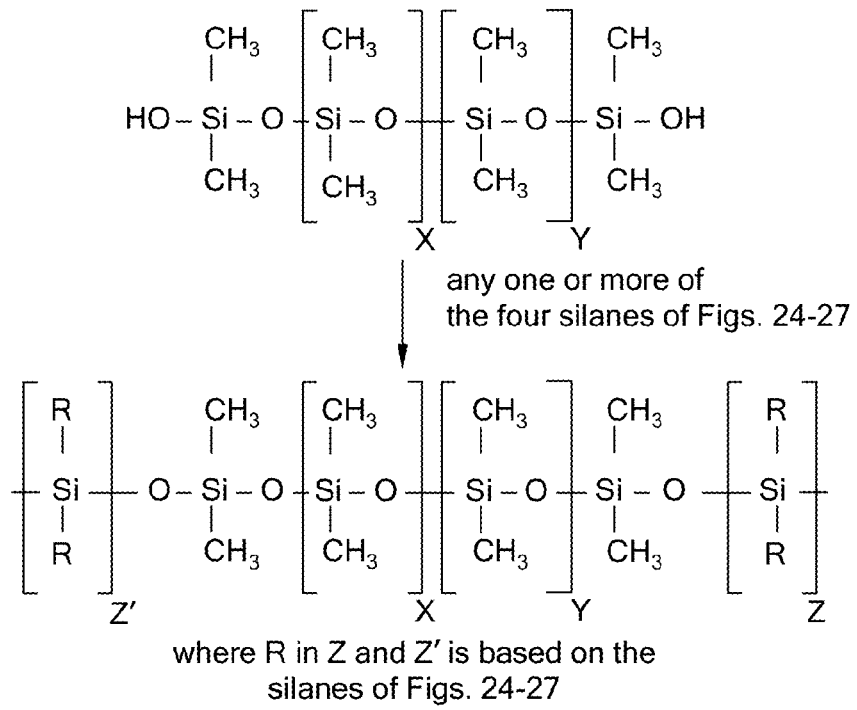
FIG. 30 is chemical formulas for an embodiment of a polysiloxane precursor material in accordance with the present inventions.

The precursor may be a reaction product of a silane modifier (e.g., FIGS. 24 to 27) with a hydroxy terminated siloxane backbone additive (e.g., FIG. 7), which formula is shown in FIG. 30, where R may be the silane modifiers having the structures of FIGS. 24 to 27.

The precursor may be a reaction product of a silane modifier (e.g., FIGS. 24 to 27) with a hydride terminated siloxane backbone additive (e.g., FIG. 8), which formula is shown in FIG. 31, where R may be the silane modifiers having the structures of FIGS. 24 to 27.

The precursor may be a reaction product of a silane modifier (e.g., FIGS. 24 to 27) with TV (e.g., FIG. 17), which formula is shown in FIG. 30.

The precursor may be a reaction product of a silane modifier (e.g., FIGS. 24 to 27) with a cyclosiloxane, examples of which formulas are shown in FIG. 17 (TV), FIG. 32, and in FIG. 33, where $R_1$, $R_2$, $R_3$, and $R_4$ may be a methyl or the silane modifiers having the structures of FIGS. 24 to 27, taking into consideration steric hindrances.

Figure 35:
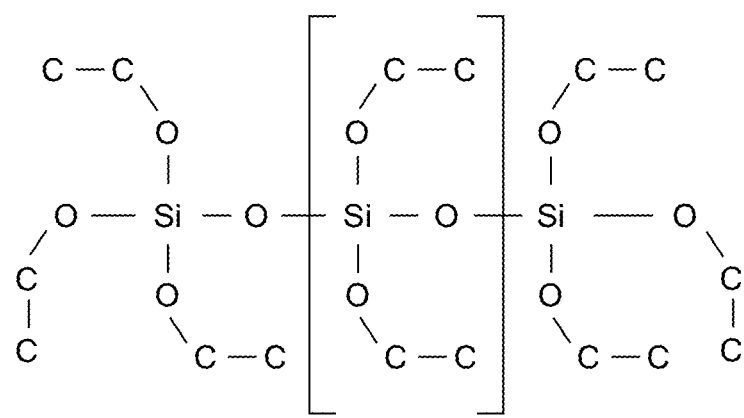
FIG. 35 is a chemical formula for an embodiment of an orthosilicate in accordance with the present inventions.

The precursor may be a partially hydrolyzed tertraethyl orthosilicate, which formula is shown in FIG. 35, such as TES 40 or Silbond 40.

The precursor may also be a methylsesquisiloxane such as SR-350 available from General Electric Company, Wilton, Conn. The precursor may also be a phenyl methyl siloxane such as 604 from Wacker Chemie AG. The precursor may also be a methylphenylvinylsiloxane, such as H62 C from Wacker Chemie AG.

The precursors may also be selected from the following:
SiSiB® HF2020 TRIMETHYLSILYL TERMINATED METHYL HYDROGEN SILICONE FLUID 63148-57-2

This is a type of material commonly called methylhydrogen fluid, and has the formula below:

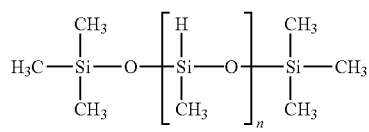

SiSiB® HF2050 TRIMETHYLSILYL TERMINATED METHYLHYDROSILOXANE DIMETHYLSILOXANE COPOLYMER 68037-59-2

This may be called methyl terminated with dimethyl groups and has the formula below.

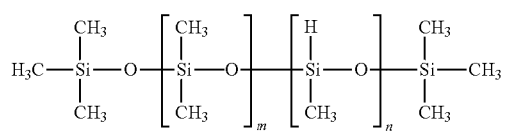

In some embodiments this precursor can decrease the exotherm and decrease shrinkage SiSiB® HF2060 HYDRIDE TERMINATED METHYLHYDROSILOXANE DIMETHYLSILOXANE COPOLYMER 69013-23-6

This may be called hydride terminated with dimethyl groups and has the formula below.

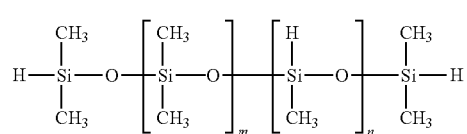

In some embodiments this precursor can decrease the exotherm and decrease shrinkage and provide branch points SiSiB® HF2038 HYDROGEN TERMINATED POLYDIPHENYL SILOXANE

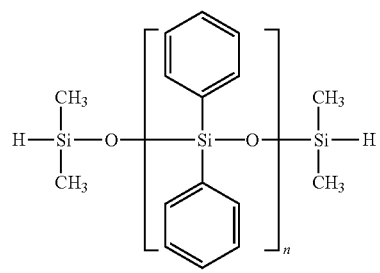

In some embodiments this precursor can improve as-cured toughness and decrease shrinkage and improve thermal stability of as-cured material SiSiB® HF2068 HYDRIDE TERMINATED METHYLHYDROSILOXANE DIMETHYLSILOXANE COPOLYMER 115487-49-5

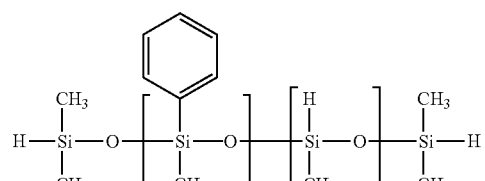

In some embodiments this precursor can improve as-cured toughness and decrease shrinkage and improve thermal stability of as-cured material; but, may allow for higher cross-link density iSiB® HF2078 HYDRIDE TERMINATED POLY(PHENYL-DIMETHYLSILOXY) SILOXANE PHENYL SILSESQUIOXANE, HYDROGEN-TERMINATED 68952-307

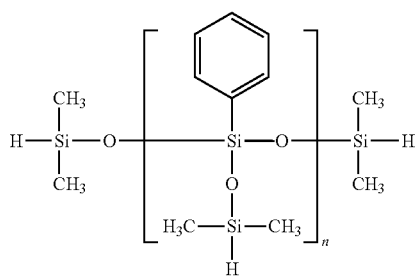

In some embodiments this precursor's tri-functionality can be used for controlled branching, as well as in some embodiments to reduced shrinkage.
SiSiB® VF6060 VINYLDIMETHYL TERMINATED VINYLMETHYL-DIMETHYL POLYSILOXANE COPOLYMERS DIMETHYL POLYSILOXANE COPOLYMERS 6808318-1

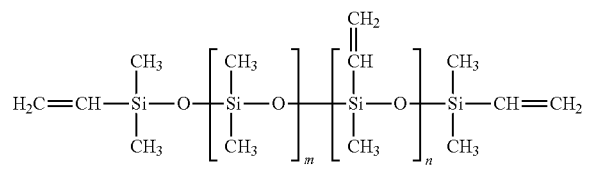

In some embodiments this precursor's tri-functionality can be used for controlled branching, as well as in some embodiments to reduced shrinkage.
SiSiB® VF6862 VINYLDIMETHYL TERMINATED DIMETHYL-DIPHENYL POLYSILOXANE COPOLYMER 68951-96-2

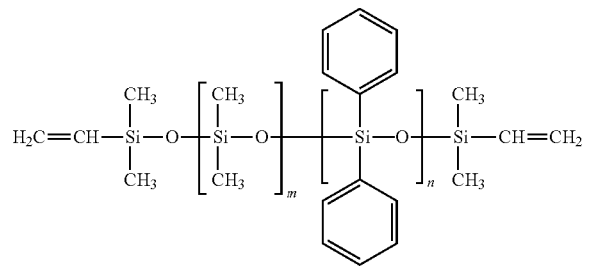

In some embodiments this precursor can be used to improve as cured toughness and decreased shrinkage
SiSiB® VF6872 VINYLDIMETHYL TERMINATED DIMETHYL-METHYLVINYL-DIPHENYL POLYSILOXANE COPOLYMER

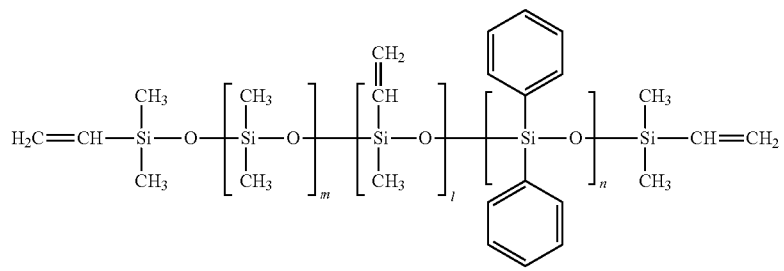

In some embodiments this precursor can be used to improve as cured toughness and decreased shrinkage; as well as providing the ability to improve crosslink density through branching if needed.
SiSiB® PC9401 1,1,3,3-Tetramethyl-1,3-Divinyldisiloxane 2627-95-4

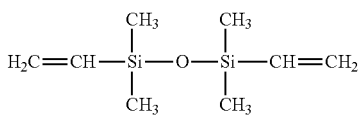

In some embodiments this precursor may provided for less shrinkage than the tetravinyl; but still can provide for high crosslink density due to high vinyl percentage, but primarily through 2-dimensional crosslinking, without any branching
SiSiB® PF1070 SILANOL TERMINATED POLYDIMETHYLSILOXANE (OF1070) 70131-67-8 POLYDIMETHYLSILOXANE

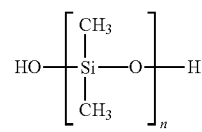

In some embodiments this precursor may assist in decreasing the density by in-situ nano/micro pore formation.
SiSiB® OF1070 OF1070 SILANOL TERMINATED POLYDIMETHYSILOXANE OH-ENDCAPPED POLYDIMETHYLSILOXANE HYDROXY TERMINATED POLYDIMETHYLSILOXANE 70131-67-873138-87-1

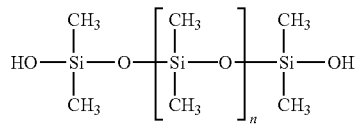

In some embodiments this precursor may assist in decreasing the density by in-situ nano/micro pore formation.
SiSiB® VF6030 VINYL TERMINATED POLYDIMETHYL SILOXANE 68083-19-2

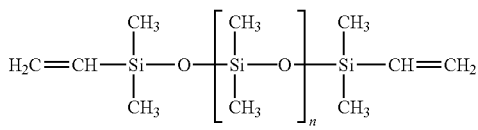

In some embodiments this precursor can increase cure speed, decrease shrinkage slightly, and improves thermal/structural stability of cured and pyrolized material SiSiB® HF2030 HYDROGEN TERMINATED POLYDIMETHYLSILOXANE FLUID 70900-21-9

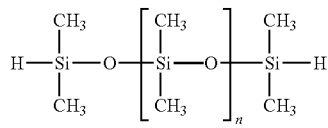

Figure 34:
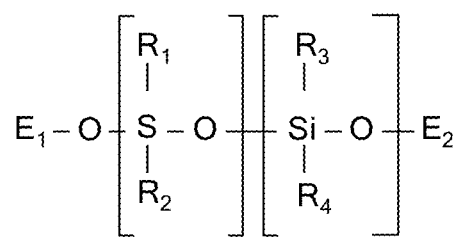
FIG. 34 is a chemical formula for an embodiment of a siloxane precursor in accordance with the present inventions.
Figure 34A:
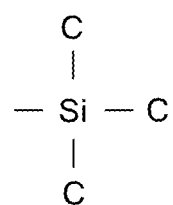
FIGS. 34A to 34D are chemical formula for embodiments of the $E_1$ and $E_2$ groups in the formula of FIG. 34.
Figure 34B:
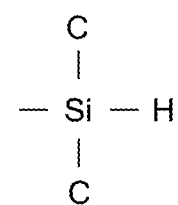
Figure 34C:
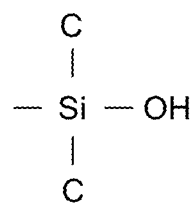
Figure 34D:
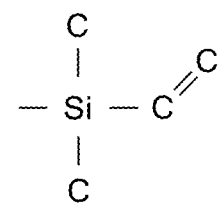

Thus, in additional to the forgoing specific precursors, it is contemplated that a precursor may be compound of the general formula of FIG. 34, wherein end cappers $E_1$ and $E_2$ are chosen from groups such as trimethyl silicon ($SiC_3H_9$) FIG. 34A, dimethyl silicon hydroxy ($SiC_2OH_7$) FIG. 34C, dimethyl silicon hydride ($SiC_2H_7$) FIG. 34B and dimethyl vinyl silicon ($SiC_4H_9$) FIG. 34D. The R groups $R_1$, $R_2$, $R_3$, and $R_4$ may all be different, or one or more may be the same, thus R2 is the same as R3 is the same as $R_4$, $R_1$ and R2 are different with $R_3$ and $R_4$ being the same, etc. The R groups are chosen from groups such as phenyl, vinyl, hydride, methyl, ethyl, allyl, phenylethyl, methoxy, and alkoxy.

In general, embodiments of formulations for polysilocarb formulations may for example have from about 20% to about 99% MH, about 0% to about 30% siloxane backbone additives, about 1% to about 60% reactive monomers, and, about 0% to about 90% reaction products of a siloxane backbone additives with a silane modifier or an organic modifier reaction products.

Further, and in general, embodiments of formulations for batches may for example have from about 5% to about 80% MHF, about 100% 604, about 10% to about 100% H62 C, about 20% to about 60% TV, about 10% to about 64% styrene substituted MHF (FIG. 16), about 5% vinyl terminated (FIG. 5), about 85% to 100% SR 350, about 10-15% TES (FIG. 35), about 2% to 10% of OH terminated MHF (FIG. 7).

In further embodiments there is in general, a solid, solvent-free composition prepared by mixing liquid components in the absence of a solvent to form a premixture, the premixture including addition reaction cross-linkable groups, and crosslinking the premixture in the absence of a solvent to form a solid structure free of ester, carbonate, carbamate or urea linkages. The content of addition reaction cross-linkable groups can be between 2 and 50%, or between 5 and 40%. The addition reaction cross-linkable groups can include vinyl, allyl, propargyl, or ethynyl groups, or combinations thereof. The curing or crosslinking method can include adding a catalyst, the use of light, heat, or a combination thereof to the premixture. The catalyst can be a transition metal catalyst, a peroxide catalyst, an acid, a base, or a combination thereof.

In another aspect of this embodiment, the resulting solid can be a cross-linked polymer matrix of controllable cross-link density having a density of from 0.99 g/cc to 1.25 g/cc, a hardness from Shore D35 to Shore D85, and a flexural strength of up to 3 ksi. In certain circumstances, the composition can have a flame resistance of UL-V0. A composite composition can be made by forming the cross-linked polymer matrix in the presence of fibers, such as glass fibers, basalt fibers or carbon fibers. The fibers can be glass fibers or carbon fibers or combinations thereof. The composite composition can have a flexural strength of 40 ksi to 140 ksi, or 60 ksi to 120 ksi.

In other embodiments a solvent free premixture of components can be prepared from a first component and a second component. The first component has an addition reaction cross-linkable group including at least one carbon-carbon double bond. The second component includes an addition reaction cross-linkable group including at least one reactive moiety capable for addition over the carbon-carbon bond. For example, the first component can include one or more vinyl, alpha-beta unsaturated ketone group, or aryl group. The second component can include one or more radical or anion creation sites. For example, the second component can have an alpha-ketone group, a benzyl group or a hydrosilyl group.

In mixing the formulations a sufficient time to permit the precursors to become effectively mixed and dispersed. Generally, mixing of about 15 minutes to an hour is sufficient. Typically, the precursor formulations are relatively, and essentially, shear insensitive, and thus the type of pumps or mixing are not critical. It is further noted that in higher viscosity formulations additional mixing time may be required. The temperature of the formulations, during mixing should be kept below about 45 degrees C., and preferably about 10 degrees C. (It is noted that these mixing conditions are for the pre-catalyzed formulations)

The Reaction Type Process

In the reaction type process, in general, a chemical reaction is used to combine one, two or more precursors, typically in the presence of a solvent, to form a precursor formulation that is essentially made up of a single polymer that can then be cured and if need be pyrolized. This process provides the ability to build custom precursor formulations that when cured can provide plastics having unique and desirable features such as high temperature, flame resistance and retardation, strength and other features. The cured materials can also be pyrolized to form ceramics having unique features. The reaction type process allows for the predetermined balancing of different types of functionality in the end product by selecting function groups for incorporation into the polymer that makes up the precursor formulation, e.g., phenyls which typically are not used for ceramics but have benefits for providing high temperature capabilities for plastics, and styrene which typically does not provide high temperature features for plastics but provides benefits for ceramics.

Figure 36:
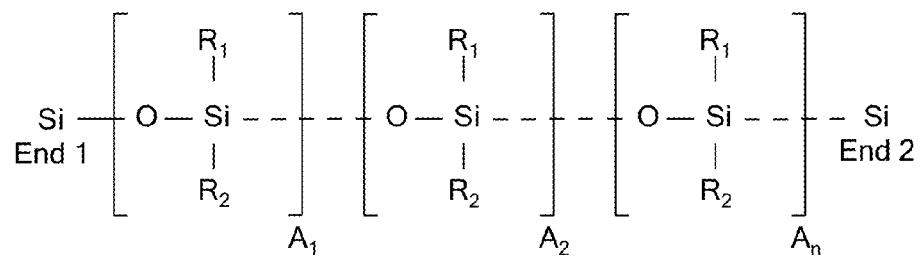
FIG. 36 is a chemical formula for an embodiment of a polysiloxane in accordance with the present inventions.
Figure 37:
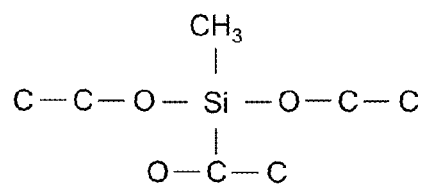
FIG. 37 is a chemical formula for an embodiment of a triethoxy methyl silane in accordance with the present inventions.
Figure 38:
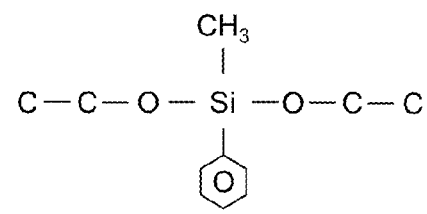
FIG. 38 is a chemical formula for an embodiment of a diethoxy methyl phenyl silane in accordance with the present inventions.
Figure 39:
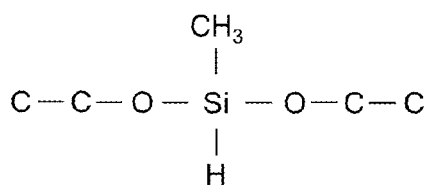
FIG. 39 is a chemical formula for an embodiment of a diethoxy methyl hydride silane in accordance with the present inventions.
Figure 40:
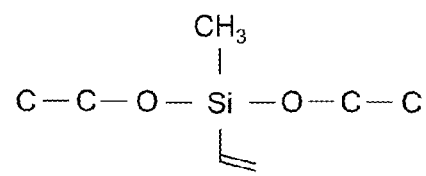
FIG. 40 is a chemical formula for an embodiment of a diethoxy methyl vinyl silane in accordance with the present inventions.
Figure 41:
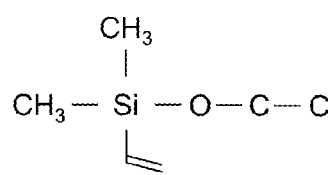
FIG. 41 is a chemical formula for an embodiment of a dimethyl ethoxy vinyl silane in accordance with the present inventions.
Figure 42:
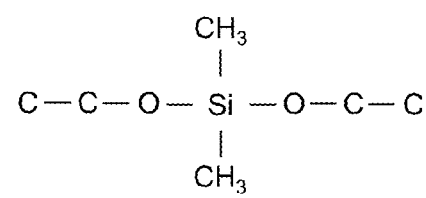
FIG. 42 is a chemical formula for an embodiment of a diethoxy dimethyl silane in accordance with the present inventions.
Figure 43:
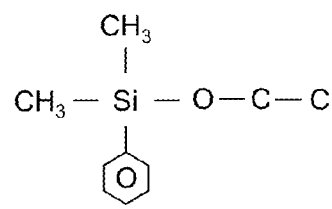
FIG. 43 is a chemical formula for an embodiment of an ethoxy dimethyl phenyl silane in accordance with the present inventions.
Figure 44:
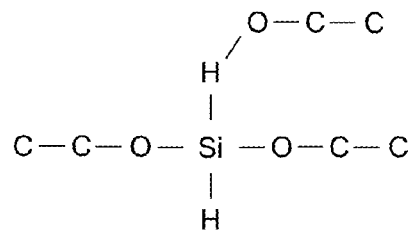
FIG. 44 is a chemical formula for an embodiment of a diethoxy dihydride silane in accordance with the present inventions.
Figure 45:
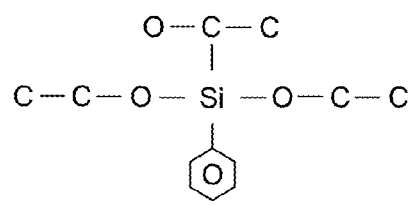
FIG. 45 is a chemical formula for an embodiment of a triethoxy phenyl silane in accordance with the present inventions.
Figure 46:
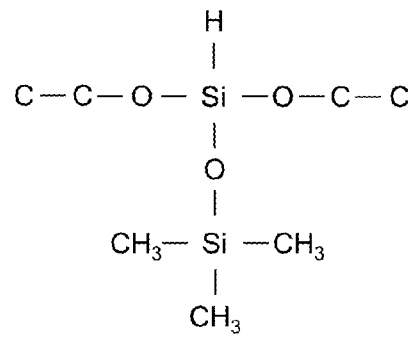
FIG. 46 is a chemical formula for an embodiment of a diethoxy hydride trimethyl siloxane in accordance with the present inventions.
Figure 47:
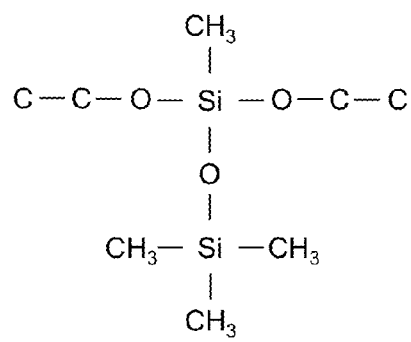
FIG. 47 is a chemical formula for an embodiment of a diethoxy methyl trimethyl siloxane in accordance with the present inventions.
Figure 48:
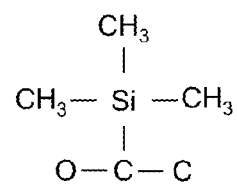
FIG. 48 is a chemical formula for an embodiment of a trimethyl ethoxy silane in accordance with the present inventions.
Figure 49:
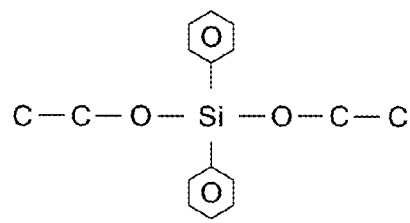
FIG. 49 is a chemical formula for an embodiment of a diphenyl diethoxy silane in accordance with the present inventions.
Figure 50:
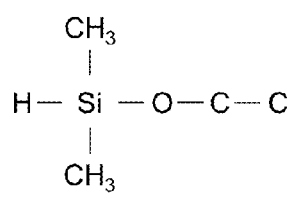
FIG. 50 is a chemical formula for an embodiment of a dimethyl ethoxy hydride siloxane in accordance with the present invention.
Figure 51A:
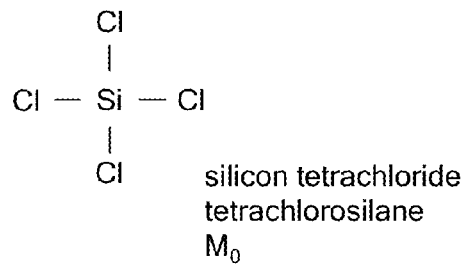
FIGS. 51A to 51F are chemical formulas for starting materials in accordance with the present inventions.
Figure 51D:
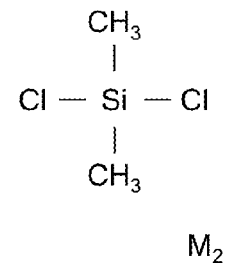
Figure 51B:
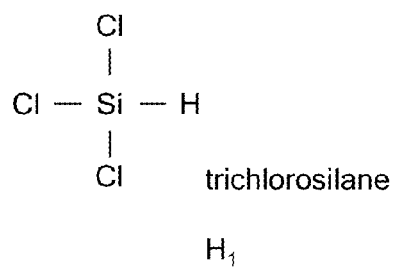
Figure 51E:
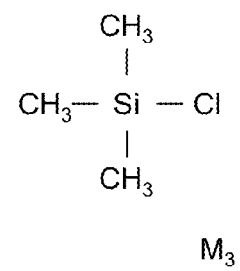
Figure 51C:
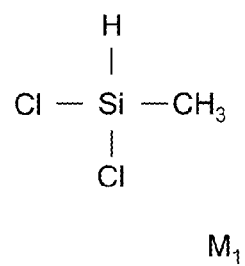
Figure 51F:
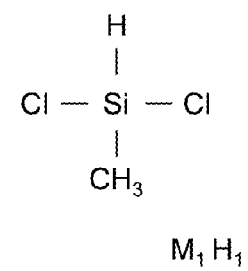

In general a custom polymer for use as a precursor formulation is made by reacting precursors in a condensation reaction to form the polymer precursor formulation. This precursor formulation is then cured into a preform through a hydrolysis reaction. The condensation reaction forms a polymer of the type shown in FIG. 36, where $R_1$ and $R_2$ in the polymeric units can be a H, a Methyl (Me)(—C), a vinyl (—C═C), alkyl (—R), a phenyl (Ph)(—$C_6H_5$), an ethoxy (—O—C—C), a siloxy, methoxy (—O—C), alkoxy, (—O—R), hydroxy, (—O—H), and phenylethyl (—C—C—$C_6H_5$). $R_1$ and $R_2$ may be the same or different. The custom precursor polymers can have several different polymeric units, e.g., $A_1$, $A_2$, $A_n$, and may include as many as 10, 20 or more units, or it may contain only a single unit. (For example, if methyl hydrogen fluid is made by the reaction process). The end units, Si End 1 and Si End 2, can come from the precursors of FIGS. 41, 43, 48, and 50. Additionally, if the polymerization process is properly controlled a hydroxy end cap can be obtained from the precursors used to provide the repeating units of the polymer.

In general, the precursors, e.g., FIGS. 37 to 50 are added to a vessel with ethanol (or other material to absorb heat, e.g., to provide thermal mass), an excess of water, and hydrochloric acid (or other proton source). This mixture is heated until it reaches its activation energy, after which the reaction is exothermic. In this reaction the water reacts with an ethoxy group of the silicon of the precursor monomer, forming a hydroxy (with ethanol as the byproduct). Once formed this hydroxy becomes subject to reaction with an ethoxy group on the silicon of another precursor monomer, resulting in a polymerization reaction. This polymerization reaction is continued until the desired chain length(s) is built.

Control factors for determining chain length are: the monomers chosen (generally, the smaller the monomers the more that can be added before they begin to coil around and bond to themselves); the amount and point in the reaction where end cappers are introduced; and the amount of water and the rate of addition. Thus, the chain lengths can be from about 180 mw (viscosity about 5 cps) to about 65,000 mw (viscosity of about 10,000 cps), greater than about 1000 mw, greater than about 10,000 mw, greater than about 50,000 mw and greater. Further, the polymerized precursor formulation may, and typically does, have polymers of different molecular weights, which can be predetermined to provide formulation, cured, and ceramic product performance features.

Upon completion of the polymerization reaction the material is transferred into a separation apparatus, e.g., a separation funnel, which has an amount of deionized water that is from about 1.2× to about 1.5× the mass of the material. This mixture is vigorously stirred for about less than 1 minute and preferably from about 5 to 30 sections. Once stirred the material is allowed to settle and separate, which may take from about 1 to 2 hours. The polymer is the higher density material and is removed from the vessel. This removed polymer is then dried by either warming in a shallow tray at 90 C for about two hours; or, preferably, is passed through a wiped film distillation apparatus, to remove any residual water and ethanol. Alternatively, sodium bicarbonate sufficient to buffer the aqueous layer to a pH of about 4 to about 7 is added. It is further understood that other, and commercial, manners of separating the polymer from the material may be employed.

Preferably a catalyst is used in the curing process of the polymer pressure formulations from the reaction type process. The same polymers as used for curing the formulation from the mixing type process can be used. It is noted that unlike the mixing type formulations, a catalyst is not necessarily required. However, if not used, reaction time and rates will be slower. The pyrolysis of the cured material is essentially the same as the cured material from the mixing process.

Curing and Pyrolysis

The preform can be cured in a controlled atmosphere, such as an inert gas, or it can be cured in the atmosphere. The cure conditions, e.g., temperature, time, rate, can be predetermined by the formulation to match, for example the size of the preform, the shape of the preform, or the mold holding the preform to prevent stress cracking, off gassing, or other problems associated with the curing process. Further, the curing conditions may be such as to take advantage of, in a controlled manner, what may have been previously perceived as problems associated with the curing process. Thus, for example, off gassing may be used to create a foam material having either open or closed structure. Further, the porosity of the material may be predetermined such that, for example, a particular pore size may be obtained, and in this manner a filter or ceramic screen having predetermined pore sizes, flow characteristic may be made.

The preforms, either unreinforced, neat, or reinforced, may be used as a stand alone product, an end product, a final product, or a preliminary product for which later machining or processing may be performed on. The preforms may also be subject to pyrolysis, which converts the preform material into a ceramic.

During the curing process some formulations may exhibit an exotherm, i.e., a self heating reaction, that can produce a small amount of heat to assist or drive the curing reaction, or they may produce a large amount of heat that may need to be managed and removed in order to avoid problems, such as stress fractures. During the cure off gassing typically occurs and results in a loss of material, which loss is defined generally by the amount of material remaining, e.g., cure yield. The formulations and polysilocarb precursor formulations of embodiments of the present inventions can have cure yields of at least about 90%, about 92%, about 100%. In fact, with air cures the materials may have cure yields above 100%, e.g., about 101-105%, as a result of oxygen being absorbed from the air. Additionally, during curing the material shrinks, this shrinkage may be, depending upon the formulation and the nature of the preform shape, and whether the preform is reinforce, neat or unreinforced, from about 20%, less than 20%, less than about 15%, less than about 5%, less than about 1%, less than about 0.5%, less than about 0.25% and smaller.

In pyrolizing the preform, or cured structure or cured material, it is heated to above about 650° C. to about 1,200° C. At these temperatures typically all organic structures are either removed or combined with the inorganic constituents to form a ceramic. Typically at temperatures in the 650° C. to 1,200° C. range the material is an amorphous glassy ceramic. When heated above 1,200° C. the material may from nano crystalline structures, or micro crystalline structures, such as SiC, Si3N$_4$, SiCN, β SiC, and above 1,900° C. an α SiC structure may form.

During pyrolysis material is loss through off gassing. The amount of material remaining at the end of a pyrolysis set is referred to as char yield (or pyrolysis yield). The formulations and polysilocarb precursor formulations of embodiments of the present inventions can have char yields of at least about 60%, about 70%, about 80%, and at least about 90%, at least about 91% and greater. In fact, with air pyrolysis the materials may have cure yields well above 91%, which can approach 100%. In order to avoid the degradation of the material in an air pyrolysis (noting that typically pyrolysis is conducted in an inert atmospheres) specifically tailored formulations must be used, such as for example, formulations high in phenyl content (at least about 11%, and preferably at least about 20% by weight phenyls), formulations high in allyl content (at least about 15% to about 60%). Thus, there is provided formulations and polysilocarb precursor formulations that are capable of being air pyrolyzed to form a ceramic and to preferably do so at char yield in excess of at least about 80% and above 88%.

The initial or first pyrolysis step generally yields a structure that is not very dense, and for example, has not reached the density required for its intended use. However, in some examples, such as the use of light weight spheres, the first pyrolysis may be sufficient. Thus, typically a reinfiltration process may be performed on the pyrolized material, to add in additional polysilocarb precursor formulation material, to fill in, or fill the voids and spaces in the structure. This reinfiltrated material is they repyrolized. This process of pyrolization, reinfiltration may be repeated, through one, two, three, and up to 10 or more times to obtain the desired density of the final product. Additionally, with formulations of embodiments of the present inventions, the viscosity of the formulation may be tailored to provide more efficient reinfiltrations, and thus, a different formulation may be used at later reinfiltration steps, as the voids or pores become smaller and more difficult to get the formulation material into it. The high char yields, and other features of embodiments of the present invention, enable the manufacture of completely closed structures, e.g., "helium tight" materials, with less than twelve reinfiltration steps, less than about 10 reinfiltrations steps and less than five reinfiltrations steps. Thus, by way of example, an initial inert gas pyrolysis may be performed with a high char yield formulation followed by four reinfiltration air pyrolysis steps.

Upon curing the polysilocarb precursor formulation a cross linking reaction takes place that provides a cross linked structure having, among other things, an —$R_1$—Si—C—C—Si—O—Si—C—C—Si—$R_2$— where $R_1$ and $R_2$ vary depending upon, and are based upon, the precursors used in the formulation. The cured structure may also have a structure comprising —Si—O—Si—O—Si—O—Si— with carbon groups appended from that back bone, which carbon groups may not be a part of that back bone.

Embodiments of the present inventions have the ability to utilize precursors that have impurities, high-level impurities and significant impurities. Thus, the precursors may have more than about 0.1% impurities, more than about 0.5%, more than about 1% impurities, more than about 5% impurities, more than about 10% impurities, and more than about 50% impurities. In using materials with impurities, the amounts of these impurities, or at least the relative amounts, so that the amount of actual precursor is known, should preferably be determined by for example GPC (Gel Permeation Chromatography) or other methods of analysis. In this manner the formulation of the polysilocarb precursor formulation may be adjusted for the amount of impurities present. The ability of embodiments of the present invention to utilize lower level impurity materials, and essentially impure materials, and highly impure materials, provides significant advantages over other method of making polymer derived ceramics. This provides two significant advantages, among other things. First, the ability to use impure, lower purity, materials in embodiments of the present inventions, provides the ability to greatly reduce the cost of the formulations and end products, e.g., cured preforms, cured parts, and ceramic parts or structures. Second, the ability to use impure, lower purity, materials in embodiments of the present inventions, provides the ability to have end products, e.g., cured preforms, cured parts, and ceramic parts or structures, that have a substantially greater consistence from part to part, because variations in starting materials can be adjusted for during the formulation of each polysilocarb precursor formulation.

EXAMPLES

The following examples are provided to illustrate various embodiments of processes, precursors, polysilocarb formulations, prepregs, cured preforms, and ceramics of the present inventions. These examples are for illustrative purposes, and should not be viewed as, and do not otherwise limit the scope of the present inventions. The percentages used in the examples, unless specified otherwise, are weight percents of the total formulation, preform or structure.

Example 1

A polysilocarb formulation using the mixing type method is formulated. The formulation is made by mixing together at room temperature 70% of the MHF precursor of the formula of FIG. 1 and a molecular weight of about 800 and 30% of the allyl terminated precursor of the formula of FIG. 5 having a molecular weight of about 500 are mixed together in a vessel and put in storage for later use. The polysilocarb formulation has good shelf life and room temperature and the precursors have not, and do not react with each other. The polysilocarb formulation has a viscosity of about 12 cps.

Example 2

A polysilocarb formulation using the mixing type method is formulated. The formulation is made by mixing together at room temperature 60% of the MHF precursor of the formula of FIG. 1 and a molecular weight of about 800 and 40% of the vinyl terminated precursor of the formula of FIG. 6 having a molecular weight of about 9,400 are mixed together in a vessel and put in storage for later use. The polysilocarb formulation has good shelf life and room temperature and the precursors have not, and do not react with each other. The polysilocarb formulation has a viscosity of about 200 cps.

Example 3

A polysilocarb formulation using the mixing type method is formulated. The formulation is made by mixing together 50% of the MH precursor of the formula of FIG. 1 and a molecular weight of about 800 and 50% of the vinyl terminated precursor of the formula of FIG. 6 having a molecular weight of about 800 are mixed together in a vessel and put in storage for later use. The polysilocarb formulation has good shelf life and room temperature and the precursors have not, and do not react with each other. The polysilocarb formulation has a viscosity of about 55 cps.

Example 4

A polysilocarb formulation using the mixing type method is formulated. The formulation is made by mixing together 40% of the MH precursor of the formula of FIG. 1 and a molecular weight of about 1,000 and 60% of the vinyl terminated precursor of the formula of FIG. 6 having a molecular weight of about 500 are mixed together in a vessel and put in storage for later use. The polysilocarb formulation has good shelf life and room temperature and the precursors have not, and do not react with each other. The polysilocarb formulation has a viscosity of about 25 cps.

Example 5

A polysilocarb formulation using the mixing type method is formulated. The formulation is made by mixing together 30% of the MHF precursor of the formula of FIG. 1 and a molecular weight of about 800 and 70% of the vinyl terminated precursor of the formula of FIG. 6 having a molecular weight of about 500 are mixed together in a vessel and put in storage for later use. The polysilocarb formulation has good shelf life and room temperature and the precursors have not, and do not react with each other. The polysilocarb formulation has a viscosity of about 10 cps.

Example 6

The polysilocarb formulation of Example 1 has 40% of an about 80 micron to about 325 mesh SiC filler added to the formulation to make a filled polysilocarb formulation, which can be kept for later use.

Example 7

The polysilocarb formulation of Example 2 has 30% of an about 80 micron to about 325 mesh SiC filler added to the formulation to make a filled polysilocarb formulation, which can be kept for later use.

Example 7a

The polysilocarb batch of Example 3 has 50% of an about 80 micron to about 325 mesh SiC filler added to the batch to make a filled polysilocarb batch, which can be kept for later use.

Example 7b

The polysilocarb batch of Example 4 has 28% of an about 80 micron to about 325 mesh SiC filler added to the batch to make a filled polysilocarb batch, which can be kept for later use.

Example 7c

The polysilocarb batch of Example 5 has 42% of an about 80 micron to about 325 mesh SiC filler added to the batch to make a filled polysilocarb batch, which can be kept for later use.

Example 8

A polysilocarb formulation using the mixing type method is formulated. The formulation is made by mixing together 10% of the MHF precursor of the formula of FIG. 1 and a molecular weight of about 800 and 73% of the styrene (phenylethyl) precursor of the formula of FIG. 16 (having 10% X) and a molecular weight of about 1,000, and 16% of the TV precursor of the formula of FIG. 17, and 1% of the OH terminated precursor of the formula of FIG. 7, having a molecular weight of about 1,000 are mixed together in a vessel and put in storage for later use. The polysilocarb formulation has good shelf life and room temperature and the precursors have not, and do not react with each other. The polysilocarb formulation has a viscosity of about 72 cps.

Example 9

A polysilocarb formulation using the mixing type method is formulated. The formulation is made by mixing together 0-90% of the MH precursor of the formula of FIG. 1 and a molecular weight of about 800, and 0-90% of the styrene precursor of the formula of FIG. 16 (having 10% X) and a molecular weight of about 1000, and 0-30% of the TV precursor of the formula of FIG. 17, and 0-30% of the vinyl terminated precursor of the formula of FIG. 6 having a molecular weight of about 9400 and 0-20% of the OH terminated precursor of the formula of FIG. 7, having a molecular weight of about 800 are mixed together in a vessel and put in storage for later use. The polysilocarb formulation has good shelf life and room temperature and the precursors have not, and do not react with each other. The polysilocarb formulation has a viscosity of about 100 cps.

Example 10

A polysilocarb formulation using the mixing type method is formulated. The formulation is made by mixing together 70% of the MHF precursor of the formula of FIG. 1 and 30% of the vinyl terminated precursor of the formula of FIG. 6 having a molecular weight of about 500 and about 42% of a submicron and a 325 mesh silica are mixed together in a vessel and put in storage for later use. The polysilocarb formulation has good shelf life and room temperature and the precursors have not, and do not react with each other. The polysilocarb formulation has a viscosity of about 300 cps.

Example 11

A polysilocarb formulation using the mixing type method is formulated. The formulation is made by mixing together 20-80% of the MH precursor of the formula of FIG. 1 and a molecular weight of about 800, and 0-10% of the TV precursor of the formula of FIG. 17, and 5-80% of the vinyl terminated precursor of the formula of FIG. 6 having a molecular weight of about and about 500 of submicron, 325 mesh, and 8 micron SiC are mixed together in a vessel and put in storage for later use. The polysilocarb formulation has good shelf life and room temperature and the precursors have not, and do not react with each other. The polysilocarb formulation has a viscosity of about 300 cps.

Example 12

40 ppm of a platinum catalyst is added to the polysilocarb formulation of Examples 6, 7, 7a, 7b, and 7c and these catalyzed formulations are added drop wise (e.g., drops of the formulation are dropped into) to a 50-120° C. hot water bath to cure the formulation. The time in the hot water bath was about 1-2 minutes. The cured drop structures were then pyrolized at 950° C. for about 60 minutes. The pyrolized structures were hollow spheres with densities of less than about 1 g/cc, diameters of about 60 microns to about 2 mm, and crush strengths of about 0.5-2 ksi.

Example 13

A precursor formulation of having 75% MHF, 15% TV, and 10% VT is formed using the mixing type process and stored.

Example 14a

1% catalyst (10 ppm platinum and 0.5% LUPEROX 231 peroxide) is added to the precursor formulation of Example 13. The catalyzed precursor is then impregnated into a reinforcing material and cured to form a composite.

Example 14b

The cured material of Example 14a is pyrolized to form a polysilocarb derived ceramic composite material.

Example 14c

1% catalyst (10 ppm platinum and 0.5% LUPEROX 231 peroxide) is added to the precursor formulation of Example 13. Using a tower forming and cure system, the catalyzed polysilocarb formulation is formed from a sonic nozzle having an internal diameter of 0.180 inches into droplets that fall from the nozzle into and through an 8 foot curing tower. The temperature at the top of the tower is from 495-505° C. the temperature at the bottom of the tower is 650° C. There are no discrete temperature zones in the tower. Airflow up the tower is by convection. The collection pan is maintained at 110° C. The forming and curing are done in air. The preform beads are removed from the pan and post (hard) cured at 200° C. in air for 2 hours. The hard cured preform proppants are pyrolized at 1000° C. in an argon atmosphere for 2 hours. The cure yield is from 99% to 101%. The char yield is 86%.

Example 14d

1% catalyst (10 ppm platinum and 0.5% LUPEROX 231 peroxide) is added to the formulation of Example 13, and the polysilocarb formulation is formed into a prepreg having carbon fiber reinforcement. The prepreg curing is done in Argon and at 200° C. for 2 hours. The hard cured preform are pyrolized at 1000° C. under vacuum for 5 hours.

Example 15

A polysilocarb precursor formulation having 70% MHF, 20% TV, and 10% VT is formed using the mixing type process and placed in a container.

Example 16a

1% catalyst (10 ppm platinum and 0.5% LUPEROX 231 peroxide) is added to the precursor formulation of Example 15. The catalyzed precursor is then impregnated into a reinforcing material and cured to form a composite.

Example 16b

The cured material of Example 16a is pyrolized to form a polysilocarb derived ceramic composite material.

Example 16c

1% catalyst (10 ppm platinum and 0.5% LUPEROX 231 peroxide) is added to the formulation of Example 15, and the polysilocarb formulation is formed into a prepreg having carbon fiber reinforcement. The prepreg curing is done in Argon and at 200° C. for 2 hours. The hard cured preform are pyrolized at 1000° C. under vacuum for 5 hours.

Example 17

Using a tower forming and cure system, a polysilocarb formulation from the mixing type process and having 70% MHF, 20% TV, 10% VT and 1% catalyst (10 ppm platinum and 0.5% LUPEROX 231 peroxide) is formed from a sonic nozzle having an internal diameter of 0.180 inches into droplets that fall from the nozzle into and through an 8 foot curing tower. The temperature at the top of the tower is from 495-505° C. the temperature at the bottom of the tower is 650° C. There are no discrete temperature zones in the tower. Airflow up the tower is by convection. The collection pan is maintained at 110° C. The forming and curing are done in air. The preform proppants are removed from the pan and post (hard) cured at 200° C. in air for 2 hours. The hard cured preform beads are pyrolized at 1000° C. under vacuum for 2 hours. The cure yield is from 99% to 101%. The char yield is 86%.

Example 18a

The pyrolized preform of Example 16c, is infused with a polysiloxane precursor formulation and pyrolized.

Example 18b

The pyrolized preform of Example 18a, is infused with a polysiloxane precursor formulation and pyrolized.

Example 19

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Methyltriethoxysilane (FIG. 37) | 120.00 | 19.5% | 178.30 | 0.67 | 47.43% | 0.67 | 2.02 |
| Phenylmethyldiethoxysilane (FIG. 38) | 0.00 | 0.0% | 210.35 | — | 0.00% | — | — |
| Dimethyldiethoxysilane (FIG. 42) | 70.00 | 11.4% | 148.28 | 0.47 | 33.27% | 0.47 | 0.94 |
| Methyldiethoxysilane (FIG. 39) | 20.00 | 3.3% | 134.25 | 0.15 | 10.50% | 0.15 | 0.30 |
| Vinylmethyldiethoxysilane (FIG. 40) | 20.00 | 3.3% | 160.29 | 0.12 | 8.79% | 0.12 | 0.25 |
| Trimethyethoxysilane (FIG. 48) | 0.00 | 0.0% | 118.25 | — | 0.00% | — | — |
| Hexane in hydrolyzer | 0.00 | 0.0% | 86.18 | — | | | |
| Acetone in hydrolyzer | 320.00 | 52.0% | 58.08 | 5.51 | | | |
| Ethanol in hydrolyzer | 0.00 | 0.0% | 46.07 | — | | | |
| Water in hydrolyzer | 64.00 | 10.4% | 18.00 | 3.56 | | | |
| HCl | 0.36 | 0.1% | 36.00 | 0.01 | | | |
| Sodium bicarbonate | 0.84 | 0.1% | 84.00 | 0.01 | | | |

Example 20

Using the reaction type process a precursor formulation was made using the following formulation. The temperature of the reaction was maintained at 72° C. for 21 hours.

| Reactant or Solvent | Mass | % of Total | MW | Moles of Reactant/solvent | % of Total Moles of Silane | Moles of Si | Moles of EtOH |
|---|---|---|---|---|---|---|---|
| Phenyltriethoxysilane (FIG. 45) | 234.00 | 32.0% | 240.37 | 0.97 | 54.34% | 0.97 | 2.92 |
| Phenylmethyldiethoxysilane (FIG. 38) | 90.00 | 12.3% | 210.35 | 0.43 | 23.88% | 0.43 | 0.86 |
| Dimethyldiethoxysilane (FIG. 42) | 0.00 | 0.0% | 148.28 | — | 0.00% | — | — |
| Methyldiethoxysilane (FIG. 39) | 28.50 | 3.9% | 134.25 | 0.21 | 11.85% | 0.21 | 0.42 |
| Vinylmethyldiethoxysilane (FIG. 40) | 28.50 | 3.9% | 160.29 | 0.18 | 9.93% | 0.18 | 0.36 |
| Trimethyethoxysilane (FIG. 48) | 0.00 | 0.0% | 118.25 | — | 0.00% | — | — |
| Acetone in hydrolyzer | 0.00 | 0.0% | 58.08 | — | | | |
| Ethanol in hydrolyzer | 265.00 | 36.3% | 46.07 | 5.75 | | | |
| Water in hydrolyzer | 83.00 | 11.4% | 18.00 | 4.61 | | | |
| HCl | 0.36 | 0.0% | 36.00 | 0.01 | | | |
| Sodium bicarbonate | 0.84 | 0.1% | 84.00 | 0.01 | | | |

Example 21

Using the reaction type process a precursor formulation was made using the following formulation. The temperature of the reaction was maintained at 61° C. for 21 hours.

| Reactant or Solvent | Mass | % of Total | MW | Moles of Reactant/solvent | % of Total Moles of Silane | Moles of Si | Moles of EtOH |
|---|---|---|---|---|---|---|---|
| Phenyltriethoxysilane (FIG. 45) | 142.00 | 21.1% | 240.37 | 0.59 | 37.84% | 0.59 | 1.77 |
| Phenylmethyldiethoxysilane (FIG. 38) | 135.00 | 20.1% | 210.35 | 0.64 | 41.11% | 0.64 | 1.28 |
| Dimethyldiethoxysilane (FIG. 42) | 0.00 | 0.0% | 148.28 | — | 0.00% | — | — |
| Methyldiethoxysilane (FIG. 39) | 24.00 | 3.6% | 134.25 | 0.18 | 11.45% | 0.18 | 0.36 |
| Vinylmethyldiethoxysilane (FIG. 40) | 24.00 | 3.6% | 160.29 | 0.15 | 9.59% | 0.15 | 0.30 |
| Trimethyethoxysilane (FIG. 48) | 0.00 | 0.0% | 118.25 | — | 0.00% | — | — |
| Acetone in hydrolyzer | 278.00 | 41.3% | 58.08 | 4.79 | | | |
| Ethanol in hydrolyzer | 0.00 | 0.0% | 46.07 | — | | | |
| Water in hydrolyzer | 69.00 | 10.2% | 18.00 | 3.83 | | | |
| HCl | 0.36 | 0.1% | 36.00 | 0.01 | | | |
| Sodium bicarbonate | 0.84 | 0.1% | 84.00 | 0.01 | | | |

Example 22

Using the reaction type process a precursor formulation was made using the following formulation. The temperature of the reaction was maintained at 72° C. for 21 hours.

| Reactant or Solvent | Mass | % of Total | MW | Moles of Reactant/solvent | % of Total Moles of Silane | Moles of Si | Moles of EtOH |
|---|---|---|---|---|---|---|---|
| Methyltriethoxysilane (FIG. 37) | 0.00 | 0.0% | 178.30 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 56 | 7.2% | 148.28 | 0.38 | 17.71% | 0.38 | 0.76 |

-continued

| Reactant or Solvent | Mass | % of Total | MW | Moles of Reactant/ solvent | % of Total Moles of Silane | Moles of Si | Moles of EtOH |
|---|---|---|---|---|---|---|---|
| Methyldiethoxysilane (FIG. 39) | 182 | 23.2% | 134.25 | 1.36 | 63.57% | 1.36 | 2.71 |
| Vinylmethyldiethoxysilane (FIG. 40) | 64 | 8.2% | 160.29 | 0.40 | 18.72% | 0.40 | 0.80 |
| Triethoxysilane (FIG. 44) | 0.00 | 0.0% | 164.27 | — | 0.00% | — | — |
| Hexane in hydrolyzer | 0.00 | 0.0% | 86.18 | — | | | |
| Acetone in hydrolyzer | 0.00 | 0.0% | 58.08 | — | | | |
| Ethanol in hydrolyzer | 400.00 | 51.1% | 46.07 | 8.68 | | | |
| Water in hydrolyzer | 80.00 | 10.2% | 18.00 | 4.44 | | | |
| HCl | 0.36 | 0.0% | 36.00 | 0.01 | | | |
| Sodium bicarbonate | 0.84 | 0.1% | 84.00 | 0.01 | | | |

Example 23

Using the reaction type process a precursor formulation 20 was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 198.00 | 26.6% | 240.37 | 0.82 | 52.84% | 0.82 | 2.47 |
| Phenylmethyldiethoxysilane (FIG. 38) | 0.00 | 0.0% | 210.35 | — | 0.00% | — | — |
| Dimethyldiethoxysilane (FIG. 42) | 109.00 | 14.6% | 148.28 | 0.74 | 47.16% | 0.74 | 1.47 |
| Methyldiethoxysilane (FIG. 39) | 0.00 | 0.0% | 134.25 | — | 0.00% | — | — |
| Vinylmethyldiethoxysilane (FIG. 40) | 0.00 | 0.0% | 160.29 | — | 0.00% | — | — |
| Trimethyethoxysilane (FIG. 48) | 0.00 | 0.0% | 118.25 | — | 0.00% | — | — |
| Acetone in hydrolyzer | 365.00 | 49.0% | 58.08 | 6.28 | | | |
| Ethanol in hydrolyzer | 0.00 | 0.0% | 46.07 | — | | | |
| Water in hydrolyzer | 72.00 | 9.7% | 18.00 | 4.00 | | | |
| HCl | 0.36 | 0.0% | 36.00 | 0.01 | | | |
| Sodium bicarbonate | 0.84 | 0.1% | 84.00 | 0.01 | | | |

Example 24

Using the reaction type process a precursor formulation 45 was made using the following formulation. The temperature of the reaction was maintained at 72° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 180.00 | 22.7% | 240.37 | 0.75 | 44.10% | 0.75 | 2.25 |
| Phenylmethyldiethoxysilane (FIG. 38) | 50.00 | 6.3% | 210.35 | 0.24 | 14.00% | 0.24 | 0.48 |
| Dimethyldiethoxysilane (FIG. 42) | 40.00 | 5.0% | 148.28 | 0.27 | 15.89% | 0.27 | 0.54 |
| Methyldiethoxysilane (FIG. 39) | 30.00 | 3.8% | 134.25 | 0.22 | 13.16% | 0.22 | 0.45 |
| Vinylmethyldiethoxysilane (FIG. 40) | 35.00 | 4.4% | 160.29 | 0.22 | 12.86% | 0.22 | 0.44 |
| Trimethyethoxysilane (FIG. 48) | 0.00 | 0.0% | 118.25 | — | 0.00% | — | — |
| Hexane in hydrolyzer | 0.00 | 0.0% | 86.18 | — | | | |
| Acetone in hydrolyzer | 0.00 | 0.0% | 58.08 | — | | | |
| Ethanol in hydrolyzer | 380.00 | 48.0% | 46.07 | 8.25 | | | |

-continued

| Reactant or Solvent | Mass | % of Total | MW | Moles of Reactant/ solvent | % of Total Moles of Silane | Moles of Si | Moles of EtOH |
|---|---|---|---|---|---|---|---|
| Water in hydrolyzer | 76.00 | 9.6% | 18.00 | 4.22 | | | |
| HCl | 0.36 | 0.0% | 36.00 | 0.01 | | | |
| Sodium bicarbonate | 0.84 | 0.1% | 84.00 | 0.01 | | | |

Example 25

Using the reaction type process a precursor formulation was made using the following formulation. The temperature of the reaction was maintained at 72° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 190.00 | 23.8% | 240.37 | 0.79 | 47.22% | 0.79 | 2.37 |
| Phenylmethyldiethoxysilane (FIG. 38) | 75.00 | 9.4% | 210.35 | 0.36 | 21.30% | 0.36 | 0.71 |
| Dimethyldiethoxysilane (FIG. 42) | 45.00 | 5.6% | 148.28 | 0.30 | 18.13% | 0.30 | 0.61 |
| Methyldiethoxysilane (FIG. 39) | 30.00 | 3.8% | 134.25 | 0.22 | 13.35% | 0.22 | 0.45 |
| Vinylmethyldiethoxysilane (FIG. 40) | 0.00 | 0.0% | 160.29 | — | 0.00% | — | — |
| Trimethyethoxysilane (FIG. 48) | 0.00 | 0.0% | 118.25 | — | 0.00% | — | — |
| Hexane in hydrolyzer | 0.00 | 0.0% | 86.18 | — | | | |
| Acetone in hydrolyzer | 0.00 | 0.0% | 58.08 | — | | | |
| Ethanol in hydrolyzer | 380.00 | 47.7% | 46.07 | 8.25 | | | |
| Water in hydrolyzer | 76.00 | 9.5% | 18.00 | 4.22 | | | |
| HCl | 0.36 | 0.0% | 36.00 | 0.01 | | | |
| Sodium bicarbonate | 0.84 | 0.1% | 84.00 | 0.01 | | | |

Example 26

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 235.00 | 31.5% | 148.28 | 1.58 | 83.32% | 1.58 | 3.17 |
| Methyldiethoxysilane (FIG. 39) | 0.00 | 0.0% | 134.25 | — | 0.00% | — | — |
| Vinylmethyldiethoxysilane (FIG. 40) | 0.00 | 0.0% | 160.29 | — | 0.00% | — | — |
| TES 40 (FIG. 35) | 66.00 | 8.8% | 208.00 | 0.32 | 16.68% | 0.32 | 1.27 |
| Hexane in hydrolyzer | 0.00 | 0.0% | 86.18 | — | | | |
| Acetone in hydrolyzer | 370.00 | 49.6% | 58.08 | 6.37 | | | |
| Ethanol in hydrolyzer | 0.00 | 0.0% | 46.07 | — | | | |
| Water in hydrolyzer | 74.00 | 9.9% | 18.00 | 4.11 | | | |
| HCl | 0.36 | 0.0% | 36.00 | 0.01 | | | |
| Sodium bicarbonate | 0.84 | 0.1% | 84.00 | 0.01 | | | |

Example 27

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 95.00 | 11.8% | 148.28 | 0.64 | 34.95% | 0.64 | 1.28 |
| Methyldiethoxysilane (FIG. 39) | 60.80 | 7.6% | 134.25 | 0.45 | 24.71% | 0.45 | 0.91 |
| Vinylmethyldiethoxysilane (FIG. 40) | 73.15 | 9.1% | 160.29 | 0.46 | 24.90% | 0.46 | 0.91 |
| TES 40 (FIG. 35) | 58.90 | 7.3% | 208.00 | 0.28 | 15.45% | 0.28 | 1.13 |
| Hexane in hydrolyzer | 0.00 | 0.0% | 86.18 | — | | | |
| Acetone in hydrolyzer | 430.00 | 53.4% | 58.08 | 7.40 | | | |
| Ethanol in hydrolyzer | 0.00 | 0.0% | 46.07 | — | | | |
| Water in hydrolyzer | 86.00 | 10.7% | 18.00 | 4.78 | | | |
| HCl | 0.36 | 0.0% | 36.00 | 0.01 | | | |
| Sodium bicarbonate | 0.84 | 0.1% | 84.00 | 0.01 | | | |

Example 28

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 140.00 | 17.9% | 148.28 | 0.94 | 58.38% | 0.94 | 1.89 |
| Methyldiethoxysilane (FIG. 39) | 0.00 | 0.0% | 134.25 | — | 0.00% | — | — |
| Vinylmethyldiethoxysilane (FIG. 40) | 0.00 | 0.0% | 160.29 | — | 0.00% | — | — |
| TES 40 (F(G. 35) | 140.00 | 17.9% | 208.00 | 0.67 | 41.62% | 0.67 | 2.69 |
| Hexane in hydrolyzer | 0.00 | 0.0% | 86.18 | — | | | |
| Acetone in hydrolyzer | 420.00 | 53.6% | 58.08 | 7.23 | | | |
| Ethanol in hydrolyzer | 0.00 | 0.0% | 46.07 | — | | | |
| Water in hydrolyzer | 84.00 | 10.7% | 18.00 | 4.67 | | | |

Example 29

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 20.00 | 2.6% | 148.28 | 0.13 | 10.67% | 0.13 | 0.27 |
| Methyldiethoxysilane (FIG. 39) | 0.00 | 0.0% | 134.25 | — | 0.00% | — | — |
| Vinylmethyldiethoxysilane (FIG. 40) | 0.00 | 0.0% | 160.29 | — | 0.00% | — | — |
| TES 40 (FIG. 35) | 235.00 | 30.0% | 208.00 | 1.13 | 89.33% | 1.13 | 4.52 |

-continued

| Reactant or Solvent | Mass | % of Total | MW | Moles of Reactant/ solvent | % of Total Moles of Silane | Moles of Si | Moles of EtOH |
|---|---|---|---|---|---|---|---|
| Hexane in hydrolyzer | 0.00 | 0.0% | 86.18 | — | | | |
| Acetone in hydrolyzer | 440.00 | 56.2% | 58.08 | 7.58 | | | |
| Ethanol in hydrolyzer | 0.00 | 0.0% | 46.07 | — | | | |
| Water in hydrolyzer | 88.00 | 11.2% | 18.00 | 4.89 | | | |

Example 30

The polysilocarb formulation is 60% MHF, 20% TV, 5% Vt and 10% MVF (a reacted formulation of all vinylmethyldiethoxysilane, e.g., the formulations of Examples 38-40)

Example 31

The polysilocarb formulation has 41% MHF and 59% TV.

Example 32

The polysilocarb formulation has from about 40% MHF to about 55% MHF and from about 60% MVF to about 55% MVF.

Example 33

The polysilocarb formulation has 70% MHF, 20% TV, and 10% VT.

Example 34

The polysilocarb formulation has 95% MHF and 5% TV.

Example 35

The polysilocarb formulations are made using phenyltriethoxysilane (FIG. 45), phenylmethyldiethoxysilane (FIG. 38), methyldiethoxysilane (FIG. 39) and Vinylmethyldiethoxysilane (FIG. 40), as well as, dimethyldiethoxysilane and methylriethoxysilane. The mass percentages of the phenyltriethoxysilane and phenylmethyldiethoxysilane (or dimethyldiethoxysilane and methylriethoxysilane) would likely range from 10% to 80%, with the preferred range around 40-60% (of either, or total of both).

Example 36

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 145.00 | 18.5% | 240.37 | 0.60 | 34.58% | 0.60 | 1.81 |
| Phenylmethyldiethoxysilane (FIG. 38) | 0.00 | 0.0% | 210.35 | — | 0.00% | — | — |
| Dimethyldiethoxysilane (FIG. 42) | 0.00 | 0.0% | 148.28 | 0.57 | 32.88% | 0.57 | 1.55 |
| Methyldiethoxysilane (FIG. 39) | 77.00 | 9.8% | 134.25 | — | 0.00% | — | — |
| Vinylmethyldiethoxysilane (FIG. 40) | 91.00 | 11.6% | 160.29 | 0.57 | 32.54% | 0.57 | 1.14 |
| Trimethyethoxysilane (FIG. 48) | 0.00 | 0.0% | 118.25 | — | 0.00% | — | — |
| Acetone in hydrolyzer | 395.00 | 50.3% | 58.08 | 6.80 | | | |
| Ethanol in hydrolyzer | 0.00 | 0.0% | 46.07 | — | | | |
| Water in hydrolyzer | 76.00 | 9.7% | 18.00 | 4.22 | | | |
| HCl | 0.36 | 0.0% | 36.00 | 0.01 | | | |
| Sodium bicarbonate | 0.84 | 0.1% | 84.00 | 0.01 | | | |

Example 37

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.00% | 240.37 | — | 0.0% | — | — |
| Phenylmethyldiethoxysilane (FIG. 38) | 145.00 | 18.4% | 210.35 | 0.69 | 34.47% | 0.69 | 1.38 |
| Dimethyldiethoxysilane (FIG. 42) | 0.00 | 0.00% | 148.28 | — | 0.00% | — | — |
| Methyldiethoxysilane (FIG. 39) | 88.00 | 11.2% | 134.25 | 0.66 | 32.78% | 0.66 | 1.31 |
| Vinylmethyldiethoxysilane (FIG. 40) | 105.00 | 13.3% | 160.29 | 0.66 | 32.76% | 0.66 | 1.31 |

| Reactant or Solvent | Mass | % of Total | MW | Moles of Reactant/ solvent | % of Total Moles of Silane | Moles of Si | Moles of EtOH |
|---|---|---|---|---|---|---|---|
| Trimethyethoxysilane (FIG. 48) | 0.00 | 0.0% | 118.25 | — | 0.00% | — | — |
| Acetone in hydrolyzer | 375.00 | 47.5% | 58.08 | 6.46 | | | |
| Ethanol in hydrolyzer | 0.00 | 0.0% | 46.07 | — | | | |
| Water in hydrolyzer | 75.00 | 9.5% | 18.00 | 4.17 | | | |
| HCl | 0.36 | 0.0% | 36.00 | 0.01 | | | |
| Sodium bicarbonate | 0.84 | 0.1% | 84.00 | 0.01 | | | |

Example 38

Using the reaction type process an MVF precursor formulation was made using the following formulation. The temperature of the reaction was maintained at 72° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 0.00 | 0.0% | 148.28 | — | 0.00% | — | — |
| Methyldiethoxysilane (FIG. 39) | 0.00 | 0.0% | 134.25 | — | 0.00% | — | — |
| Vinylmethyldiethoxysilane (FIG. 40) | 1584.00 | 41.1% | 160.29 | 9.88 | 100.00% | 9.88 | 19.76 |
| Hexane in hydrolyzer | 0.00 | 0.0% | 86.18 | — | | | |
| Acetone in hydrolyzer | 0.00 | 0.0% | 58.08 | — | | | |
| Ethanol in hydrolyzer | 1875.00 | 49.0% | 46.07 | 40.70 | | | |
| Water in hydrolyzer | 370.00 | 9.7% | 18.00 | 20.56 | | | |
| HCl (pH 2, 36 g/100 g water) | 0.36 | | 36.00 | 0.01 | | | |
| Sodium bicarbonate | 0.84 | | 84.00 | 0.01 | | | |

Example 39

Using the reaction type process an MVF precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 0.00 | 0.0% | 148.28 | — | 0.00% | — | — |
| Methyldiethoxysilane (FIG. 39) | 0.00 | 0.0% | 134.25 | — | 0.00% | — | — |
| Vinylmethyldiethoxysilane (FIG. 40) | 1584.00 | 42.0% | 160.29 | 9.88 | 100.00% | 9.88 | 19.76 |
| Hexane in hydrolyzer | 0.00 | 0.0% | 86.18 | — | | | |
| Acetone in hydrolyzer | 1825.00 | 48.3% | 58.08 | 31.42 | | | |
| Ethanol in hydrolyzer | 0.00 | 0.0% | 46.07 | — | | | |
| Water in hydrolyzer | 365.00 | 9.7% | 18.00 | 20.28 | | | |
| HCl (pH 2, 36 g/100 g water) | 0.36 | | 36.00 | 0.01 | | | |
| Sodium bicarbonate | 0.84 | | 84.00 | 0.01 | | | |

Example 40

Using the reaction type process an MVF precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 0.00 | 0.0% | 240.37 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 0.00 | 0.0% | 148.28 | — | 0.00% | — | — |
| Methyldiethoxysilane (FIG. 39) | 0.00 | 0.0% | 134.25 | — | 0.00% | — | — |
| Vinylmethyldiethoxysilane (FIG. 40) | 33.00 | 41.9% | 160.29 | 2.06 | 100.00% | 2.06 | 4.12 |
| Hexane in hydrolyzer | 0.00 | 0.0% | 86.18 | — | | | |
| Acetone in hydrolyzer | 380.00 | 48.3% | 58.08 | 6.54 | | | |
| Ethanol in hydrolyzer | 0.00 | 0.0% | 46.07 | — | | | |
| Water in hydrolyzer | 76.00 | 9.7% | 18.00 | 4.22 | | | |
| HCl (pH 2, 36 g/100 g water) | 0.36 | | 36.00 | 0.01 | | | |
| Sodium bicarbonate | 0.84 | | 84.00 | 0.01 | | | |

Example 41

Using the reaction type process a precursor formulation was made using the following formulation. The temperature of the reaction was maintained at 72° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Methyltriethoxysilane (FIG. 37) | 0.00 | 0.0% | 178.30 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 56 | 7.2% | 148.28 | 0.38 | 17.71% | 0.38 | 0.76 |
| Methyldiethoxysilane (FIG. 39) | 182 | 23.2% | 134.25 | 1.36 | 63.57% | 1.36 | 2.71 |
| Vinylmethyldiethoxysilane (FIG. 40) | 64 | 8.2% | 160.29 | 0.40 | 18.72% | 0.40 | 0.80 |
| Triethoxysilane | 0.00 | 0.0% | 164.27 | — | 0.00% | — | — |
| Hexane in hydrolyzer | 0.00 | 0.0% | 86.18 | — | | | |
| Acetone in hydrolyzer | 0.00 | 0.0% | 58.08 | — | | | |
| Ethanol in hydrolyzer | 400.00 | 51.1% | 46.07 | 8.68 | | | |
| Water in hydrolyzer | 80.00 | 10.2% | 18.00 | 4.44 | | | |
| HCl | 0.36 | 0.0% | 36.00 | 0.01 | | | |
| Sodium bicarbonate | 0.84 | 0.1% | 84.00 | 0.01 | | | |

Example 42

Using the reaction type process a precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Methyltriethoxysilane (FIG. 37) | 0.00 | 0.0% | 178.30 | — | 0.00% | — | — |
| Phenylmethyldiethoxysilane (FIG. 38) | 0.00 | 0.0% | 210.35 | — | 0.00% | — | — |
| Dimethyldiethoxysilane (FIG. 42) | 56 | 7.2% | 148.28 | 0.38 | 17.71% | 0.38 | 0.76 |
| Methyldiethoxysilane (FIG. 39) | 182 | 23.2% | 134.25 | 1.36 | 63.57% | 1.36 | 2.71 |
| Vinylmethyldiethoxysilane (FIG. 40) | 64 | 8.2% | 160.29 | 0.40 | 18.72% | 0.40 | 0.80 |

| Reactant or Solvent | Mass | % of Total | MW | Moles of Reactant/ solvent | % of Total Moles of Silane | Moles of Si | Moles of EtOH |
|---|---|---|---|---|---|---|---|
| Triethoxysilane | 0.00 | 0.0% | 164.27 | — | 0.00% | — | — |
| Hexane in hydrolyzer | 0.00 | 0.0% | 86.18 | — | | | |
| Acetone in hydrolyzer | 400.00 | 51.1% | 58.08 | 6.89 | | | |
| Ethanol in hydrolyzer | 0.00 | 0.0% | 46.07 | — | | | |
| Water in hydrolyzer | 80.00 | 10.2% | 18.00 | 4.44 | | | |
| HCl | 0.36 | 0.0% | 36.00 | 0.01 | | | |
| Sodium bicarbonate | 0.84 | 0.1% | 84.00 | 0.01 | | | |

Example 43

A polysilocarb formulation has 80% MHF, 15% TV, and 5% VT.

Example 73

A polysilocarb formulation has 95% MHF and 5% TV.

Example 74

A polysilocarb formulation has 90% MHF, 5% TV, and 5% VT.

Example 76A

Using the reaction type process a polysilocarb precursor formulation was made using the following formulation. The temperature of the reaction was maintained at 72° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 180.00 | 22.7% | 240.37 | 0.75 | 44.10% | 0.75 | 2.25 |
| Phenylmethyldiethoxysilane (FIG. 38) | 50.00 | 6.3% | 210.35 | 0.24 | 14.00% | 0.24 | 0.48 |
| Dimethyldiethoxysilane (FIG. 42) | 40.00 | 5.0% | 148.28 | 0.27 | 15.89% | 0.27 | 0.54 |
| Methyldiethoxysilane (FIG. 39) | 30.00 | 3.8% | 134.25 | 0.22 | 13.16% | 0.22 | 0.45 |
| Vinylmethyldiethoxysilane (FIG. 40) | 35.00 | 4.4% | 160.29 | 0.22 | 12.86% | 0.22 | 0.44 |
| Trimethyethoxysilane (FIG. 48) | 0.00 | 0.0% | 118.25 | | 0.00% | — | — |
| Hexane in hydrolyzer | 0.00 | 0.0% | 86.18 | — | | | |
| Acetone in hydrolyzer | 0.00 | 0.0% | 58.08 | | | | |
| Ethanol in hydrolyzer | 380.00 | 48.0% | 46.07 | 8.25 | | | |
| Water in hydrolyzer | 76.00 | 10.9% | 18.00 | 4.22 | | | |
| HCl (pH 2, 36 g/100 g water) | 0.36 | 0% | 36.00 | 0.01 | | | |
| Sodium bicarbonate | 0.84 | 0.1% | 84.00 | 0.01 | | | |

Example 76B

Using the reaction type process a polysilocarb precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 180.00 | 22.7% | 240.37 | 0.75 | 44.10% | 0.75 | 2.25 |
| Phenylmethyldiethoxysilane (FIG. 38) | 50.00 | 6.3% | 210.35 | 0.24 | 14.00% | 0.24 | 0.48 |
| Dimethyldiethoxysilane (FIG. 42) | 10.00 | 1.3% | 148.28 | 0.07 | 3.95% | 0.07 | 0.13 |
| Methyldiethoxysilane (FIG. 39) | 45.00 | 5.7% | 134.25 | 0.34 | 19.63% | 0.34 | 0.67 |
| Vinylmethyldiethoxysilane (FIG. 40) | 51.00 | 6.4% | 160.29 | 0.32 | 18.64% | 0.32 | 0.64 |
| Trimethyethoxysilane (FIG. 48) | 0.00 | 0.0% | 118.25 | | 0.00% | — | — |
| Hexane in hydrolyzer | 0.00 | 0.0% | 86.18 | — | | | |
| Acetone in hydrolyzer | 380.00 | 47.9% | 58.08 | 6.54 | | | |

-continued

| Reactant or Solvent | Mass | % of Total | MW | Moles of Reactant/ solvent | % of Total Moles of Silane | Moles of Si | Moles of EtOH |
|---|---|---|---|---|---|---|---|
| Ethanol in hydrolyzer | 0.00 | 0.0% | 46.07 | 0.00 | | | |
| Water in hydrolyzer | 76.00 | 9.6% | 18.00 | 4.22 | | | |
| HCl (pH 2, 36 g/100 g water) | 0.36 | 0% | 36.00 | 0.01 | | | |
| Sodium bicarbonate | 0.84 | 0.1% | 84.00 | 0.01 | | | |

Example 76C

Using the reaction type process a polysilocarb precursor formulation was made using the following formulation. The temperature of the reaction was maintained at 61° C. for 21 hours.

| Reactant or Solvent | Mass | % of Total | MW | Moles of Reactant/ solvent | % of Total Moles of Silane | Moles of Si | Moles of EtOH |
|---|---|---|---|---|---|---|---|
| Phenyltriethoxysilane (FIG. 45) | 170.00 | 21.4% | 240.37 | 0.71 | 40.76% | 0.71 | 2.12 |
| Phenylmethyldiethoxysilane (FIG. 38) | 3200 | 4.0% | 210.35 | 0.15 | 8.77% | 0.15 | 0.30 |
| Dimethyldiethoxysilane (FIG. 42) | 9.00 | 1.1% | 148.28 | 0.06 | 3.50% | 0.06 | 0.12 |
| Methyldiethoxysilane (FIG. 39) | 55.00 | 6.9% | 134.25 | 0.41 | 23.61% | 0.41 | 0.82 |
| Vinylmethyldiethoxysilane (FIG. 40) | 65.00 | 8.2% | 160.29 | 0.41 | 23.37% | 0.41 | 0.81 |
| Trimethyethoxysilane (FIG. 48) | 0.00 | 0.0% | 118.25 | | 0.00% | — | — |
| Hexane in hydrolyzer | 0.00 | 0.0% | 86.18 | — | | | |
| Acetone in hydrolyzer | 385.00 | 48.5% | 58.08 | 6.63 | | | |
| Ethanol in hydrolyzer | 0.00 | 0.0% | 46.07 | 0.00 | | | |
| Water in hydrolyzer | 77.00 | 9.7% | 18.00 | 4.28 | | | |
| HCl (pH 2, 36 g/100 g water) | 0.36 | 0% | 36.00 | 0.01 | | | |
| Sodium bicarbonate | 0.84 | 0.1% | 84.00 | 0.01 | | | |

Example 77

A polysilocarb liquid formulation has 40% MHF and 60% TV.

Example 78

A polysilocarb formulation has 60% MHF and 40% TV may be used as an infiltrant for a pyrolysis process.

Example 79

A polysilocarb formulation has 60% MHF, 30% TV, and 10% a hydroxy terminated dimethyl polysiloxane.

Example 80

A polysilocarb formulation has 64% methyl terminated phenylethyl polysiloxane of FIG. 16 (where group "X" makes up 10% of the material), 26% TV, and 5% a hydroxy terminated dimethyl polysiloxane.

Example 81

A polysilocarb formulation has 58% MHF, 26% TV, 5% VT and 5% a hydroxy terminated dimethyl polysiloxane.

Example 82

A polysilocarb formulation has 0-20% MHF, 0-30% TV, 50-100% H62 C and 0-5% a hydroxy terminated dimethyl polysiloxane.

Example 83

A polysilocarb formulation has 25% methyl terminated phenylethyl polysiloxane of FIG. 16 (where group "X" makes up 10% of the material), 20% TV, 50% MHF and 5% VT.

Example 84

A polysilocarb formulation has from 20-80% MHF and 20-80% TV.

Example 85

A polysilocarb formulation has from 70% MHF and 30% TV may be used as an infiltrant for a pyrolysis process.

Example 86

A polysilocarb formulation has from 80% MHF and 20% TV may be used as an infiltrant for a pyrolysis process.

Example 87

A polysilocarb formulation has 20% methyl terminated phenylethyl polysiloxane of FIG. 16 (where group "X" makes up 10% of the material), 30% TV, and 50% MHF.

Example 88

A polysilocarb formulation has 40% methyl terminated phenylethyl polysiloxane of FIG. 16 (where group "X" makes up 10% of the material), 30% TV, and 10% MHF.

Example 89

A polysilocarb formulation has 80% methyl terminated phenylethyl polysiloxane of FIG. 16 (where group "X" makes up 10% of the material) and 20% TV.

Example 90

A polysilocarb formulation has 100% H62 C and may be used as an infiltrant for a pyrolysis process.

Example 100

A polysilocarb formulation has 10% methyl terminated phenylethyl polysiloxane of FIG. 16 (where group "X" makes up 10% of the material), 20% TV, and 70% MHF.

Example 101

A polysilocarb formulation has 5% MHF, 10% TV, and 85% H62 C and may be used as an infiltrant for a pyrolysis process.

Example 102

A polysilocarb formulation has 55% MHF, 35% TV, and 10% H62 C and may be used as an infiltrant for a pyrolysis process.

Example 103

A polysilocarb formulation has 40% MHF, 40% TV, and 20% VT and has a hydride to vinyl molar ratio of 1.12:1, and may be used as to form strong ceramic beads, e.g., proppants for use in hydraulically fracturing hydrocarbon producing formations.

Example 104

A polysilocarb formulation has 42% MHF, 38% TV, and 20% VT and has a hydride to vinyl molar ratio of 1.26:1, and may be used as to form strong ceramic beads, e.g., proppants for use in hydraulically fracturing hydrocarbon producing formations.

Example 105

A polysilocarb formulation has 46% MHF, 34% TV, and 20% VT and has a hydride to vinyl molar ratio of 1.50:1, and may be used as to form strong ceramic beads, e.g., proppants for use in hydraulically fracturing hydrocarbon producing formations.

Example 106

A polysilocarb formulation has 49% MHF, 31% TV, and 30% VT and has a hydride to vinyl molar ratio of 1.75:1, and may be used as to form strong ceramic beads, e.g., proppants for use in hydraulically fracturing hydrocarbon producing formations.

Example 107

A polysilocarb formulation has 51% MHF, 49% TV, and 0% VT and has a hydride to vinyl molar ratio of 1.26:1, and may be used as to form strong ceramic beads, e.g., proppants for use in hydraulically fracturing hydrocarbon producing formations.

Example 108

A polysilocarb formulation has 55% MHF, 35% TV, and 10% VT and has a hydride to vinyl molar ratio of 1.82:1, and may be used as to form strong ceramic beads, e.g., proppants for use in hydraulically fracturing hydrocarbon producing formations.

Example 109

A polysilocarb formulation has 52% MHF, 28% TV, and 20% VT and has a hydride to vinyl molar ratio of 2.02:1, and may be used as to form strong ceramic beads, e.g., proppants for use in hydraulically fracturing hydrocarbon producing formations.

Example 110

A polysilocarb formulation has 55% MHF, 25% TV, and 20% VT and has a hydride to vinyl molar ratio of 2.36:1, and may be used as to form strong ceramic beads, e.g., proppants for use in hydraulically fracturing hydrocarbon producing formations.

Example 111

A polysilocarb formulation has 65% MHF, 25% TV, and 10% VT and has a hydride to vinyl molar ratio of 2.96:1, and may be used as to form strong ceramic beads, e.g., proppants for use in hydraulically fracturing hydrocarbon producing formations.

Example 112

A polysilocarb formulation has 70% MHF, 20% TV, and 10% VT and has a hydride to vinyl molar ratio of 3:93:1, and may be used as to form strong ceramic beads, e.g., proppants for use in hydraulically fracturing hydrocarbon producing formations.

Example 113

A polysilocarb formulation has 72% MHF, 18% TV, and 10% VT and has a hydride to vinyl molar ratio of 4.45:1, and may be used as to form strong ceramic beads, e.g., proppants for use in hydraulically fracturing hydrocarbon producing formations.

Example 114

A polysilocarb formulation has 75% MHF, 17% TV, and 8% VT and has a hydride to vinyl molar ratio of 4.97:1, and may be used as to form strong ceramic beads, e.g., proppants for use in hydraulically fracturing hydrocarbon producing formations.

Example 115

A polysilocarb formulation has 95% MHF, 5% TV, and 0% VT and has a hydride to vinyl molar ratio of 23.02:1, and may be used as to form strong ceramic beads, e.g., proppants for use in hydraulically fracturing hydrocarbon producing formations.

Example 116

A polysilocarb batch having 70% of the MH precursor of the formula of FIG. 1 and a molecular weight of about 800 and 30% of the TV precursor of the formula of FIG. 17 are mixed together in a vessel and put in storage for later use. The polysilocarb batch has good shelf life and room temperature and the precursors have not, and do not react with each other. The polysilocarb batch has a viscosity of about 15 cps.

Example 117

A polysilocarb batch having 75% of the MH precursor of the formula of FIG. 1 and a molecular weight of about 800 and 25% of the TV precursor of the formula of FIG. 17 are mixed together in a vessel and put in storage for later use. The polysilocarb batch has good shelf life and room temperature and the precursors have not, and do not react with each other. The polysilocarb batch has a viscosity of about 18 cps.

Example 118

The polysilocarb batch of Example 11 has 28% of an about 80 micron to about 325 mesh SiC filler added to the batch to make a filled polysilocarb batch, which can be kept for later use.

Example 119

The polysilocarb batch of Example 116 has 21% of a silica fume to about 325 mesh silica filler added to the batch to make a filled polysilocarb batch, which can be kept for later use.

Example 120

The polysilocarb batch of Example 12 has 40% of a silica fume to about 325 mesh silica filler added to the batch to make a filled polysilocarb batch, which can be kept for later use.

Example 121

A polysilocarb batch having 10% of the MH precursor of the formula of FIG. 1 and a molecular weight of about 800 and 73% of the styrene precursor of the formula of FIG. 16 (having 10% X) and a molecular weight of about 1,000, and 16% of the TV precursor of the formula of FIG. 17, and 1% of the OH terminated precursor of the formula of FIG. 7, having a molecular weight of about 1,000 are mixed together in a vessel and put in storage for later use. The polysilocarb batch has good shelf life and room temperature and the precursors have not, and do not react with each other. The polysilocarb batch has a viscosity of about 72 cps.

Example 122

A polysilocarb batch having about 70% of the MH precursor of the formula of FIG. 1 and a molecular weight of about 800, and about 20% of the TV precursor of the formula of FIG. 17, and 10% of the vinyl terminated precursor of the formula of FIG. 6 having a molecular weight of about 6000 are mixed together in a vessel and put in storage for later use. The polysilocarb batch has good shelf life and room temperature and the precursors have not, and do not react with each other. The polysilocarb batch has a viscosity of about 55 cps.

Example 123

A polysilocarb batch having 0-90% of the MH precursor of the formula of FIG. 1 and a molecular weight of about 800, and 0-90% of the styrene precursor of the formula of FIG. 16 (having 10% X) and a molecular weight of about 1000, and 0-30% of the TV precursor of the formula of FIG. 17, and 0-30% of the vinyl terminated precursor of the formula of FIG. 6 having a molecular weight of about 9400 and 0-20% of the OH terminated precursor of the formula of FIG. 7, having a molecular weight of about 800 are mixed together in a vessel and put in storage for later use. The polysilocarb batch has good shelf life and room temperature and the precursors have not, and do not react with each other. The polysilocarb batch has a viscosity of about 100 cps.

Example 124

A polysilocarb batch having 70% of the MH precursor of the formula of FIG. 1 and 30% of the vinyl terminated precursor of the formula of FIG. 6 having a molecular weight of about 500 and about 42% of a submicron and a 325 mesh silica are mixed together in a vessel and put in storage for later use. The polysilocarb batch has good shelf life and room temperature and the precursors have not, and do not react with each other. The polysilocarb batch has a viscosity of about 300 cps.

Example 125

10 ppm of a platinum catalyst is added to each of the polysilocarb batches of Examples 118-120 and these catalyzed batches are dropped on a tray to form droplets and are cured in an air oven at about 125° C. for about 30 minutes. The cured drop structures were slightly non-round beads with densities of about 1.1-1.7 g/cc, diameters of about 200 microns to about 2 mm, and crush strengths of about 3-7 ksi.

Example 126

10 ppm of a platinum catalyst is added to the polysilocarb batch of Example 121. Drops of the catalyzed batch are dripped into a hot air column having a temperature of about 375° C. and fall by gravity for about a distance of 8 ft in the air column. The cured spheres from the bottom of the air column are pyrolized in an inert atmosphere at 1,000° C. for about 120 minutes. The pyrolized round spheres have a very uniform size (e.g., monosize distribution), density of about 1.9-2.0 g/cc, a diameter of about 400-800 microns, and a crush strength of about 5.5-7 ksi.

Example 127

10 ppm of a platinum and peroxide catalyst mixture is added to the polysilocarb batch of Example 122. Drops of the catalyzed batch are dripped into a hot air column having a temperature of about 375° C. and fall by gravity for about a distance of 8 ft in the air column. The cured spheres from the bottom of the air column are pyrolized in an inert atmosphere at 1,000° C. for about 120 minutes. The pyrolized round spheres have a very uniform size (e.g., monosize distribution), density of about 2.0-2.1 g/cc, a diameter of about 400-800 microns, and a crush strength of about 4-5.5 ksi.

Example 128

A condensation cure reaction is performed in reinforced preform in the shape of a diesel engine block, made from a batch having 15% TES (FIG. 35) and 85% 350 and carbon fiber reinforcement. The curing reaction produces water as a result of the cross linking process. To manage the produced water the preform is placed under vacuum and heated slowly through the cure temperature, e.g., hrs at 120 C, followed by 4 hrs at 160 C, followed by 4 hrs at 180 C. The cured preform is then pyrolized and machined to provide a diesel engine block, which can be subsequently assembled into a diesel engine.

Example 129

A condensation cure reaction is performed in reinforced preform in the shape of a diesel engine block, made from a batch having 10% TES (FIG. 35) and 90% 350 and ceramic fiber reinforcement, e.g., NEXTEL 312. The curing reaction produces water as a result of the cross linking process. To manage the produced water the preform is placed under vacuum and heated slowly through the cure temperature, e.g., 4 hrs at 140 C, followed by 4 hrs at 160 C, followed by 2 hrs at 180 C. The cured preform is then pyrolized and machined to provide a diesel engine block, which can be subsequently assembled into a diesel engine.

Example 130

A condensation cure reaction is performed in reinforced preform in the shape of a oil field down hole casing pipe, made from a batch having 15% TES (FIG. 25) and 85% 350 and fiberglass reinforcement. The curing reaction produces water as a result of the cross linking process. To manage the produced water the preform is placed under vacuum and heated slowly through the cure temperature, e.g., 4 hrs at 140 C, followed by 4 hrs at 160 C, followed by 2 hrs at 180 C.

Example 131

A condensation cure reaction is performed in reinforced preform in the shape of a oil field down hole tool, made from a batch having 15% TES (FIG. 35) and 85% 350 and carbon fiber reinforcement. The curing reaction produces water as a result of the cross linking process. To manage the produced water the preform is placed under vacuum and heated slowly through the cure temperature, e.g., 4 hrs at 140 C, followed by 4 hrs at 160 C, followed by 2 hrs at 180 C. The cured preform is then pyrolized and machined to provide a down hole tool.

Example 132

A condensation cure reaction is performed in reinforced preform in the shape of a cutter for use in a cutting tool from a batch having 10% TES (FIG. 6) and 90% 350 and ceramic powder and diamond powder. The curing reaction produces water as a result of the cross linking process. To manage the produced water the preform is placed under vacuum and heated slowly through the cure temperature, e.g., 4 hrs at 140 C, followed by 4 hrs at 160 C, followed by 2 hrs at 180 C. The cured preform is then pyrolized and machined to provide cutters for use in, or with, cutting tools, such as down hole drill bits.

The various embodiments of formulations, plastics, articles, components, parts, uses, applications, methods, activities and operations set forth in this specification may be used for various other fields and for various other activities, uses and embodiments. Additionally, these embodiments, for example, may be used with: existing systems, articles, components, operations or activities; may be used with systems, articles, components, operations or activities that may be developed in the future; and with such systems, articles, components, operations or activities that may be modified, in-part, based on the teachings of this specification. Further, the various embodiments and examples set forth in this specification may be used with each other, in whole or in part, and in different and various combinations. Thus, for example, the configurations provided in the various embodiments and examples of this specification may be used with each other; and the scope of protection afforded the present inventions should not be limited to a particular embodiment, example, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A solvent free method for making a ceramic material, the method comprising:
   a. mixing a first liquid polysilocarb precursor with a second liquid precursor in the absence of a solvent to form a solvent free liquid polysilocarb precursor formulation; wherein the first liquid polysilocarb precursor is a linear polymer having a backbone of —[Si—O]— repeating units, a molecular weight of about 400 to about 1,000, and a viscosity of about 20 to 40 cps at 25° C.; whereby the first liquid polysilocarb precursor is not chemically reacted with the second liquid precursor;
   b. curing the polysilocarb precursor formulation into a hard cured neat solid material having no reinforcements, whereby the first liquid polysilocarb precursor and the second liquid precursor chemically react to form the hard cured solid material, whereby none of the polysilocarb precursor formulation remains as a liquid;
   c. pyrolyzing the hard cured solid material in an inert atmosphere to form a ceramic material consisting essentially of silicon, oxygen and carbon; and,
   d. wherein the process of steps a. through c. is performed in absence of a solvent.

2. The method of claim 1, wherein the first liquid precursor is methyl hydrogen fluid.

3. The method of claim 1, wherein the first liquid precursor is a methyl terminated hydride substituted polysiloxane.

4. The method of claim 1, wherein the first liquid precursor is selected from the group consisting of a methyl terminated vinyl polysiloxane, a vinyl terminated vinyl polysiloxane, a hydride terminated vinyl polysiloxane, and an allyl terminated dimethyl polysiloxane.

5. The method of claim 1, wherein the first liquid precursor is selected from the group consisting of a vinyl terminated dimethyl polysiloxane, a hydroxy terminated dimethyl polysiloxane, a hydride terminated dimethyl polysiloxane, and a hydroxy terminated vinyl polysiloxane.

6. The method of claim 1, wherein the first liquid precursor is selected from the group consisting of a phenyl terminated dimethyl polysiloxane, a phenyl and methyl terminated dimethyl polysiloxane, a methyl terminated dimethyl diphenyl polysiloxane, a vinyl terminated dimethyl diphenyl polysiloxane, a hydroxy terminated dimethyl diphenyl polysiloxane, and a hydride terminated dimethyl diphenyl polysiloxane.

7. The method of claim 1, wherein the second liquid precursor is selected from the group consisting of a methyl terminated phenylethyl polysiloxane, a tetravinyl cyclosiloxane, a trivinyl cyclosiloxane, and a divinyl cyclosiloxane.

8. The method of claim 1, wherein the second liquid precursor is selected from the group consisting of a trivinyl hydride cyclosiloxane, a divinyl dihydride cyclosiloxane, and a dihydride cyclosiloxane.

9. The method of claim 1, wherein the second liquid precursor is a silane.

10. The method of claim 1, wherein the second liquid precursor is selected from the group consisting of a methyl terminated dimethyl ethyl methyl phenyl silyl silane, an ethyl methyl phenyl silyl-cyclosiloxane, a cyclosiloxane and an orthosilicate.

11. The method of claim 1, wherein the first liquid precursor is methyl hydrogen fluid; and wherein the second liquid precursor is selected from the group consisting of a methyl terminated phenylethyl polysiloxane, a tetravinyl cyclosiloxane, a trivinyl cyclosiloxane, and a divinyl cyclosiloxane.

12. The method of claim 1, wherein the first liquid precursor is a methyl terminated hydride substituted polysiloxane; and wherein the second liquid precursor is selected from the group consisting of a methyl terminated phenylethyl polysiloxane, a tetravinyl cyclosiloxane, a trivinyl cyclosiloxane, and a divinyl cyclosiloxane.

13. The method of claim 1, wherein the first liquid precursor is selected from the group consisting of a methyl terminated vinyl polysiloxane, a vinyl terminated vinyl polysiloxane, a hydride terminated vinyl polysiloxane, and an allyl terminated dimethyl polysiloxane; and, wherein the second liquid precursor is selected from the group consisting of a methyl terminated phenylethyl polysiloxane, a tetravinyl cyclosiloxane, a trivinyl cyclosiloxane, a divinyl cyclosiloxane, a trivinyl hydride cyclosiloxane, a divinyl dihydride cyclosiloxane, a dihydride cyclosiloxane, a silane, a methyl terminated dimethyl ethyl methyl phenyl silyl silane, an ethyl methyl phenyl silyl-cyclosiloxane, a cyclosiloxane and an orthosilicate.

14. The method of claim 1, wherein the first liquid precursor is selected from the group consisting of a vinyl terminated dimethyl polysiloxane, a hydroxy terminated dimethyl polysiloxane, a hydride terminated dimethyl polysiloxane, and a hydroxy terminated vinyl polysiloxane and, wherein the second liquid precursor is selected from the group consisting of a methyl terminated phenylethyl polysiloxane, a tetravinyl cyclosiloxane, a trivinyl cyclosiloxane, a divinyl dihydride cyclosiloxane, a dihydride cyclosiloxane, a silane, a methyl terminated dimethyl ethyl methyl phenyl silyl silane, an ethyl methyl phenyl silyl-cyclosiloxane, a cyclosiloxane and an orthosilicate.

15. The method of claim 1, wherein the first liquid precursor is selected from the group consisting of a phenyl terminated dimethyl polysiloxane, a phenyl and methyl terminated dimethyl polysiloxane, a methyl terminated dimethyl diphenyl polysiloxane, a vinyl terminated dimethyl diphenyl polysiloxane, a hydroxy terminated dimethyl diphenyl polysiloxane, and a hydride terminated dimethyl diphenyl polysiloxane and, wherein the second liquid precursor is selected from the group consisting of a methyl terminated phenylethyl polysiloxane, a tetravinyl cyclosiloxane, a trivinyl cyclosiloxane, a divinyl cyclosiloxane, a trivinyl hydride cyclosiloxane, a divinyl dihydride cyclosiloxane, a dihydride cyclosiloxane, a silane, a cyclosiloxane and an orthosilicate.

16. A solvent free method for making a neat ceramic material, the method comprising:

a. preparing a mixture, the mixture consisting of liquid reactive precursors, the reactive precursors comprising a first liquid polysilocarb precursor and a second liquid precursor in the absence of a solvent to form a solvent free liquid polysilocarb precursor formulation; wherein the first liquid polysilocarb precursor is a linear polymer, whereby the first liquid polysilocarb precursor is not chemically reacted with the second liquid precursor;

b. curing the mixture into a neat solid material having no reinforcements, whereby the first liquid polysilocarb precursor and the second liquid precursor chemically react to form the neat solid material, whereby none of the mixture remains as a liquid; and, c. pyrolyzing the neat solid material in an inert atmosphere to form a neat ceramic material comprising silicon, oxygen and carbon.

17. The method of claim 16, wherein the pyrolysis is conducted under a reduced pressure atmosphere.

18. The method of claim 17, wherein the reduced pressure atmosphere is a vacuum.

19. The method of claim 16, wherein the first liquid precursor is methyl hydrogen fluid.

20. The method of claim 16, wherein the first liquid precursor is a methyl terminated hydride substituted polysiloxane.

21. The method of claim 18, wherein the first liquid precursor is selected from the group consisting of a methyl terminated vinyl polysiloxane, a vinyl terminated vinyl polysiloxane, a hydride terminated vinyl polysiloxane, and an allyl terminated dimethyl polysiloxane.

22. The method of claim 16, wherein the first liquid precursor is selected from the group consisting of a vinyl terminated dimethyl polysiloxane, a hydroxy terminated dimethyl polysiloxane, a hydride terminated dimethyl polysiloxane, and a hydroxy terminated vinyl polysiloxane.

23. The method of claim 18, wherein the first liquid precursor is selected from the group consisting of a phenyl terminated dimethyl polysiloxane, a phenyl and methyl terminated dimethyl polysiloxane, a methyl terminated dimethyl diphenyl polysiloxane, a vinyl terminated dimethyl diphenyl polysiloxane, a hydroxy terminated dimethyl diphenyl polysiloxane, and a hydride terminated dimethyl diphenyl polysiloxane.

24. The method of claim 16, wherein the second liquid precursor is selected from the group consisting of a methyl terminated phenylethyl polysiloxane, a tetravinyl cyclosiloxane, a trivinyl cyclosiloxane, and a divinyl cyclosiloxane.

25. The method of claim 16, wherein the second liquid precursor is selected from the group consisting of a trivinyl hydride cyclosiloxane, a divinyl dihydride cyclosiloxane, and a dihydride cyclosiloxane.

26. The method of claim 16, wherein the second liquid precursor is a silane.

27. The method of claim 18, wherein the second liquid precursor is selected from the group consisting of a methyl terminated dimethyl ethyl methyl phenyl silyl silane, an ethyl methyl phenyl silyl-cyclosiloxane, a cyclosiloxane and an orthosilicate.

28. The method of claim 16, wherein the first liquid precursor is methyl hydrogen fluid; and wherein the second liquid precursor is selected from the group consisting of a methyl terminated phenylethyl polysiloxane, a tetravinyl cyclosiloxane, a trivinyl cyclosiloxane, and a divinyl cyclosiloxane.

29. The method of claim 16, wherein the first liquid precursor is a methyl terminated hydride substituted polysiloxane; and wherein the second liquid precursor is selected from the group consisting of a methyl terminated phenylethyl polysiloxane, a tetravinyl cyclosiloxane, a trivinyl cyclosiloxane, and a divinyl cyclosiloxane.

30. The method of claim 16, wherein the first liquid precursor is selected from the group consisting of a methyl terminated vinyl polysiloxane, a vinyl terminated vinyl polysiloxane, a hydride terminated vinyl polysiloxane, and an allyl terminated dimethyl polysiloxane; and, wherein the second liquid precursor is selected from the group consisting of a methyl terminated phenylethyl polysiloxane, a tetravinyl cyclosiloxane, a trivinyl cyclosiloxane, a divinyl cyclosiloxane, a trivinyl hydride cyclosiloxane, a divinyl dihydride cyclosiloxane, a dihydride cyclosiloxane, a silane, a methyl terminated dimethyl ethyl methyl phenyl silyl silane, an ethyl methyl phenyl silyl-cyclosiloxane, a cyclosiloxane and an orthosilicate.

31. The method of claim 16, wherein the first liquid precursor is selected from the group consisting of a vinyl terminated dimethyl polysiloxane, a hydroxy terminated dimethyl polysiloxane, a hydride terminated dimethyl polysiloxane, and a hydroxy terminated vinyl polysiloxane and, wherein the second liquid precursor is selected from the group consisting of a methyl terminated phenylethyl polysiloxane, a tetravinyl cyclosiloxane, a trivinyl cyclosiloxane, a divinyl dihydride cyclosiloxane, a dihydride cyclosiloxane, a silane, a methyl terminated dimethyl ethyl methyl phenyl silyl silane, an ethyl methyl phenyl silyl-cyclosiloxane, a cyclosiloxane and an orthosilicate.

32. The method of claim 16, wherein the first liquid precursor is selected from the group consisting of a phenyl terminated dimethyl polysiloxane, a phenyl and methyl terminated dimethyl polysiloxane, a methyl terminated dimethyl diphenyl polysiloxane, a vinyl terminated dimethyl diphenyl polysiloxane, a hydroxy terminated dimethyl diphenyl polysiloxane, and a hydride terminated dimethyl diphenyl polysiloxane and, wherein the second liquid precursor is selected from the group consisting of a methyl terminated phenylethyl polysiloxane, a tetravinyl cyclosiloxane, a trivinyl cyclosiloxane, a divinyl cyclosiloxane, a trivinyl hydride cyclosiloxane, a divinyl dihydride cyclosiloxane, a dihydride cyclosiloxane, a silane, a cyclosiloxane and an orthosilicate.

33. The methods of claim 16, wherein the neat ceramic material is a spherical bead shaped.

34. The methods of claim 17, wherein the neat ceramic material is sheet shaped.

35. The method of claim 18, wherein the neat ceramic material is a spherical bead shaped.

36. The method of claim 16, wherein the solvent free liquid polysilocarb precursor formulation contains hydride groups.

37. The method of claim 18, wherein the solvent free liquid polysilocarb precursor formulation contains hydride groups.

38. The method of claim 19, wherein the solvent free liquid polysilocarb precursor formulation contains hydride groups.

39. The method of claim 20, wherein the solvent free liquid polysilocarb precursor formulation contains hydride groups.

40. The method of claim 27, wherein the solvent free liquid polysilocarb precursor formulation contains hydride groups.

41. The method of claim 16, wherein the solvent free liquid polysilocarb precursor formulation contains vinyl groups.

42. The method of claim 17, wherein the solvent free liquid polysilocarb precursor formulation contains vinyl groups.

43. The method of claim 19, wherein the solvent free liquid polysilocarb precursor formulation contains vinyl groups.

44. The method of claim 20, wherein the solvent free liquid polysilocarb precursor formulation contains vinyl groups.

45. The method of claim 21, wherein the solvent free liquid polysilocarb precursor formulation contains vinyl groups.

46. The method of claim 22, wherein the solvent free liquid polysilocarb precursor formulation contains vinyl groups.

47. The method of claim 27, wherein the solvent free liquid polysilocarb precursor formulation contains vinyl groups.

48. The method of claim 16, wherein the solvent free liquid polysilocarb precursor formulation contains vinyl groups and hydride groups.

49. The method of claim 17, wherein the solvent free liquid polysilocarb precursor formulation contains vinyl groups and hydride groups.

50. The method of claim 18, wherein the solvent free liquid polysilocarb precursor formulation contains vinyl groups and hydride groups.

51. The method of claim 19, wherein the solvent free liquid polysilocarb precursor formulation contains vinyl groups and hydride groups.

52. The method of claim 20, wherein the solvent free liquid polysilocarb precursor formulation contains vinyl groups and hydride groups.

53. The method of claim 21, wherein the solvent free liquid polysilocarb precursor formulation contains vinyl groups and hydride groups.

54. The method of claim 22, wherein the solvent free liquid polysilocarb precursor formulation contains vinyl groups and hydride groups.

55. The method of claim 48, wherein the molar ratio of hydride groups to vinyl groups in the formulation is about 1.50 to 1.

56. The method of claim 48, wherein the molar ratio of hydride groups to vinyl groups in the formulation is about 3.93 to 1.

57. The method of claim 48, wherein the molar ratio of hydride groups to vinyl groups in the formulation is about 5.93 to 1.

58. The method of claim 48, wherein the molar ratio of hydride groups to vinyl groups in the formulation is about 0.08 to 1 to about 24.00 to 1.

59. The method of claim 48, wherein the molar ratio of hydride groups to vinyl groups in the formulation is about 2.03 to 1 to about 24.00 to 1.

60. The method of claim 48, wherein the molar ratio of hydride groups to vinyl groups in the formulation is about 3.93 to 1 to about 24.00 to 1.

61. The method of claim 48, wherein the molar ratio of hydride groups to vinyl groups in the formulation is about 0.08 to 1 to about 1.82 to 1.

62. The method of claim 48, wherein the molar ratio of hydride groups to vinyl groups in the formulation is about 1.12 to 1 to about 2.36 to 1.

63. The method of claim 48, wherein the molar ratio of hydride groups to vinyl groups in the formulation is about 1.75 to 1 to about 23.02 to 1.

64. The method of claim 48, wherein the molar ratio of hydride groups to vinyl groups in the formulation is about 1.50 to 1 to about 5.93 to 1.

65. The method of claim 48, wherein the molar ratio of hydride groups to vinyl groups in the formulation is about 1.26 to 1 to about 4.97 to 1.

66. The method of claim 48, wherein the molar ratio of hydride groups to vinyl groups in the formulation is about 0.08 to 1 to about 1.50 to 1.

67. The method of claim 1, wherein the first precursor is selected from the group consisting of methyl hydrogen, siloxane backbone additive, vinyl substituted and vinyl terminated polydimethyl siloxane, vinyl substituted and hydrogen terminated polydimethyl siloxane, allyl terminated polydimethyl siloxane, silanol terminated polydimethyl siloxane, hydrogen terminated polydimethyl siloxane, vinyl terminated diphenyl dimethyl polysiloxane, hydroxyl terminated diphenyl dimethyl polysiloxane, hydride terminated diphenyl dimethyl polysiloxane, and styrene vinyl benzene dimethyl polysiloxane.

68. The method of claim 16, wherein the first precursor is selected from the group consisting of methyl hydrogen, siloxane backbone additive, vinyl substituted and vinyl terminated polydimethyl siloxane, vinyl substituted and hydrogen terminated polydimethyl siloxane, allyl terminated polydimethyl siloxane, silanol terminated polydimethyl siloxane, hydrogen terminated polydimethyl siloxane, vinyl terminated diphenyl dimethyl polysiloxane, hydroxyl terminated diphenyl dimethyl polysiloxane, hydride terminated diphenyl dimethyl polysiloxane, and styrene vinyl benzene dimethyl polysiloxane.

69. A neat ceramic material made by the process of claim 16.

70. A method for making a neat ceramic material, the method comprising:
a. mixing a first liquid polysilocarb precursor with a second liquid precursor in the absence of a solvent to form a solvent free liquid polysilocarb precursor formulation; wherein the first liquid polysilocarb precursor is a linear polymer, whereby the first liquid polysilocarb precursor is not chemically reacted with the second liquid precursor, wherein the liquid polysilocarb precursor formulation consists essentially of the first and second liquid precursors;
b. wherein the first liquid comprises a vinyl terminated polysiloxane and the second liquid comprises a reaction cross-linkable group, wherein the cross-linkable group is selected form the group consisting of hydride groups and vinyl groups;
c. curing the polysilocarb precursor formulation at temperature of 650° C. or less, for at least about 2 hours, into a neat hard cure solid material having no reinforcements, whereby the first liquid polysilocarb precursor and the second liquid precursor chemically react to form the neat solid material, whereby none of the precursor formulation remains as a liquid;
d. pyrolyzing the solid material, in a reduced pressure inert atmosphere, at temperatures of from about 650° C. to about 1,200° C. to form a neat ceramic material consisting essentially of carbon, silicon and oxygen; and,
e. wherein the process steps of a through d are performed in absence of a solvent.

71. The method of claim 70, wherein the molar ratio of hydride groups to vinyl groups in the formulation is about 3.93 to 1.

72. The method of claim 70, wherein the molar ratio of hydride groups to vinyl groups in the formulation is about 5.93 to 1.

73. The method of claim 70, wherein the molar ratio of hydride groups to vinyl groups in the formulation is about 0.08 to 1 to about 24.00 to 1.

74. The method of claim 70, wherein the molar ratio of hydride groups to vinyl groups in the formulation is about 2.03 to 1 to about 24.00 to 1.

75. The method of claim 70, wherein the molar ratio of hydride groups to vinyl groups in the formulation is about 3.93 to 1 to about 24.00 to 1.

76. The method of claim 70, wherein the molar ratio of hydride groups to vinyl groups in the formulation is about 0.08 to 1 to about 1.82 to 1.

77. The method of claim 70, wherein the molar ratio of hydride groups to vinyl groups in the formulation is about 1.12 to 1 to about 2.36 to 1.

78. A method for making a ceramic material, the method comprising:
a. mixing a first liquid polysilocarb precursor with a second liquid precursor in the absence of a solvent to form a solvent free liquid polysilocarb precursor formulation; wherein the first liquid polysilocarb precursor is a linear polymer, having a backbone of —[Si—O]— repeating units, whereby the liquid polysilocarb precursor formulation remains stable and will not chemically react at room temperature for more than a week;
b. wherein the first liquid comprises a vinyl terminated polysiloxane and the second liquid comprises a reaction cross-linkable group;
c. curing the polysilocarb precursor formulation at temperature of 650° C. or less, for at least about 2 hours, into a hard cure solid neat material having no reinforcements whereby the first liquid polysilocarb precursor and the second liquid precursor chemically react to form the solid material, and whereby none of the precursor formulation remains as a liquid; and,
d. pyrolyzing the solid material, in a reduced pressure inert atmosphere, at temperatures of from about 650° C. to about 1,200° C. to form a ceramic material consisting essentially of carbon, silicon and oxygen.

79. The method of claim 78, wherein the molar ratio of hydride groups to vinyl groups in the formulation is about 3.93 to 1.

80. The method of claim 78, wherein the molar ratio of hydride groups to vinyl groups in the formulation is about 5.93 to 1.

81. The method of claim 78, wherein the molar ratio of hydride groups to vinyl groups in the formulation is about 0.08 to 1 to about 24.00 to 1.

82. The method of claim 78, wherein the molar ratio of hydride groups to vinyl groups in the formulation is about 2.03 to 1 to about 24.00 to 1.

83. The method of claim 78, wherein the molar ratio of hydride groups to vinyl groups in the formulation is about 3.93 to 1 to about 24.00 to 1.

84. The method of claim 78, wherein the molar ratio of hydride groups to vinyl groups in the formulation is about 0.08 to 1 to about 1.82 to 1.

85. The method of claim 78, wherein the molar ratio of hydride groups to vinyl groups in the formulation is about 1.12 to 1 to about 2.36 to 1.

* * * * *